US010282740B1

(12) United States Patent
Bramwell et al.

(10) Patent No.: US 10,282,740 B1
(45) Date of Patent: May 7, 2019

(54) SYSTEMS AND METHODS FOR CREATING, MANAGING, AND/OR PROVIDING ONLINE CONTESTS

(71) Applicant: Quidlum Deuce Inc., Salt Lake City, UT (US)

(72) Inventors: Christopher Dee Bramwell, Vineyard, UT (US); Cuyler Sean Steiner, Midvale, UT (US); Alyssa Whitney Steiner, Midvale, UT (US); David Wright, Roy, UT (US)

(73) Assignee: Quidlum Deuce Inc., Salt Lake City, UT (US)

( * ) Notice: Subject to any disclaimer, the term of this patent is extended or adjusted under 35 U.S.C. 154(b) by 0 days.

(21) Appl. No.: 15/858,553

(22) Filed: Dec. 29, 2017

(51) Int. Cl.
  *G06F 17/00* (2006.01)
  *G06Q 30/02* (2012.01)

(52) U.S. Cl.
  CPC ..... *G06Q 30/0212* (2013.01); *G06Q 30/0236* (2013.01); *G06Q 30/0239* (2013.01)

(58) Field of Classification Search
  CPC ........... G06Q 30/0212; G06Q 30/0239; G06Q 30/0236
  See application file for complete search history.

(56) References Cited

U.S. PATENT DOCUMENTS

| | | | |
|---|---|---|---|
| 7,811,172 B2 | 10/2010 | Asher et al. | |
| 9,390,591 B2* | 7/2016 | Granich | G07F 17/3209 |
| 9,443,396 B2 | 9/2016 | Babineau et al. | |
| 2005/0198175 A1* | 9/2005 | Thomas | H04L 51/063 709/206 |
| 2007/0244585 A1* | 10/2007 | Speiser | A63F 13/12 700/91 |
| 2009/0298566 A1* | 12/2009 | Frick | G07C 15/00 463/17 |
| 2011/0288917 A1* | 11/2011 | Wanek | G06Q 30/00 705/14.5 |
| 2013/0079149 A1* | 3/2013 | Fletcher | G06Q 50/01 463/42 |

(Continued)

OTHER PUBLICATIONS

Stuart McKeown, How to Create an Online Sweepstakes, web page [online] [retrieved on Dec. 11, 2017], published at least by Dec. 11, 2017, Retrieved from the Internet: <URL:https://gleam.io/docs/guides/online-sweepstakes> (shown in attachment 1).

(Continued)

*Primary Examiner* — Dmitry Suhol
*Assistant Examiner* — Carl V Larsen
(74) *Attorney, Agent, or Firm* — Austin Rapp

(57) ABSTRACT

A computer program product for creating an online object-selection contest is described. The computer program product includes a non-transitory computer-readable medium and computer program code stored on the non-transitory computer-readable medium. The code is configured to cause a set of one or more processors to perform the following steps. A load selectable data object specification interface is presented and selectable objects data specifying two or more selectable data objects is received. A required number specification interface is presented and required number data specifying a required number of the selectable data objects are received. At least one odds value is calculated. A reward specification interface is presented and reward data is received. Executable code is generated for accessing the online object-selection contest. Entry data is received. It is determined whether each entry in the set of entries is eligible for the one or more rewards.

18 Claims, 37 Drawing Sheets

(56) References Cited

U.S. PATENT DOCUMENTS

| | | |
|---|---|---|
| 2013/0337891 A1 | 12/2013 | Pogostin et al. |
| 2013/0337910 A1 | 12/2013 | Germany |
| 2014/0038703 A1 | 2/2014 | Lampert et al. |
| 2014/0121003 A1* | 5/2014 | Mueller .................. A63F 13/12 463/25 |
| 2014/0279038 A1* | 9/2014 | Lombard ........... G06Q 30/0269 705/14.66 |
| 2017/0061503 A1* | 3/2017 | Sun .................... G06Q 30/0277 |

OTHER PUBLICATIONS

Giancarlo Massaro, Draw Winners, web page [online] [retrieved on Dec. 11, 2017], published at least by Dec. 11, 2017, Retrieved from the Internet: <URL: htttps://vs.elevio.help/en/articles/55027> (shown in attachment 2).

Giancarlo Massaro, Instant Win, web page [online] [retrieved on Dec. 11, 2017], published at least by Dec. 11, 2017, Retrieved from the Internet: <URL: htttps://www.viralsweep.com/instant-win/> (shown in attachment 3).

Woobox, We Have a Winner! Sweepstakes, Coupons and Instant Wins, web page [online] [retrieved on Dec. 1, 2017], published at least by Dec. 11, 2017, Retrieved from the Internet: <URL:https://woobox.com/campaigns/giveaways-coupons-instantwins> (shown in attachment 4).

Corey Post, How to Use Contests and Giveaways to Get User-Generated Content, blog[online] [retrieved on Dec. 11, 2017], published at least by Dec. 11, 2017, Retrieved from the Internet: <URL:https://blog.kissmetrics.com/contests-user-generated-content/> (shown in attachment 5).

* cited by examiner

| | |
|---|---|
| A | Share This Post on Platform A |
| A | Visit APlatformUsernam |
| A | RSVP to This Event or |
| B | Visit APlatformUsernam |
| B | View a featured post or |
| C | Follow APlatformUsern |
| C | Share this website on P |
| C | Repost this featured po |
| C | View a featured video o |
| C | Visit APlatformUsernam |
| D | View a featured page o |
| D | Watch a featured video |
| D | Subscribe to APlatform |

+10   1143

Platform C / Authorize an application — □ ×

Secure | https://api.platformC.com/authenticate/authToken=78MAAAAAaamm...

Sign up for Platform C >

**Authorize Contest Platform
to use your account?**

Username or email

Password

☐ Remember me    Forgot password?

( Sign In )  ( Cancel )

This application will be able to:
- Read posts from your account.
- See who you follow, and follow new people.
- Update your profile.
- Make posts for you.

Host a Contest                                          Terms and Conditions

FIG. 11

SYSTEMS AND METHODS FOR CREATING, MANAGING, AND/OR PROVIDING ONLINE CONTESTS

TECHNICAL FIELD

The present disclosure relates generally to computers and computer-related technology. More specifically, the present disclosure relates to systems and methods for creating, managing and/or providing online contests.

BACKGROUND

Computing devices have become increasingly prevalent in modern society. The cost of computing devices has decreased, while capabilities of computing devices have increased. Many people commonly use computing devices for entertainment, communication, and work tasks.

Types of computing devices include hand-held computing devices such as smartphones, tablet devices, and laptop computers. Other types of computing devices include desktop computers, servers, gaming consoles, virtual reality systems, augmented reality systems, and televisions. Computing devices may include one or more multiple processors. Computing devices may include software, such as applications including user interfaces, in order to make them useful and accessible to an end user. Computing devices are increasingly linked with other computing devices through wired and wireless networks. Networks continue growing in size while hosting increasing numbers of computing devices.

Several challenges have arisen due to the increasing use of computing devices and networks. For example, computing devices may perform some functions inefficiently, requiring a significant amount of manual work to accomplish a task. As can be observed from this discussion, systems and methods that improve computing technology may be beneficial.

BRIEF DESCRIPTION OF THE DRAWINGS

FIG. 11 is a diagram illustrating an example of a contest participation interface that includes an authorization interface;

DETAILED DESCRIPTION

Figure 1:
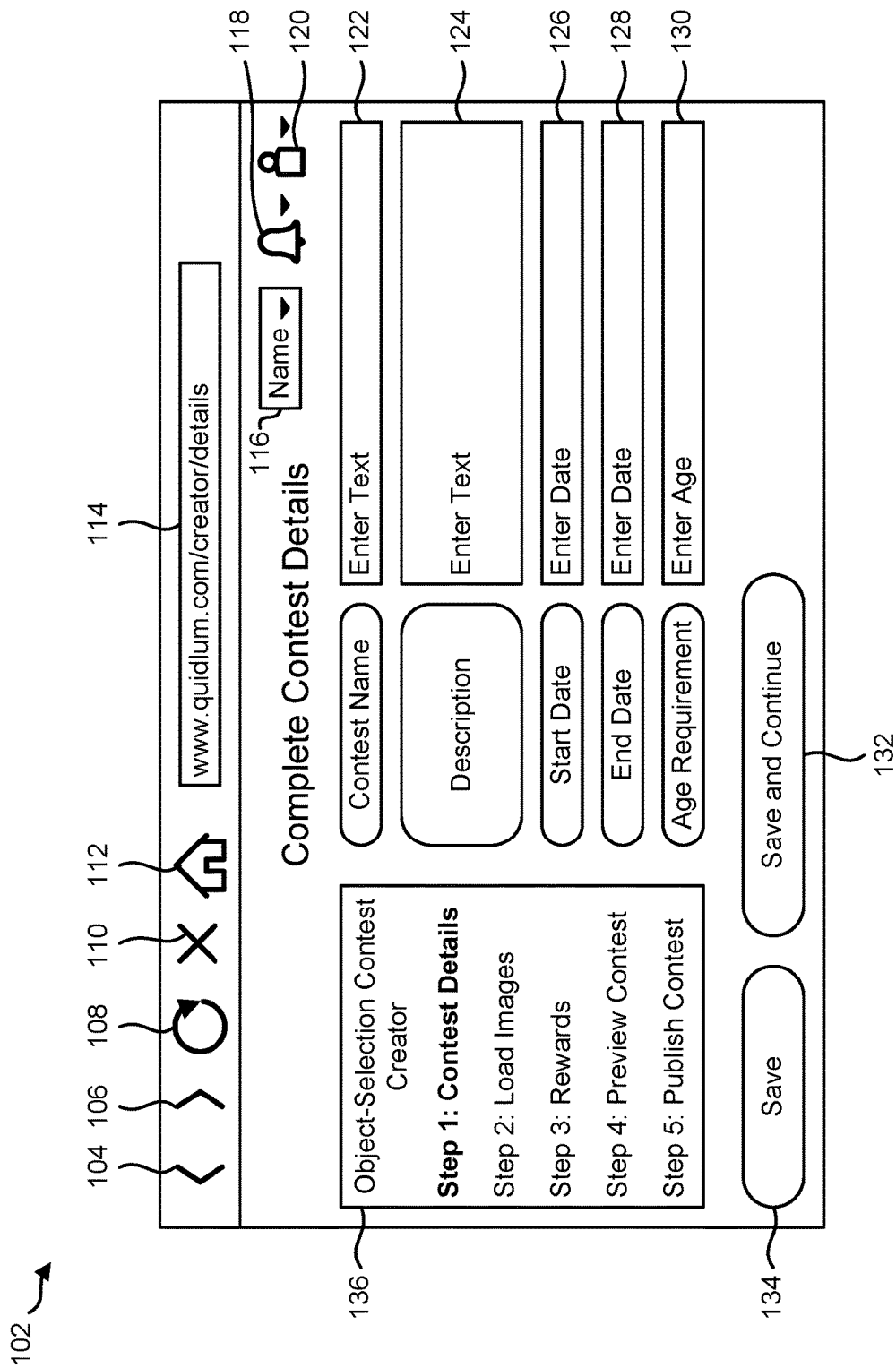
FIG. 1 is a diagram illustrating an example of a contest details interface for contest creation.

A computer program product for creating an online object-selection contest is described. The computer program product includes a non-transitory computer-readable medium. The computer program product also includes computer program code, stored on the non-transitory computer-readable medium, configured to cause a set of one or more processors to perform the step of presenting a load selectable data object specification interface. The computer program code is also configured to cause the set of one or more processors to perform the step of receiving, via the load selectable data object specification interface, selectable objects data specifying two or more selectable data objects. Each of the two or more selectable data objects specifies a visually perceptible element. The computer program code is further configured to cause the set of one or more processors to perform the step of storing, in memory, the selectable objects data specifying two or more selectable data objects. The computer program code is additionally configured to cause the set of one or more processors to perform the step of presenting a required number specification interface. The computer program code is also configured to cause the set of one or more processors to perform the step of receiving, via the required number specification interface, required number data specifying a required number of the selectable data objects. The required number is less than the two or more selectable data objects. The computer program code is further configured to cause the set of one or more processors to perform the step of storing, in the memory, the required number data specifying the required number. The computer program code is additionally configured to cause the set of one or more processors to perform the step of calculating at least one odds value based on the required number and a total number of the two or more selectable objects. The at least one odds value represents a probability of selecting one set of the required number of the selectable data objects from all possible sets of the required number of the selectable data objects. The computer program code is also configured to cause the set of one or more processors to perform the step of presenting a reward specification interface. The computer program code is further configured to cause the set of one or more processors to perform the step of receiving, via the reward specification interface, reward data specifying one or more rewards. The reward specification interface presents an association between each of the one or more rewards and at least one threshold number of matches with the one set of the required number of the selectable data objects. The computer program code is additionally configured to cause the set of one or more processors to perform the step of storing, in the memory, the reward data. The computer program code is also configured to cause the set of one or more processors to perform the step of generating executable code for accessing the online object-selection contest based on the two or more selectable data objects and the required number. The computer program code is further configured to cause the set of one or more processors to perform the step of receiving, from a plurality of remote computing devices, entry data specifying a set of entries. The entry data indicates a selected set of the selectable data objects for each entry in the set of entries. The computer program code is additionally configured to cause the set of one or more processors to perform the step of storing, in the memory, the entry data. The computer program code is also configured to cause the set of one or more processors to perform the step of randomly selecting one set of the required number of the selectable data objects from among the two or more selectable data objects. The computer program code is further configured to cause the set of one or more processors to perform the step of comparing, for each entry in the set of entries, the selected set of the selectable data objects to the randomly selected one set of the required number of the selectable data objects to determine a number of matches with the randomly selected one set of the required number of the selectable data objects. The computer program code is additionally configured to cause the set of one or more processors to perform the step of determining whether each entry in the set of entries is eligible for the one or more rewards based on the number of matches and the at least one threshold number of matches.

The computer program code may be configured to cause the set of one or more processors to perform the step of presenting a contest start condition specification interface. The computer program code may also be configured to cause the set of one or more processors to perform the step of receiving, via the contest start condition specification interface, contest start condition data. The contest start condition data may specify a start time. The computer program code may be further configured to cause the set of one or more processors to perform the step of storing, in the memory, the contest start condition data. The computer program code may be additionally configured to cause the set of one or more processors to perform the step of presenting a contest end condition specification interface. The computer program code may also be configured to cause the set of one or more processors to perform the step of receiving, via the contest end condition specification interface, contest end condition data. The contest end condition data may specify at least one of an end time, a total number of entries, or a number and type of rewards won. The computer program code may be further configured to cause the set of one or more processors to perform the step of storing, in the memory, the contest end condition data. The computer program code may be additionally configured to cause the set of one or more processors to perform the step of determining, when the entry data is received, whether the contest is active based on the contest start condition data and the contest end condition data. The computer program code may also be configured to cause the set of one or more processors to perform the step of storing, in the memory, only entry data that is received when the contest is active.

The computer program code may be further configured to cause the set of one or more processors to perform the step of receiving user input indicating a selection of at least one of the end time, the total number of entries, or the number and type of rewards won.

The computer program code may be further configured to cause the set of one or more processors to perform the step of presenting a contest bonus specification interface. The computer program code may be additionally configured to cause the set of one or more processors to perform the step of receiving, via the contest bonus specification interface, contest bonus data specifying one or more contest bonuses. Each contest bonus may indicate an additional contest opportunity in exchange for a specified bonus action including at least one of sharing content, generating contest invitations, indicating praise of content, accessing online content, indicating online event attendance, following an account, completing a survey, propagating content, or subscribing to content. The computer program code may also be configured to cause the set of one or more processors to perform the step of storing, in the memory, the contest bonus data.

The computer program code may be further configured to cause the set of one or more processors to perform the step of performing a bonus action on behalf of a user in response to user input. The computer program code may be additionally configured to cause the set of one or more processors to perform the step of providing the additional contest opportunity to a participant in a case that the bonus action is performed successfully.

The computer program code may be further configured to cause the set of one or more processors to perform the step of determining, based on the entry data, a number of contest participants, a number of bonuses claimed, and a number of entries. The computer program code may be additionally configured to cause the set of one or more processors to perform the step of presenting an active contests interface. The active contests interface may indicate a number of participants and a number of bonus actions performed for one or more active contests, executable code for accessing the one or more active contests, analytics of the one or more active contests comprising at least one of traffic sources, number of views over time, or number of entries over time, a participant list for the one or more active contests, build information of the one or more active contests, and a demo of the one or more active contests. The computer program code may also be configured to cause the set of one or more processors to perform the step of presenting a finished contests interface.

The computer program code may be further configured to cause the set of one or more processors to perform the step of obtaining cost data associated with one or more reward redemptions for the object-selection contest. The computer program code may be additionally configured to cause the set of one or more processors to perform the step of obtaining earnings data associated with the one or more reward redemptions for the object-selection contest. The computer program code may also be configured to cause the set of one or more processors to perform the step of calculating a return on investment based on the cost data and the earnings data. The computer program code may be additionally configured to cause the set of one or more processors to perform the step of presenting a return on investment interface indicating the return on investment.

The computer program code may be further configured to cause the set of one or more processors to perform the step of receiving, via the reward specification interface, one or more reward redemption codes.

Calculating the at least one odds value may include calculating an odds value for a maximum number of matches and for each positive integer number of matches less than the maximum number of matches. At least one reward may be specified for at least two numbers of matches.

The executable code may include instructions for accessing the object-selection contest when embedded in a webpage.

A method for creating an online object-selection contest is also described. The method includes presenting, by at least one of a set of one or more processors, a load selectable data object specification interface. The method also includes receiving, by at least one of the set of one or more processors, via the load selectable data object specification interface, selectable objects data specifying two or more selectable data objects. Each of the two or more selectable data objects specifies a visually perceptible element. The method further includes storing, in at least one of a set of one or more memories, the selectable objects data specifying two or more selectable data objects. The method additionally includes presenting, by at least one of the set of one or more processors, a required number specification interface. The method also includes receiving, by at least one of the set of one or more processors, via the required number specification interface, required number data specifying a required number of the selectable data objects. The required number is less than the two or more selectable data objects. The method further includes storing, in at least one of the set of one or more memories, the required number data specifying the required number. The method additionally includes calculating, by at least one of the set of one or more processors, at least one odds value based on the required number and a total number of the two or more selectable objects. The at least one odds value represents a probability of selecting one set of the required number of the selectable data objects from all possible sets of the required number of the selectable data objects. The method further includes presenting, by at least one of the set of one or more processors, a reward specification interface. The method additionally includes receiving, by at least one of the set of one or more processors, via the reward specification interface, reward data specifying one or more rewards. The reward specification interface presents an association between each of the one or more rewards and at least one threshold number of matches with the one set of the required number of the selectable data objects. The method also includes storing, in at least one of the set of one or more memories, the reward data. The method further includes generating, by at least one of the set of one or more processors, executable code for accessing the online object-selection contest based on the two or more selectable data objects and the required number. The method additionally includes receiving, by at least one of the set of one or more processors, from a plurality of remote computing devices, entry data specifying a set of entries. The entry data indicates a selected set of the selectable data objects for each entry in the set of entries. The method also includes storing, in at least one of the set of one or more memories, the entry data. The method further includes randomly selecting, by at least one of the set of one or more processors, one set of the required number of the selectable data objects from among the two or more selectable data objects. The method additionally includes comparing, by at least one of the set of one or more processors, for each entry in the set of entries, the selected set of the selectable data objects to the randomly selected one set of the required number of the selectable data objects to determine a number of matches with the randomly selected one set of the required number of the selectable data objects. The method also includes determining, by at least one of the set of one or more processors, whether each entry in the set of entries is eligible for the one or more rewards based on the number of matches and the at least one threshold number of matches.

A set of one or more computing devices for creating an online object-selection contest is also described. The set of one or more computing devices includes a set of one or more memory units and a set of one or more processors in electronic communication with at least one of the set of one or more memory units. The one or more processors are configured to present a load selectable data object specification interface. The one or more processors are also configured to receive, via the load selectable data object specification interface, selectable objects data specifying two or more selectable data objects. Each of the two or more selectable data objects specifies a visually perceptible element. The one or more processors are further configured to store, in at least one of the one or more memory units, the selectable objects data specifying two or more selectable data objects. The one or more processors are additionally configured to present a required number specification interface. The one or more processors are also configured to receive, via the required number specification interface, required number data specifying a required number of the selectable data objects. The required number is less than the two or more selectable data objects. The one or more processors are further configured to store, in at least one of the one or more memory units, the required number data specifying the required number. The one or more processors are additionally configured to calculate at least one odds value based on the required number and a total number of the two or more selectable objects. The at least one odds value represents a probability of selecting one set of the required number of the selectable data objects from all possible sets of the required number of the selectable data objects. The one or more processors are also configured to present a reward specification interface. The one or more processors are further configured to receive, via the reward specification interface, reward data specifying one or more rewards. The reward specification interface presents an association between each of the one or more rewards and at least one threshold number of matches with the one set of the required number of the selectable data objects. The one or more processors are further configured to store, in at least one of the one or more memory units, the reward data. The one or more processors are also configured to generate executable code for accessing the online object-selection contest based on the two or more selectable data objects and the required number. The one or more processors are further configured to receive, from a plurality of remote computing devices, entry data specifying a set of entries. The entry data indicates a selected set of the selectable data objects for each entry in the set of entries. The one or more processors are additionally configured to store, in at least one of the one or more memory units, the entry data. The one or more processors are also configured to randomly select one set of the required number of the selectable data objects from among the two or more selectable data objects. The one or more processors are further configured to compare, for each entry in the set of entries, the selected set of the selectable data objects to the randomly selected one set of the required number of the selectable data objects to determine a number of matches with the randomly selected one set of the required number of the selectable data objects. The one or more processors are additionally configured to determine whether each entry in the set of entries is eligible for the one or more rewards based on the number of matches and the at least one threshold number of matches.

Some configurations of the systems and methods disclosed herein relate to providing contests (e.g., a contest management platform). Some configurations may include approaches for creating, displaying, and/or managing a contest (e.g., giveaway) in which one or more rewards (e.g., prizes, merchandise, discounts, etc.) may be awarded. The contest may be presented (e.g., displayed) in a news feed, timeline, image feed, video feed, blog, and/or other format. For example, the contest may be presented in a social network environment and/or a dedicated contest feed.

Some configurations of the contest management platform may enable creation of a contest, presentation of the contest, and/or other management of the contest. For example, a contest sponsor may utilize the contest management platform to create a contest on the Internet. The contest may be presented on a contest website and/or on a third-party platform (e.g., social media website). The contest management platform may receive entries and determine one or more winners. It should be noted that one or more contests may offer one or more rewards at no cost to a user and/or to a user account.

Some configurations of the systems and methods disclosed herein may include generating a contest (e.g., giveaway, competition, game of chance, and/or game of skill, etc.). Some approaches may include attaching an informational link associated with at least one of the contest activities to at least one feed item, potentially limiting access to the contest activity feed item(s) to a predetermined set of viewers, and/or assigning an order to the contest feed item(s).

Some configurations may include one or more approaches for integrating with a sales system (e.g., company sales system) such that contest rewards can be automatically created, tracked, and/or managed. For example, the systems and methods may create a reward from a company on the platform for a $10 gift card that can be used on the brand's e-commerce website. The reward may be added to a contest for the brand. Assume that 100 people will be selected to win the reward. The integration in place between the contest platform and the brand's sales system may allow the contest platform to automatically create 100 unique reward codes in the brand's sales system that may allow the recipient of the code to redeem the code on an e-commerce website or at a brick-and-mortar location. Reward code data may also be stored in the contest platform. Details and/or analytics of code use, return on investment (ROI), revenue generated from the contest, and/or rewards may be tracked on the contest platform.

Some configurations of the systems and methods may include presenting contest feed items (e.g., displaying games of chance or skill) in an assigned order to at least one viewing user or a predetermined set of viewers. Some approaches may include dynamically limiting the number of contest feed items presented. For example, contest feed items may be dynamically limited based on brand defined requirements of entrants (e.g., age, location, device type, and/or engagement history with brands, etc.). Additionally or alternatively, contests may be limited based on algorithmic determinations. For instance, an algorithm may determine which contests to present based on which contests a user is more likely to enter, more likely to redeem a reward from, more likely to complete bonus actions for, more likely to result in increased ROI, sales, and/or other metrics for the sponsoring brands, etc.

Some configurations of the systems and methods may include presenting (e.g., displaying) results of one or more contests (e.g., games of chance or skill). In some approaches, the results may be presented as feed items so that the feed items may be presented to a defined set of one or more users (e.g., contest participants and/or an algorithmically defined set of users) so that the set of users may see the contest results featured in their feed. For example, a feed item may include contest results, lists of contest winners, prize results, and/or attached informational links. An informational link, if clicked by a contest participant or a contest winner, may navigate to a different webpage and/or may dynamically change the feed item to feature additional information about a user's entry (e.g., may show a reward code or a fillable form to collect additional information needed to send a reward).

Some configurations may provide a mechanism for sharing and/or giving a reward to a user from a contest winner. For example, the reward may be given to one or more contacts that the contest winner is connected to through a platform (e.g., a central platform, Facebook friends, Instagram followers, etc.). Additionally or alternatively, the reward may be shared and/or given via a message (e.g., email, text message, etc.) link. The link may allow the message recipient to claim a code that was previously awarded to the contest winner.

Some configurations may create object-selection contests, object-overlay contests, and/or other contests (e.g., raffle contests) that feature brand images and/or products. For example, an object-selection contest or an object overlay contest may use brand products and/or images as variables that may be selected or removed based on received user input. As used herein, the term "image" may include still images, animations, videos, etc. In some configurations, an image may depict a product, service, location, and/or person. For example, an image used to depict a reward may depict a product, service, location (e.g., vacation, store location, etc.), and/or a person (e.g., a celebrity meet-and-greet, a professional in an industry, etc.). In various configurations, an image may be associated with one or more sponsors and/or vendors (e.g., vendors of products, brand names, etc.).

Some configurations may provide a central platform (e.g., website, feed, etc.) that may track all contest entries, results, rewards, reward codes, and/or available contests for users (e.g., contest entrants). In some approaches, the central platform may allow users to enter contests from the platform (e.g., website, feeds, etc.).

Some configurations may provide a dynamic terms and conditions engine. The terms and conditions engine may dynamically create a contest's terms and conditions. For example, the terms and conditions may be created using algorithms and/or preconfigured templates based upon contest and reward settings inputs defined by the contest creator.

Some configurations of the systems and methods disclosed herein may address one or more of the following problems and/or may provide one or more of the following benefits. As the Internet has grown, network traffic has become fragmented. For example, the wide variety of available websites has made it increasingly difficult for content providers to obtain a significant amount of network traffic. Some configurations of the systems and methods disclosed herein may ameliorate this problem by integrating platforms (e.g., social media, advertising, and/or e-commerce) and/or by providing improved user engagement. For example, some configurations may strongly engage user interest with the use of contests, which can be presented via a wide variety of formats (e.g., social media, entertainment websites, news feeds, etc.). This may enable a content provider (e.g., website) to acquire and maintain network traffic.

Some configurations may increase contest creation and management efficiency. For example, some configurations may integrate contest creation, contest management, and/or reward redemption. This may reduce and/or remove a significant amount of manual work for creating contests, managing contests, and/or providing contest rewards.

Another current problem is inefficacy in advertising. For example, advertising on social media websites has been viewed as ineffective, with users less likely to engage with e-commerce advertising that is hosted on the social media website. There has been a long-felt need in the industry to improve the value of advertising on social media websites. Some configurations of the systems and methods disclosed herein help to solve this problem by presenting engaging automated contests that are more likely to acquire and maintain network traffic. For example, network traffic may increase along with increased incentives. Automated contests may increase incentives for initially engaging with a content provider, for maintaining engagement with the content provider, for expanding engagement with a content provider, and/or for driving network traffic to a point of sale.

Some configurations may provide a benefit of calculating a return on investment (ROI). For example, some configurations may enable capturing one or more kinds of data (e.g., contest hosting cost, reward cost, and/or contest-associated earnings, etc.). These data may be utilized to calculate the ROI.

Some configurations may provide a benefit of automated generation of contest terms and conditions based on a user location. For example, different countries, states, counties, cities, regions, and/or geographic divisions may have different laws regarding contests. Some configurations may detect a user location and automatically generate contest terms and conditions based on the user location. This may help to ensure that each contest is executed in accordance with local law.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a diagram illustrating an example of a contest details interface 102 for contest creation. The contest details interface 102 may be presented (e.g., provided, served, sent, displayed, etc.) by a computing device. For example, a computing device may generate the contest details interface 102 based on instructions (e.g., code) and may display the contest details interface 102. In this example, the contest details interface 102 may include an object-selection contest creator navigator 136, a contest name field 122, a contest description field 124, a start date field 126, an end date field 128, an age requirement field 130, a save button 134, and/or a save and continue button 132. As used herein, the term "object" may refer to a data element (e.g., image, animation, photo, video, etc.) and/or programmatic object (e.g., text box, window, frame, label, etc.). An object may be represented (e.g., stored, transmitted, received, etc.) as a data object. For example, a data object may include data that constitutes a corresponding object. An object may be stored in memory as a data object. Additionally or alternatively, an object may be sent and/or received (over a link, connection, network, etc.) as a data object. The term "object" may refer to an object and/or to the data object used to represent the object. "Data" may comprise a single or a plurality of bits of data, which may, in some embodiments, be sent or transmitted within a single block of time or within discrete or temporally disparate blocks of time.

In various configurations, the navigator 136 may present a set of steps for creating a contest. For example, the navigator 136 may indicate a contest details step, a load images step, a rewards step, a preview contest step, and/or a publish contest step. In some approaches, each of the steps may be an operable object (e.g., button or link) that activates navigation between each of the steps of contest creation. For example, the computing device may receive an input (e.g., detect a click event, a tap event, etc.) corresponding to one of the steps. The computing device may navigate to an interface corresponding to the step indicated. It should be noted that although a set of particular steps for contest creation is illustrated in FIG. 1, different numbers and/or types of steps may be implemented. For instance, two or more of the steps may be combined and/or one or more of the steps may be divided.

Figure 2:
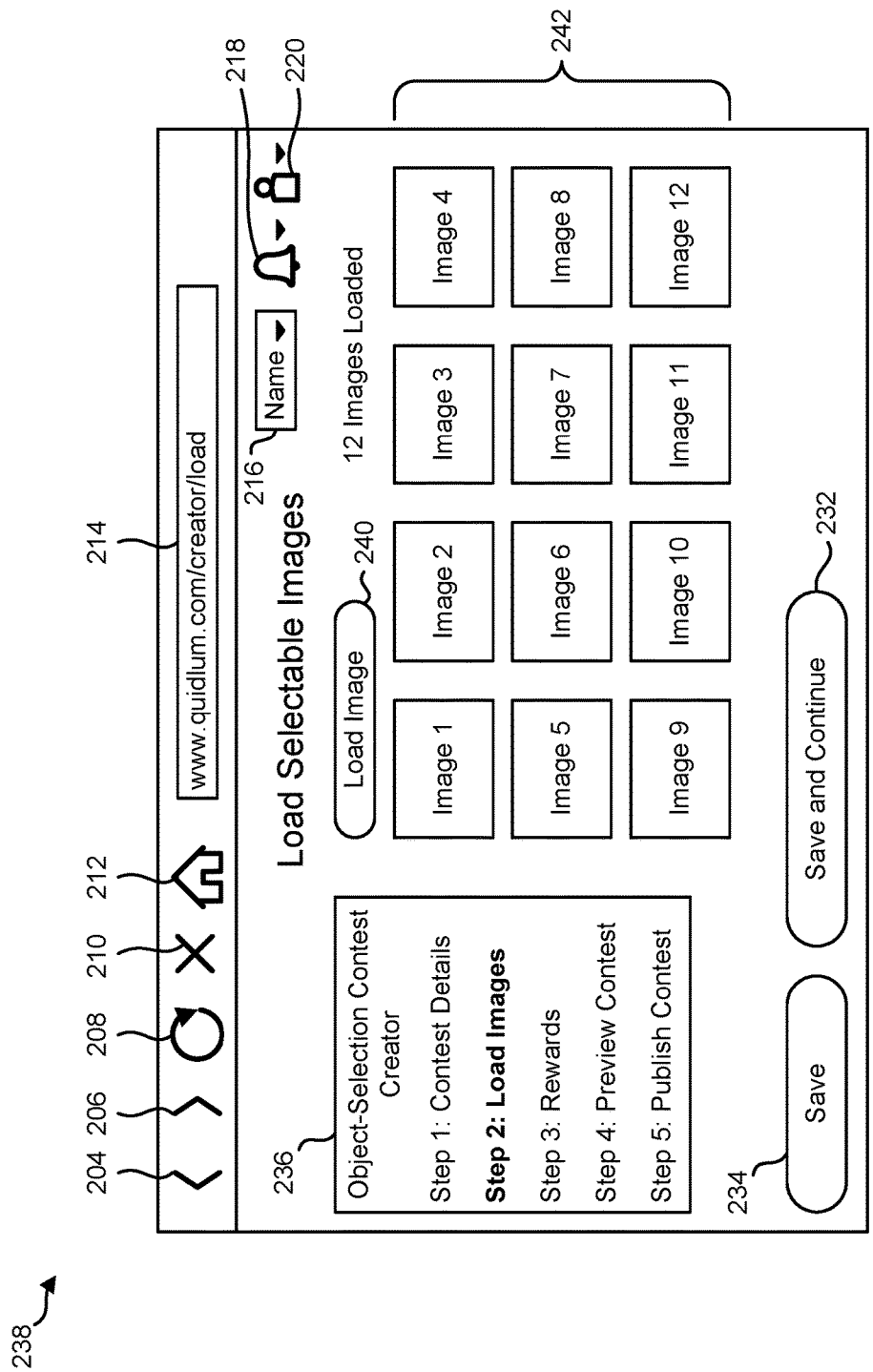
FIG. 2 is a diagram illustrating an example of a load selectable images interface for contest creation.

An example of an interface for the load images step is provided in connection with FIG. 2. An example of an interface for the rewards step is provided in connection with FIG. 3. In some configurations, the preview contest step may provide a preview of a contest (e.g., a preview of a participant view) based on one or more of the contest parameters obtained in the contest details step, the load images step, and/or the rewards step. In some configurations, the publish contest step may provide an interface for initiating contest presentation. For example, the publish contest step may provide a button that initiates contest presentation (e.g., posting the contest to one or more websites, making the contest details available to the public, etc.) upon detection of an event (e.g., click, tap, touch, etc.).

The contest name field 122 may receive and/or present a name for an object-selection contest. For example, the computing device may receive an input (e.g., detect keyboard inputs, touchscreen inputs, speech recognition inputs, one or more click events, one or more tap events, etc.) indicating a name (e.g., text name) for an object-selection contest. The computing device may store the contest name. For example, the computing device may store the contest name upon activation of the save button 134, upon activation of the save and continue button 132, and/or automatically. In some approaches, the contest name may be stored in memory (e.g., local memory and/or remote memory) as part of an object-selection contest instance and/or in a database for one or more contests.

The contest description field 124 may receive and/or present a description for an object-selection contest. For example, the computing device may receive an input (e.g., detect keyboard inputs, touchscreen inputs, speech recognition inputs, one or more click events, one or more tap events, etc.) indicating a description (e.g., text description) for an object-selection contest. The computing device may store the contest description. For example, the computing device may store the contest description upon activation of the save button 134, upon activation of the save and continue button 132, and/or automatically. In some approaches, the contest description may be stored in memory (e.g., local memory and/or remote memory) as part of an object-selection contest instance and/or in a database for one or more contests.

The contest start date field 126 may receive and/or present a start date for an object-selection contest. For example, the computing device may receive an input (e.g., detect keyboard inputs, touchscreen inputs, speech recognition inputs, one or more click events, one or more tap events, etc.) indicating a start date for an object-selection contest. The start date may be expressed in terms of calendar date, relative date, and/or time (e.g., Jan. 1, 2018 at 1:00 pm; 01/01/2018; Next Monday at 3 pm; etc.). In some configurations, an event to enter the start date may trigger presentation of an interactive calendar for date selection and/or presentation of an interface for selecting time. The computing device may store the contest start date. For example, the computing device may store the contest start date upon activation of the save button 134, upon activation of the save and continue button 132, and/or automatically. In some approaches, the contest start date may be stored in memory (e.g., local memory and/or remote memory) as part of an object-selection contest instance and/or in a database for one or more contests.

The contest end date field 128 may receive and/or present an end date for an object-selection contest. For example, the computing device may receive an input (e.g., detect keyboard inputs, touchscreen inputs, speech recognition inputs, one or more click events, one or more tap events, etc.) indicating an end date for an object-selection contest. The end date may be expressed in terms of calendar date, relative date, and/or time (e.g., Jan. 1, 2018 at 1:00 pm, 01/01/2018, Next Monday at 3 pm, etc.). In some configurations, an event to enter the end date may trigger presentation of an interactive calendar for date selection and/or presentation of an interface for selecting time. The computing device may store the contest end date. For example, the computing device may store the contest end date upon activation of the save button 134, upon activation of the save and continue button 132, and/or automatically. In some approaches, the contest end date may be stored in memory (e.g., local memory and/or remote memory) as part of an object-selection contest instance and/or in a database for one or more contests.

The contest age requirement field 130 may receive and/or present an age requirement for an object-selection contest. For example, the computing device may receive an input (e.g., detect keyboard inputs, touchscreen inputs, speech recognition inputs, one or more click events, one or more tap events, etc.) indicating an age requirement for an object-selection contest. The age requirement may be expressed in a number of years of age (e.g., 8, 12, 16, 18, etc.). The age requirement may indicate a minimum age needed to participate in the object-selection contest. In some configurations, an event to enter the age requirement may trigger presentation of an interactive calendar for date selection and/or presentation of an interface for selecting time. The computing device may store the contest age requirement. For example, the computing device may store the contest age requirement upon activation of the save button 134, upon activation of the save and continue button 132, and/or automatically. In some approaches, the contest age requirement may be stored in memory (e.g., local memory and/or remote memory) as part of an object-selection contest instance and/or in a database for one or more contests.

The save button 134 may function to initiate saving data for an object-selection contest. For example, if the save button 134 is activated (e.g., an event indicating an input corresponding to the save button 134 is detected), the computing device may save data in memory corresponding to one or more fields (e.g., contest name field 122, contest description field 124, contest start date field 126, contest end date field 128, and/or contest age requirement field 130) in memory (e.g., in a contest database).

The save and continue button 132 may function to initiate saving data for an object-selection contest and to navigate to a next step for object-selection contest creation. For example, if the save and continue button 132 is activated (e.g., an event indicating an input corresponding to the save and continue button 132 is detected), the computing device may save data in memory corresponding to one or more fields (e.g., contest name field 122, contest description field 124, contest start date field 126, contest end date field 128, and/or contest age requirement field 130) in memory (e.g., in a contest database) and may navigate to a next step (e.g., loading images). It should be noted that one or more of the fields (e.g., contest name field 122, contest description field 124, contest start date field 126, contest end date field 128, and/or contest age requirement field 130) may be referred to as an "interface," as one or more fields may be utilized to receive input data.

In some configurations, the contest details interface 102 may include and/or present one or more other elements (e.g., interface objects). For example, the contest details interface 102 may include a name dropdown 116. The name dropdown 116 may present a brand name, may enable selection between multiple brand names, may present a contest sponsor name and/or may enable selection between multiple contest sponsor names. For instance, the name dropdown 116 may present the name of the current contest sponsor (e.g., a company name, an individual name, etc.). If the name dropdown 116 is selected (e.g., an event indicating an input corresponding to the name dropdown 116 is detected), the name dropdown 116 may present and enable selection of one of multiple potential sponsor names. This may allow selection of (e.g., management of) contests for multiple different sponsors. In some approaches, the contest sponsor name (as indicated by the name dropdown 116, for example) may be presented when the contest is accessed (e.g., "Company A is giving away free shoes!"). In some examples, the name dropdown 116 may be a quick selector that allows selection of a brand that is being currently managed. For instance, if a contest for Brand A is being created and then the name dropdown 116 is used to switch to Brand B, the current work for Brand A may be saved and/or navigation may proceed to a dashboard for Brand B.

In some configurations, the contest details interface 102 may include and/or present a notification dropdown 118. The notification dropdown 118 may present an indication of one or more notifications. For instance, the notification dropdown 118 may present a number of notifications. Notifications may indicate one or more events (e.g., contest begun, contest ended, winner selected, rewards redeemed, incomplete contest creations, etc.). If the notification dropdown 118 is selected (e.g., an event indicating an input corresponding to the notification dropdown 118 is detected), the notification dropdown 118 may present and enable selection of one of multiple notifications. This may allow communication of events and/or navigation to more details regarding the notifications. In some approaches, a number of notifications may be superimposed over all or a portion of the notification dropdown 118 to indicate a number of new (e.g., unviewed) notifications.

In some configurations, the contest details interface 102 may include and/or present an account dropdown 120. The account dropdown 120 may present an indication of one or more account actions (e.g., sign in, sign out, change account, account details, account settings, etc.). The account actions may indicate one or more actions that may be taken for or in connection with an account. If the account dropdown 120 is selected (e.g., an event indicating an input corresponding to the account dropdown 120 is detected), the account dropdown 120 may present and enable selection of one of the account actions. This may allow account control and/or navigation to more details regarding an account. An account may be associated with a user (e.g., individual, company, etc.) authorized to create contests.

In the example given in FIG. 1, the contest details interface 102 may be presented in a browser (e.g., web browser). For instance, the contest details interface 102 may include a toolbar with a back button 104, a forward button 106, a refresh button 108, a stop loading button 110, and/or a home button 112. The contest details interface 102 may also include an address field 114. The address field 114 may receive and/or display address (e.g., uniform resource locator (URL)) information. For example, the address field 114 may receive address information input with an input device (e.g., touch screen, keyboard, mouse, etc.) and/or populated with a link. In some configurations, a contest platform (e.g., contest creation, presentation, and/or management platform) may be accessed remotely over a network (e.g., the Internet) using a browser. It should be noted that the contest details interface 102 may not be presented in a browser in some configurations and/or instances. For example, the contest details interface 102 may alternatively be presented in a local application window.

FIG. 2 is a diagram illustrating an example of a load selectable images interface 238 for contest creation. The load selectable images interface 238 may be presented (e.g., provided, served, displayed, etc.) by a computing device. For example, a computing device may generate the load selectable images interface 238 based on instructions (e.g., code) and may present the load selectable images interface 238. In this example, the load selectable images interface 238 may include an object-selection contest creator navigator 236, a load image button 240, a selectable images area 242, a save button 234, and/or a save and continue button 232.

The load image button 240 may function to initiate loading one or more selectable images for an object-selection contest. If the load image button 240 is activated (e.g., an event indicating an input corresponding to the load image button 240 is detected), the computing device may present an interface for identifying a selectable image. For example, the interface may receive one or more addresses of image files for loading to a contest. One or more addresses may be local or remote. For instance, an address may identify a path to a locally stored image file (in, for example, computing device local storage, locally coupled storage (e.g., thumb drive, external hard drive, optical disc drive, etc.), etc.) or to a remotely stored image file (e.g., image file at a web address, a network address, etc.). The computing device may present one or more of the identified selectable images in the selectable images area 242. For example, each identified selectable image or other representation (e.g., a thumbnail image) of the identified selectable image may be presented in the selectable images area 242. As used herein, the term "selectable image" may refer to one or more of a selectable static image, selectable photo, selectable animation, and/or selectable video. It should also be noted that other elements besides selectable images may be utilized in accordance with some configurations of the systems and methods disclosed herein. Any selectable object such as a selectable image, selectable programmatic object (e.g., field, text box, radio button, etc.), selectable sound, etc., or combination thereof may be utilized. In some configurations, one or more selectable objects may be visually perceptible elements. In the example illustrated in FIG. 2, 12 images have been loaded and are presented in the selectable images area 242.

The navigator 236 may present a set of steps for creating a contest. For example, the navigator 236 may include elements and/or function as described in connection with the corresponding element of FIG. 1.

The save button 234 may function to initiate saving data for an object-selection contest. For example, if the save button 234 is activated (e.g., an event indicating an input corresponding to the save button 234 is detected), the computing device may save data in memory corresponding to the selectable images (and/or other object(s)). The save and continue button 232 may function to initiate saving data for an object-selection contest and to navigate to a next step for object-selection contest creation. For example, if the save and continue button 232 is activated (e.g., an event indicating an input corresponding to the save and continue button 232 is detected), the computing device may save data in memory corresponding to the selectable images (and/or other object(s)) and may navigate to a next step (e.g., rewards). It should be noted that the load image button 240 and/or the selectable images area 242 may be referred to as an "interface" for loading one or more images (and/or objects).

In various configurations, the load selectable images interface 238 may include an order interface (not shown in FIG. 2) that enables specification of a winning order of selectable objects (e.g., images). For example, the order interface may receive a selection order (e.g., a sequence of clicks, taps, touches, a number sequence, etc.) indicating a selection order to be eligible for a reward. The order may be an additional eligibility condition in various configurations.

In some configurations, the load selectable images interface 238 may include and/or present one or more other elements (e.g., interface objects). For example, the load selectable images interface 238 may include a name dropdown 216, a notification dropdown 218, and/or an account dropdown 220. The name dropdown 216, the notification dropdown 218, and/or the account dropdown 220 may function similarly to corresponding elements described in connection with FIG. 1.

In the example given in FIG. 2, the load selectable images interface 238 may be presented in a browser (e.g., web browser). For instance, the load selectable images interface 238 may include a toolbar with a back button 204, a forward button 206, a refresh button 208, a stop loading button 210, and/or a home button 212. The load selectable images interface 238 may also include an address field 214, which may function as described in connection with the corresponding elements described in connection with FIG. 1. It should be noted that the load selectable images interface 238 may not be presented in a browser in some configurations and/or instances. For example, the load selectable images interface 238 may alternatively be presented in a local application window.

Figure 3:
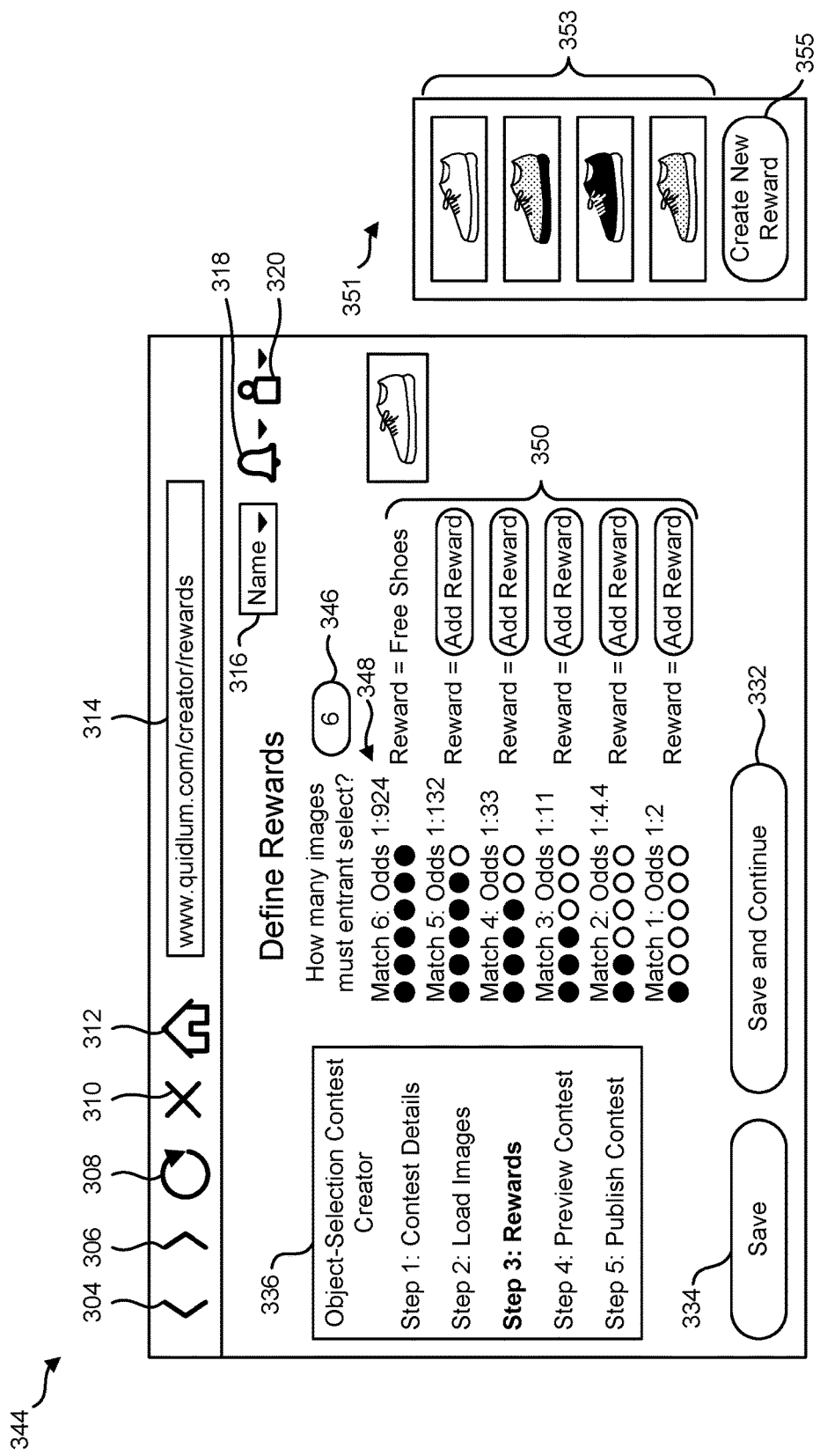
FIG. 3 is a diagram illustrating an example of a reward specification interface for contest creation.

FIG. 3 is a diagram illustrating an example of a reward specification interface 344 for contest creation. The reward specification interface 344 may be presented (e.g., provided, served, displayed, etc.) by a computing device. For example, a computing device may generate the reward specification interface 344 based on instructions (e.g., code) and may present the reward specification interface 344. In this example, the reward specification interface 344 may include an object-selection contest creator navigator 336, one or more add reward buttons 350, a required number field 346, an odds value label 348, a save button 334, and/or a save and continue button 332.

The add reward button(s) 350 may function to specify one or more rewards for an object-selection contest. If the add reward button(s) 350 is activated (e.g., an event indicating an input corresponding to the add reward button(s) 350 is detected), the computing device may present an interface 351 for identifying a reward (depicted by an image, text, and/or other object, for instance). For example, if an add reward button 350 is activated, the interface 351 may appear as a popup that displays a list of rewards 353 that have already been created and/or a create new reward button 355 to then create a reward. One or more of the list of rewards 353 may be selected based on a received input (e.g., user input). For instance, one or more of the list of rewards 353 may be clicked or touched to select the reward. If the create new reward button 355 is activated (e.g., clicked, touched, etc.), the interface 351 may receive reward data (e.g., image, photo, animation, video, text, symbol, character(s), visually perceptible element, programmatic object, etc.). For instance, the interface 351 may receive an address of an image file that depicts a reward. The address may be local or remote. An address may identify a path to a locally stored image file (in, for example, computing device local storage, locally coupled storage (e.g., thumb drive, external hard drive, optical disc drive, etc.), etc.) or to a remotely stored image file (e.g., image file at a web address, a network address, etc.). Additionally or alternatively, the computing device may present an interface for receiving text that identifies (e.g., describes) a reward. In the example illustrated in FIG. 3, one image depicting a shoe reward has been loaded and is presented in the reward specification interface 344. In some examples, a reward may be a commerce object (e.g., an item for sale by one or more vendors), may be of a particular brand, and/or may be associated with a vendor.

The required number field 346 may receive and/or present a required number of selectable objects for an object-selection contest. For example, the computing device may receive an input (e.g., detect keyboard inputs, touchscreen inputs, speech recognition inputs, one or more click events, one or more tap events, etc.) indicating required number data specifying a required number of selectable objects (e.g., images) for an object-selection contest. In some approaches, the required number may establish a number of the selectable objects that must be selected (by a user, for example) to participate in (e.g., for entry into) the object-selection contest. The computing device may store the required number. For example, the computing device may store the number requirement upon activation of the save button 334, upon activation of the save and continue button 332, and/or automatically. In some approaches, the required number may be stored in memory (e.g., local memory and/or remote memory) as part of an object-selection contest instance and/or in a database for one or more contests.

In various configurations, the reward specification interface 344 may include an order interface (not shown in FIG. 3) that enables specification of a winning order of selectable objects (e.g., images). For example, the order interface may receive a selection order (e.g., a sequence of clicks, taps, touches, a number sequence, etc.) indicating a selection order to be eligible for a reward. The order may be an additional eligibility condition in various configurations.

The odds value label 348 may present an odds value. The odds value may represent a probability of selecting one set (e.g., a winning set) of the required number of selectable objects (e.g., images). The computing device may calculate at least one odds value based on the required number of selectable objects and a total number of selectable objects. In the example shown in FIG. 3, the odds of selecting one set of 6 objects out of a total of 12 objects is 1:924. In some configurations, the computing device may calculate an odds value for a maximum number of matches and for each positive integer number of matches less than the maximum number of matches. As shown in the example of FIG. 3, 1:924 is the odds value 348 calculated for matching the maximum number (e.g., 6, the required number) of the one set (e.g., winning set), 1:132 is the odds value for matching 5 of the one set, 1:33 is the odds value for matching 4 of the one set, 1:11 is the odds value for matching 3 of the one set, 1:4.4 is the odds value for matching 2 of the one set, and 1:2 is the odds value for matching one of the one set. As illustrated in FIG. 3, a reward may be added for one or more of the number of matches. For example, free shoes may be a reward for matching 6 and free shoelaces may be a reward for matching 5.

The navigator 336 may present a set of steps for creating a contest. For example, the navigator 336 may include elements and/or function as described in connection with the corresponding element of FIG. 1.

The save button 334 may function to initiate saving data for an object-selection contest. For example, if the save button 334 is activated (e.g., an event indicating an input corresponding to the save button 334 is detected), the computing device may save data in memory corresponding to the required number of selectable objects and/or reward (s). The save and continue button 332 may function to initiate saving data for an object-selection contest and to navigate to a next step for object-selection contest creation. For example, if the save and continue button 332 is activated (e.g., an event indicating an input corresponding to the save and continue button 332 is detected), the computing device may save data in memory corresponding to the required number of selectable objects and/or reward(s) and may navigate to a next step (e.g., preview contest). It should be noted that the add reward button(s) 350 may be referred to as an "interface" for specifying one or more rewards. Additionally or alternatively, the required number field 346 may be referred to as an "interface" for specifying a required number of selectable objects.

In some configurations, the reward specification interface 344 may include and/or present one or more other elements (e.g., interface objects). For example, the reward specification interface 344 may include a name dropdown 316, a notification dropdown 318, and/or an account dropdown 320. The name dropdown 316, the notification dropdown 318, and/or the account dropdown 320 may function similarly to corresponding elements described in connection with FIG. 1.

In the example given in FIG. 3, the reward specification interface 344 may be presented in a browser (e.g., web browser). For instance, the reward specification interface 344 may include a toolbar with a back button 304, a forward button 306, a refresh button 308, a stop loading button 310, and/or a home button 312. The reward specification interface 344 may also include an address field 314, which may function as described in connection with the corresponding elements described in connection with FIG. 1. It should be noted that the reward specification interface 344 may not be presented in a browser in some configurations and/or instances. For example, the reward specification interface 344 may alternatively be presented in a local application window.

Figure 4:
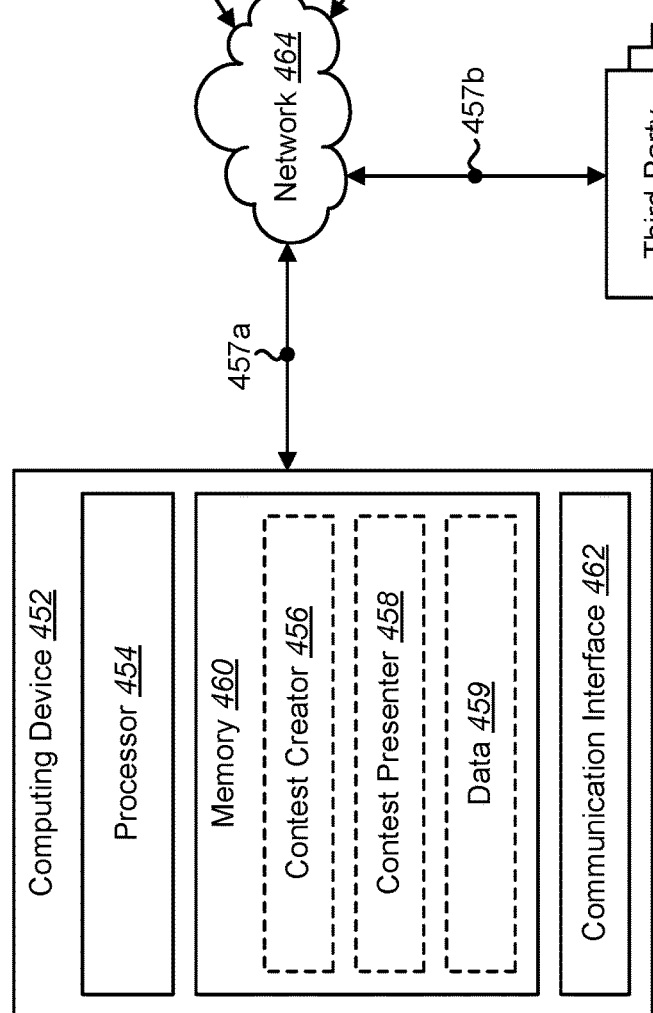
FIG. 4 is a block diagram illustrating a configuration of a computing device in which systems and methods for creating, managing and/or providing a contest may be implemented.

FIG. 4 is a block diagram illustrating a configuration of a computing device 452 in which systems and methods for creating, managing and/or providing a contest may be implemented. Examples of the computing device 452 may include, but are not limited to, desktop computers, laptop computers, servers, supercomputers, tablet devices, cellular phones, smartphones, gaming systems, etc. FIG. 4 also illustrates one or more sponsor devices 466 and one or more participant devices 468. Each sponsor device 466 and/or each participant device 468 may comprise one or more computing devices. Examples of the sponsor device(s) 466 may include, but are not limited to, desktop computers, laptop computers, servers, supercomputers, tablet devices, cellular phones, smartphones, gaming systems, etc. Examples of the participant device(s) 468 may include, but are not limited to, desktop computers, laptop computers, servers, supercomputers, tablet devices, cellular phones, smartphones, gaming systems, etc. It should be noted that the systems and methods disclosed herein may be implemented in any number of computing devices.

In some configurations, the computing device 452 may include one or more processors 454, memory 460, and/or a communication interface 462. The processor(s) 454 may be coupled to (e.g., in electronic communication with) the memory 460 and/or the communication interface 462. It should be noted that one or more of the elements illustrated in FIG. 4 may be optional. In particular, the computing device 452 may not include one or more of the elements illustrated in FIG. 4 in some configurations. For example, the computing device 452 may or may not include a communication interface 462. The processor(s) 454 may be one or more electronic processors. For example, the processor 454 may be implemented in integrated circuitry, transistors, registers, and/or memory cells, etc. In various implementations, the processor 454 may not be biologically-based (e.g., may not be a human or other biological brain).

The memory 460 may store instructions and/or data 459. The processor 454 may access (e.g., read from and/or write to) the memory 460. Examples of instructions and/or data 459 that may be stored by the memory 460 may include contest creator 456 instructions, contest presenter 458 instructions, selectable object(s) data (e.g., image data, animation data, video data, programmatic object data, etc.), background data, overlay object data, contest parameter data (e.g., contest name data, contest description data, contest start condition data, contest end condition data, age requirement data, required number data, contest bonus data, odds values data, reward data, redemption code(s), and/or redemption instructions, etc.), entry data, cost data, earnings data, ROI data, selected set data, number data, and/or other data.

The communication interface 462 may enable the computing device 452 to communicate with one or more other computing devices. For example, the communication interface 462 may provide an interface for wired and/or wireless communications. In some configurations, the communication interface 462 may be coupled to one or more antennas for transmitting and/or receiving radio frequency (RF) signals. Additionally or alternatively, the communication interface 462 may enable one or more kinds of wireline (e.g., Universal Serial Bus (USB), Ethernet, etc.) communication.

In some configurations, multiple communication interfaces 462 may be implemented and/or utilized. For example, one communication interface 462 may be a cellular (e.g., 3G, Long Term Evolution (LTE), CDMA, etc.) communication interface 462, another communication interface 462 may be an Ethernet interface, another communication interface 462 may be a universal serial bus (USB) interface, and yet another communication interface 462 may be a wireless local area network (WLAN) interface (e.g., Institute of Electrical and Electronics Engineers (IEEE) 802.11 interface).

In some configurations, the computing device 452 may utilize the communication interface(s) 462 to communicate with a network 464. Examples of the network 464 include the Internet, a wide area network (WAN), a local area network (LAN), a personal area network (PAN), and/or a combination thereof. In some configurations, the computing device 452 may communicate with one or more sponsor devices 466 and/or one or more participant devices 468. In various configurations, one or more kinds of data 457a-d may be sent and/or received. For example, the computing device 452, one or more sponsor devices 466, one or more participant devices 468, and/or one or more third-party devices 469 may send and/or receive data 457a-d. Examples of data 457a-d may include selectable object(s) data (e.g., image data, animation data, video data, programmatic object data, etc.), background object data, overlay object data, contest parameter data (e.g., contest name data, contest description data, contest start condition data, contest end condition data, age requirement data, required number data, contest bonus data, odds values data, reward data, redemption code(s), and/or redemption instructions, etc.), entry data, cost data, earnings data, ROI data, selected set data, number data, and/or other data.

A sponsor device 466 may be a computing device associated with and/or utilized by a sponsor (e.g., a sponsoring company, individual, business, etc.). For example, a sponsor may provide one or more rewards for one or more contests. In some approaches, the computing device 452 may receive information from the one or more sponsor devices 466 for creating a contest. For instance, the information may indicate (via an interface) a contest name, contest description, start condition, end condition, age requirement, one or more objects (e.g., image(s), animation(s), video(s), etc.), one or more rewards, and/or other contest information (e.g., a required number of selectable objects, specified odds, reward codes, bonuses, redemption instructions, redemption codes, reward description, cost data, earnings data, etc.).

A participant device 468 may be a computing device associated with and/or utilized by a participant of a contest. For example, a participant device 468 may provide entry information for one or more contests. For instance, the entry information may indicate an entry event, one or more selected objects, and/or one or more bonus actions. In some configurations, the participant device 468 may additionally or alternatively provide user identification information, user location information, etc.

The computing device 452 described in connection with FIG. 4 may be implemented as a sponsor device 466, as a participant device 468, or as a separate device (e.g., independent platform device). For example, the elements (e.g., processor(s) 454, memory 460, and/or communication interface 462) may be implemented in the sponsor device 466, in the participant device 468, or in a separate device. In some implementations, some functionality (e.g., contest creator 456 functionality, contest presenter 458 functionality, memory functionality, and/or communication functionality) may be distributed over multiple computing devices (e.g., over the computing device 452, the sponsor device(s) 466, the participant device(s) 468, and/or third-party device(s) 469). For example, a set of one or more processors in the computing device 452, sponsor device(s) 466, participant device(s) 468, and/or third-party device(s) 469 may perform one or more of the functions, actions, procedures, steps, and/or methods described herein.

In various configurations, data may be stored in one or more memory units. A memory unit may be a hardware device capable of storing electronic data. Examples of memory units include hard drives, random access memory (RAM) units, optical disc drives, solid state memory units, flash memory units, etc. In various configurations, each of the computing devices (e.g., computing device 452, sponsor device(s) 466, participant device(s) 468, and/or third-party device(s) 469) may include one or more memory units. One or more of the data and/or information described herein (e.g., selectable objects data, required number data, odds value(s), reward data, executable code, entry data, contest bonus data, number of contest participants, number of bonuses claimed, number of entries, analytics, participant list(s), build information, cost data, earnings data, ROI, contest start condition data, contest end condition data, user input, reward redemption codes, selected set data, threshold number of matches, background data, overlay data objects, number data, tickets, etc.) may be stored in one or more memory units on one or more of the computing devices. In various configurations, the data and/or information may be stored in a single memory unit and/or may be stored across multiple memory units.

In some configurations, the computing device 452 may include and/or be linked to one or more displays. The display(s) may be utilized to present one or more interfaces (e.g., user interfaces). For example, a user interface may enable a user to interact with the computing device 452. In some configurations, the display may be a touchscreen that receives input from physical touch (by a finger, stylus, or other tool, for example). Additionally or alternatively, the computing device 452 may include or be coupled to another input interface. For example, the computing device 452 may include a camera facing a user and may detect user gestures (e.g., hand gestures, arm gestures, eye tracking, eyelid blink, etc.). In another example, the computing device 452 may be coupled to a mouse and may detect a mouse click.

In some configurations, one or more sponsor devices 466 and/or one or more participant devices 468 may each include a processor, memory, and/or a communication interface. Additionally or alternatively, one or more sponsor devices 466 and/or one or more participant devices 468 may each include a display. In some implementations, the computing device 452 may present one or more interfaces on the sponsor device(s) 466 and/or the participant device(s) 468. For example, a sponsor device 466 may utilize a web browser application to request information from the computing device 452 over the network 464. The computing device 452 may present (e.g., provide, serve, etc.) interface data (e.g., a contest management interface, contest creation interface, etc.) to the sponsor device 466 for use (e.g., output, display, etc.) at the sponsor device 466. In another example, a participant device 468 may utilize a web browser application to request information from the computing device 452 over the network 464. The computing device 452 may present (e.g., provide, serve, etc.) interface data (e.g., contest entry interface, contest participant interface, etc.) to the participant device 468 for use (e.g., output, display, etc.) at the participant device 468.

The processor 454 may execute the contest creator 456 instructions. For example, the processor 454 may execute code stored in the memory 460 for creating one or more contests. The contest creator 456 instructions may be executed to create one or more contests (e.g., object-selection contest(s), object-overlay contest(s), and/or other contest(s)).

In some configurations, the computing device 452 may provide one or more contest platforms (e.g., a contest management platform and/or a contest participant platform). The contest creator 456 instructions may be included in contest management platform instructions. Additionally or alternatively, the contest presenter 458 instructions may be included in contest participant platform instructions. As used herein, the general term "contest platform" may refer to the contest management platform, the contest participant platform, or both.

The contest platform may (e.g., contest platform instructions may be executable to) provide one or more of the following features. The contest platform may enable creating contests from platform templates (e.g., object-selection contest, object-overlay contests, and/or raffle contests, etc.). One or more rewards may be specified (e.g., "created") via the contest platform. One or more objects (e.g., images, videos, animations, etc.) may be loaded for use in one or more contests. The contest platform may define contest settings and/or demographic criteria that specify contest visibility (e.g., which users are able see the contest in feeds) and/or participant eligibility (e.g., which users can enter a contest). The contest platform may manage application programming interface (API) integration(s) and/or sales system integration(s). For example, API integrations may enable the contest platform to perform one or more actions via other platforms. For instance, a computing device (e.g., a computing device employing an API) may be utilized to perform and/or track bonus actions on third-party platforms for contest bonuses. In some configurations, the computing device 452 (e.g., an API) may perform a bonus action on behalf of a user in response to user input. Additionally or alternatively, an API may be utilized to integrate the contest platform with one or more sales systems to determine and/or track sales associated with one or more contests. The contest platform may track contest return on investment (ROI).

In some configurations, the contest platform may track contest requests (e.g., contest entries). Additionally or alternatively, reward redemption and/or reward usage may be tracked by the contest platform. The contest platform may dynamically create contest terms and conditions that are compliant with laws for a location (e.g., city, state, federal, country law, etc.).

In some configurations, the contest platform may be accessed and/or utilized by one or more sponsors (e.g., companies, brands, users, etc.). The contest platform may enable partnering between sponsors (e.g., brands) to create a co-sponsored contest. For example, a contest may be created with rewards that are associated with both sponsors (e.g., brands) and may be integrated with sales systems for both sponsors. In this example, the computing device may only allow each sponsor access to details (e.g., ROI, analytics, etc.) associated with each sponsor's respective reward. The contest platform may enable partnering a sponsor with one or more influencers. For example, a sponsor's contest may be embedded in an influencer's website or an influencer may share a link to the contest and all entries and/or purchases associated with the influencer's marketing efforts may be tracked back to the specific influencer.

In various configurations, the contest platform (e.g., contest participant platform) may provide one or more of the following features, aspects, and/or functionality. The contest platform may perform tracking and/or presentation of all contests entered by a participant. Accordingly, a user may view all contests entered. The contest platform may perform tracking and/or presentation of all rewards won in contests. Accordingly, a user may view all rewards won. The contest platform may enable sharing rewards with friends and/or connections (by transferring rewards to a specific contact and/or by making a reward available to claim by friends and/or contacts, for example). This functionality can be hosted on a single dedicated website/application or interspersed in a social network. The contest platform may provide a search for contests that can be entered (by a particular user, for example). The contest platform may enable entering contests that can be searched for. The contest platform may message sponsors (e.g., brands) to coordinate prize redemption. The contest platform may message other contest entrants to coordinate with and/or invite friends and/or contacts to enter contests that may require users to complete a single entry as a group. The contest platform may update user information that may be shared with sponsors (e.g., brands) for reward fulfillment (e.g., name, address, phone number, email address, etc.).

In various configurations, the contest platform (e.g., contest participant platform) may provide one or more of the following functionalities. The contest platform may enable contest participants (e.g., entrants) to view (e.g., track) entered contests, which can be displayed as a single list view with all entries shown in one list, or in a feed as a feed item created by the entrants, with each entry being its own feed item showing the day and time the user entered the contest and the current contest state (e.g., active, finished, results, etc.). The contest results may be displayed as a single view with all results shown in one list, or in a feed as a feed item. If displayed as a feed item, the results may be shown in a user's feed at the appropriate time (which may be defined by an algorithm) and/or location in the feed when the contest has ended to increase the probability that the user would see the results. The contest platform may track when a user viewed the results. The contest platform (e.g., algorithm) may show results of a winning feed item at intervals to increase the probability that the participants will view the results and claim their rewards. Rewards (e.g., prizes) won may be displayed as a single view with all rewards won showing in one list, or in a feed with each reward being its own feed item. In some approaches, all rewards displayed may show the reward name, reward description, and/or reward expiration. The display (e.g., interface) may include a link to a website to redeem the reward and/or may include instructions about how to claim the reward.

In various configurations, the contest creator 456 instructions may create an object-selection contest. For example, the contest creator 456 instructions may provide an object-selection contest template that may be selected (by a sponsor, for instance) to build a contest on the contest management platform (e.g., central contest creation and/or management platform). An object-selection contest may include one or more of the following mechanics, features, and/or functionality.

In object-selection contest creation, a variable number of objects (e.g., images, videos, animations, etc.) may be loaded (from a sponsor, for example). The objects may act as variables that contest participants may select from to complete an entry (e.g., ticket). In various configurations, the objects may feature a commerce object (e.g., a brand product). In object-selection contest creation, the computing device 452 may determine which reward(s) will be given away to one or more users based on reward data (received from a sponsor, for example). The computing device 452 may determine whether one or more users are eligible for one or more rewards based on a selection (e.g., random selection, winning selection, etc.) of objects compared to a user's selection. For example, the computing device 452 (e.g., contest platform) may have a draw engine that automatically and randomly draws objects (e.g., variables) when the object-selection contest ends (e.g., at a given day and time).

In various configurations, contest drawing and/or results may be carried out in accordance with one or more of the following aspects. A contest draw engine may randomly draw a winner and/or contest results based on defined parameters. For example, object-selection contest results may only draw a defined number of variables from the total number available at the defined time. Raffle results may only draw a defined number of winners for each prize type being given away at the defined time. The drawing/results may show as a feed item in a social network so that the drawing and drawing results may be seen by contest participants and/or anyone else who sees the feed item. The actual drawing of the results as a feed item may display a computer-generated video/animation that literally shows results being drawn. This may allow people to view a drawing just as they would a live drawing on live television. The results may be shown as a feed item in a social network as just a static feed item (e.g., not a video/animation) that shows the results.

In some approaches, the results and drawing may be displayed as "dynamic" feed items, meaning that the content of a feed item may be different based upon whose feed the item is displayed in. A person who entered the contest and has their object selection or raffle numbers drawn may be shown something different than someone who did not enter the contest or who lost. This may include congratulatory messages, computer generated fireworks, and/or additional information about how to claim a prize.

Object-selection contest creation may define (based on received sponsor input, for example) how many selections must be drawn to win each reward (e.g., 6 of 6 matches corresponds to a grand prize, 5 of 6 matches corresponds to a lesser defined prize, etc.). The odds of winning may depend upon how many total objects (e.g., variables) are loaded and how many objects (e.g., variables) must be selected correctly to win.

In various configurations, an object-selection contest may be created that requires participants to enter as a group, with each user selecting a single object (e.g., variable). For example, a vacation giveaway for 6 people might require 6 different people to select a single object. If the group's selection is drawn (e.g., randomly selected), that group may win the reward.

In some configurations, for example, the contest creator 456 instructions may be executed to present (e.g., provide) one or more interfaces (e.g., contest name interface, contest description interface, start condition specification interface, end condition specification interface, age requirement interface, load selectable data object specification interface, required number specification interface, and/or reward specification interface, etc.) for object-selection contest creation. Additionally or alternatively, the contest creator 456 instructions may be executed to perform one or more functions for object-selection contest creation. For example, the contest creator 456 instructions may be executable to receive selectable objects data specifying selectable data objects (via the communication interface 462, for instance), store the selectable objects data specifying selectable data objects in memory 460, receive required number data specifying a required number, store the required number data specifying the required number in memory 460, calculate one or more odds values, receive reward data, store the reward data in memory 460, and/or generate executable code for accessing the contest(s), etc. In some configurations, the contest creator 456 instructions may be executable to randomly select the one set of the required number of the selectable data objects (e.g., the winning set).

In various configurations, the contest creator 456 instructions may create an object-overlay contest. For example, the contest creator 456 instructions may provide an object-overlay contest template that may be selected (by a sponsor, for instance) to build a contest on the contest management platform (e.g., central contest creation and/or management platform). An object-overlay contest may include one or more of the following mechanics, features, and/or functionality.

Object-overlay contest creation may define (based on received sponsor input, for example) one or more rewards and/or how many of each reward will be provided (e.g., awarded, given away, etc.). In various configurations, an overlay object may be removed (in response to user input, for example) from a digital ticket that may show a row of objects (e.g., images, videos, animations, etc.). In some approaches, the objects may depict commerce objects (e.g., brand products). If the row displays a defined combination of objects that match the defined reward, then the corresponding user may win the reward. One or more objects (e.g., images, videos, animations, etc.) may be loaded based on received input (from a user, sponsor, etc.). In various configurations, the computing device 452 (e.g., contest platform, contest engine, etc.) may automatically create a number of winning tickets using the loaded objects (e.g., images, videos, animations, etc.) based on one or more factors (e.g., defined odds, number of rewards, number of tickets to create, etc.). The one or more factors may be based on received interface (e.g., template) input (from one or more sponsors, for example).

In some configurations, for example, the contest creator 456 instructions may be executed to present (e.g., provide) one or more interfaces (e.g., contest name interface, contest description interface, start condition specification interface, end condition specification interface, age requirement interface, background object specification interface, and/or overlay object specification interface, etc.) for object-overlay contest creation. Additionally or alternatively, the contest creator 456 instructions may be executed to perform one or more functions for object-overlay contest creation. For example, the contest creator 456 instructions may be executable to receive background data specifying one or more background data objects (via the communication interface 462, for instance), store the background data specifying the background data object(s) in memory 460, receive one or more overlay data objects, store the overlay data object(s) in memory 460, receive reward data, store the reward data in memory 460, receive number data specifying a number of each of the one or more rewards, store the number data specifying the number(s) in memory 460, generate executable code for accessing the contest(s), generate a set of one or more winning tickets, generate a set of one or more losing tickets, etc.

The contest presenter 458 instructions may be executable to present a contest. For example, the processor 454 may execute code stored in the memory 460 for presenting one or more contests. In some configurations, the contest presenter 458 instructions may be executable to present an object-selection contest interface, receive (via the communication interface 462, for example) selected set data, store the selected set data in memory 460, compare the selected set to one set of selectable objects (e.g., the winning set), and/or determine whether an entry is eligible for one or more rewards based on the comparison. In some configurations, the contest presenter 458 instructions may be executable to randomly select the one set of the required number of the selectable data objects (e.g., the winning set).

In various configurations, one or more aspects of creating, running, entering, and/or managing an object-selection contest may be performed in conjunction with (e.g., on) a social media platform. For example, the contest may be displayed in a user's social media feed and/or the feed of the sponsor (e.g., advertiser brand). Creating an object-selection contest may be performed by a contest engine. The contest engine may enable defining the required number of variables for a participant (e.g., entrant) to select, defining the odds of winning a prize based on the number of variables participant must select and the total number of variables being selected from, and/or assigning rewards (e.g., prizes), which may be awarded to participants whose selected variables match the draw.

An object-selection contest may be entered by selecting a defined number of variables (e.g., objects) from the total number of variables displayed. In some approaches, users may earn the ability to select additional variables by initiating and/or completing bonus actions (e.g., sharing the contest on social media or some other defined action). Additionally or alternatively, users may earn the ability to complete additional tickets in the same contest instance by completing bonus actions.

In various configurations, creating, running, and entering an object-selection contest may be performed on a social network, which may require multiple people to select a single (or multiple) variables of a ticket. Participants may invite friends/connections through social media to join the ticket and select a required number of variables. Invited friends/connections may be able to see what variables have already been selected and then select their variables. A group that completes the ticket may win the reward as a group.

In some configurations, the contest presenter 458 instructions may be executable to randomly select a unique object-overlay ticket and/or present an object-overlay contest. For example, the contest presenter 458 instructions may be executable to present (e.g., provide, serve, etc.) the unique object-overlay ticket. The unique object-overlay ticket may be responsive to user input to remove a portion of the one or more overlay objects, and/or present a portion of the one or more background objects.

In various configurations, an object-overlay contest may be created and/or presented in accordance with one or more of the following aspects. Creating, running, entering, and managing an object-overlay contest may be performed in conjunction with (e.g., on) a social media platform. The contest may be displayed in a user's social media feed and/or in the feed of the sponsor (e.g., advertiser brand).

An object-overlay contest may be created using a contest engine, which may enable defining the reward types, defining the number of each reward (for distribution), defining the total number of tickets, and/or defining the pattern the object-overlay ticket will use. For example, the contest engine may support multiple patterns such as: a single line of 3 images, a 3×3 grid of images, a single image, and/or any other pattern. The contest engine may define which images, when revealed, win which reward (e.g., reward to image matrix). The contest engine may load/select images which may be used in the object-overlay contest. In various configurations, the contest engine may create an object-overlay ticket by creating unique tickets (e.g., images) prior to tickets being claimed and then randomly present tickets as they are claimed. The contest engine may create the unique object-overlay tickets, whose data may be stored in a database, and then may create the tickets dynamically in a user's browser using HTML5, cascading style sheets (CSS), and/or JavaScript, etc., based upon the database details.

Object-overlay contests may be entered by signing in to an account to track contest details and/or removing a defined area (e.g., overlay object) of the displayed contest to reveal predetermined images as defined by the contest engine. Removing the defined area may include rubbing, clicking, and/or moving a mouse over the area. If the images/variables revealed match those for a reward, then the user may have won a reward and may be assigned the reward or given further instructions on how to claim the prize.

In various configurations, one or more contests may include one or more of the following features. For example, a contest created in the central contest platform (e.g., contest creation and/or management platform) may include one or more of the following mechanics, features, and/or functionality. Contests may have one or more associated bonuses. A bonus may specify one or more bonus actions. If the one or more bonus actions are completed, a contest participant may be provided with one or more additional contest opportunities. For example, a contest participant may be provided one or more additional tickets for an object-overlay contest, one or more additional tickets for an object-selection contest, selection of additional variables (e.g., objects) for an object-selection contest, and/or one or more bonus entries. Examples of bonus actions may include sharing a contest on social media, inviting social media connections to enter a contest, signing up for a mailing list, completing a survey, visiting a website, etc.

In various configurations, a contest may require the creation of a central user account for a contest participant (e.g., entrant). The user account may be used to enter all contests built on the contest platform. The user account may allow tracking all of a participant's contests.

One or more contest interfaces may be dynamic. For example, if a user returns to view a contest after the user has entered the contest, the interface may provide information relevant to the user (e.g., contest results, one or more reward codes, a message saying to be sure to enter next time, etc.).

A contest may include dynamic terms and conditions. The terms and conditions may be created when the contest is created (for a sponsor, for example) and may change based on a user's geographic information (e.g., state, city, country, etc.). In this way, the contest may comply with applicable laws and regulations. In various configurations, the terms and conditions may be created by a terms and conditions engine on the computing device 452.

Various configurations of the systems and methods disclosed herein may provide dynamic terms and conditions. For instance, a terms and conditions engine may take contest creator inputs (e.g., dates, age requirements, entry methods, etc.) and may create unique terms and conditions that may be shown to participants based on geographic laws and regulations. The following details may provide examples of how dynamic terms and conditions may be produced. A company may create a contest that allows people of a minimum 18 years of age to enter. However, some geographic regions may require a person to be 21 to enter a contest or win a certain prize (e.g., alcohol, rental cars, cigarettes, travel, etc.). In the more restrictive region, a person entering from said region may agree to the terms and conditions that abide by that region's laws/regulations. The contest may dynamically change and/or operate differently to comply with laws/regulations/terms and conditions in different geographic regions. For example, a person who is 18 may be allowed to enter a contest in Utah, while a person the same age may be denied entry into the contest in New York due to different laws/regulations. In various configurations, users must enter their age when signing up to enter contests. This may enable the contest platform to ensure that users are eligible to enter. Terms and conditions may include standard information that contest sponsors may enter when creating contests, which may include one or more of the following (and/or may not be limited to the following): age requirements, geographic requirements to enter, prizes being given away (with Estimated Retail Value), how rewards may be redeemed, expiration on rewards, contest administrator information, contest sponsor(s), contest administrator address, contest description, and/or contest mechanics.

In various configurations, the computing device 452 may automatically create one or more contests. For example, upon completion of a contest, the computing device 452 may compare a calculated ROI of the contest with an ROI threshold. In a case that the ROI meets or exceeds the ROI threshold, the computing device 452 may automatically request rewards (e.g., reward code(s), reward description, etc.) from a sponsor device 466. In some approaches, the sponsor device 466 may be configured to automatically send reward information (e.g., reward codes, reward description, etc.) to the computing device 452. The computing device 452 may then automatically create a contest and/or publish the contest based on the rewards indicated by the sponsor device 466. This may enable automatic promotion of the sponsor's product(s) without the need to continually set up new promotions manually.

In various configurations, the computing device 452 may be utilized to create and/or publish various kinds of contests. For example, the computing device 452 may create and/or publish one or more object-selection contests, one or more object-overlay contests, and/or one or more raffle contests. For instance, the computing device 452 may provide a raffle contest template that sponsors (e.g., brands) may select to build a contest from on the contest platform (e.g., central contest creation and/or management platform). The raffle contest may include one or more of the following mechanics, features, and/or functionality. A sponsor may select one or more rewards that participants can win and/or may define how many of each reward will be given away. Users may enter the contest and may be assigned a unique raffle number that can be used in a random automated computerized drawing. Participants (e.g., entrants) may earn additional entries of their raffle number into the drawing by initiating bonus actions (e.g., signing up for a mailing list or sharing the contest on Facebook, etc.).

In various configurations, the computing device 452 (e.g., contest platform) may communicate with one or more third-party devices 469 (e.g., social media platform(s)). Additionally or alternatively, the computing device 452 may be a third-party device 469. For example, the contest platform may be implemented in a social media platform in some configurations.

Various configurations of the systems and methods disclosed herein may enable hosting contests in social media feeds. For example, some implementations may enable creating, running, entering, and/or managing specific contest types (e.g., object-selection contests, object-overlay contests, etc.) in conjunction with (e.g., on) a social media platform, contest platform, and/or on any website.

It should be noted that one or more of the elements depicted as included within the computing device 452 may be implemented in hardware, software or a combination of both. For example, the contest creator 456 and/or contest presenter 458 may be implemented in hardware, software or a combination of both.

Figure 5:
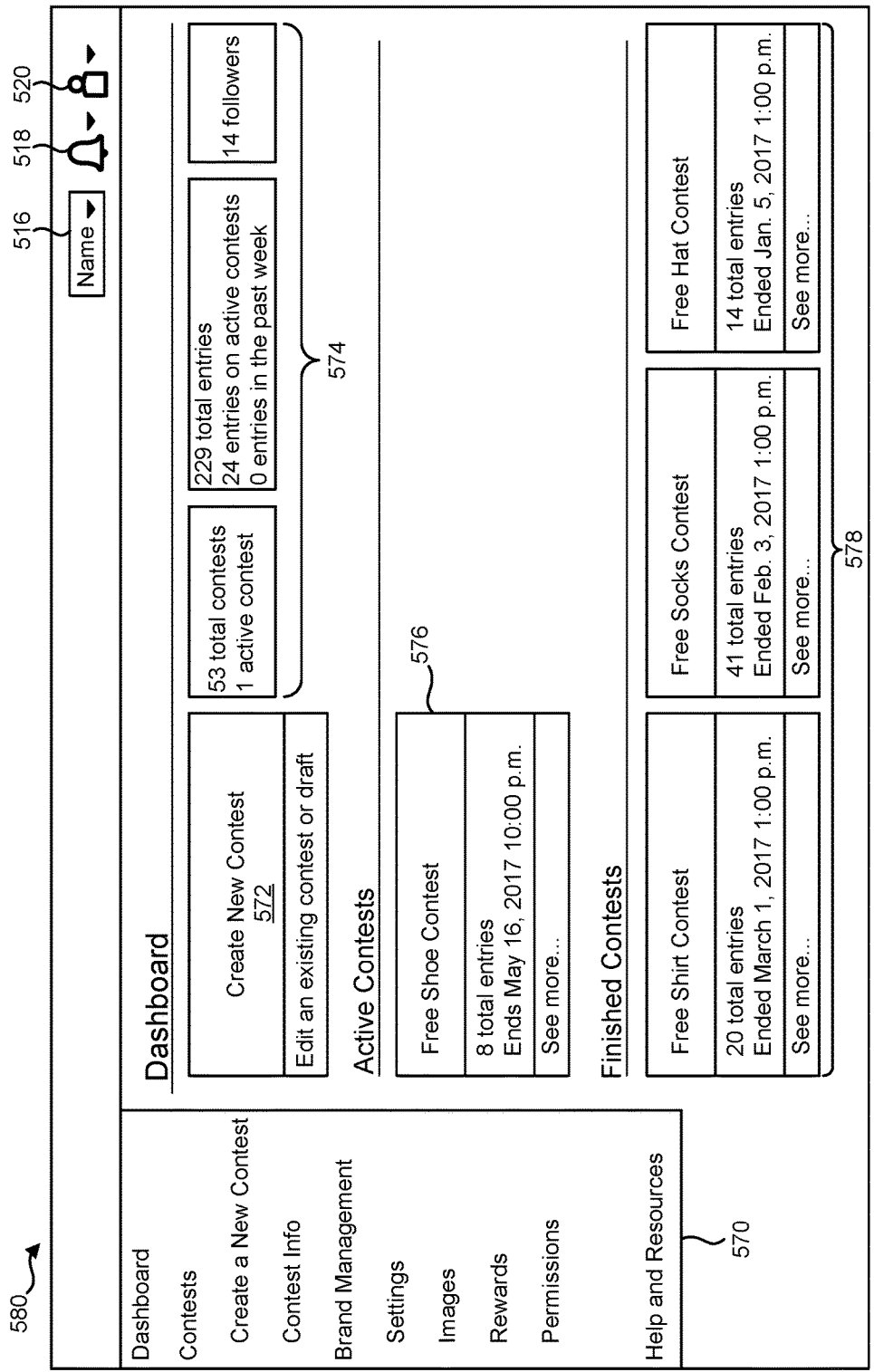
FIG. 5 is a diagram illustrating an example of a contest management interface in accordance with some configurations of the systems and methods disclosed herein.

FIG. 5 is a diagram illustrating an example of a contest management interface 580 in accordance with some configurations of the systems and methods disclosed herein. The contest management interface 580 may be presented (e.g., provided, served, displayed, etc.) by a computing device (e.g., computing device 452). For example, a computing device may generate the contest management interface 580 based on instructions (e.g., code) and may present the contest management interface 580. In some configurations, a computing device may present the contest management interface 580 by sending the contest management interface 580 to a remote computing device over a network. For example, the computing device 452 described in connection with FIG. 4 may present the contest management interface 580 by sending the contest management interface 580 to a sponsor device 466 over a network 464. For instance, the computing device 452 may provide a contest management platform that may be remotely accessed by a sponsor device 466. Additionally or alternatively, the contest management interface 580 may be presented locally.

In this example, the contest management interface 580 may include a contest management navigator 570, a contest creation button 572, one or more contest statistics labels 574, one or more active contest indicators 576, and/or one or more finished contest indicators 578. The contest management interface 580 may be an interface for a central contest platform (e.g., central contest creation and/or contest management platform). The contest management interface 580 may be an example of a business dashboard where the computing device can create contests, track contests, and/or track statistics for one or more users (e.g., sponsors).

In various configurations, the contest management navigator 570 may present a set of contest management links. For example, the contest management navigator 570 may indicate a create new contest link, a contest information link, a settings link, an images link, a rewards link, a permissions link, and/or a help and resources link. In some approaches, each of the links may be an operable object that activates navigation between interfaces. For example, the computing device (e.g., computing device 452) may receive an input (e.g., remote or local input, click event, tap event, etc.) corresponding to one of the links. The computing device may navigate to an interface corresponding to the link indicated. For example, if the create a new contest link is clicked, the computing device may initiate creation of a new contest and/or navigate to the contest details interface 102 described in connection with FIG. 1. The contest information link may navigate to an interface for accessing further contest information (e.g., statistical contest information and/or for editing existing contests). The settings link may navigate to a settings interface (e.g., a settings interface for inputting or editing a contest title, contest description, and/or one or more other contest parameters). The images link may navigate to an interface for uploading, changing, and/or deleting images for use in contests. The rewards link may navigate to an interface for managing rewards (e.g., inputting reward details, inputting reward images, inputting reward redemption codes, viewing rewards, editing rewards, deleting rewards, viewing claimed rewards, inputting reward cost, calculating reward cost, etc.). The permissions link may navigate to an interface for managing permissions (e.g., specifying user authorizations, enabling/disabling user access to one or more contest management functions, etc.). The help and resources link may navigate to an interface for obtaining help (e.g., questions and answers (Q&A), how-tos, knowledge base articles, and/or problem reporting, etc.). It should be noted that although a set of particular links for contest management is illustrated in FIG. 5, different numbers and/or types of links may be implemented.

The contest creation button 572 may function to initiate contest creation. For example, if the contest creation button 572 is activated (e.g., an event indicating an input corresponding to the contest creation button 572 is detected), the computing device may initiate creation of a new contest (e.g., may navigate to a contest creation interface). For example, the computing device may present a contest creation interface (e.g., contest details interface 102) to enable the creation of a new contest. In some configurations, the computing device may allocate a portion of memory (e.g., a range of memory addresses, a database entry, etc.) for the new contest. As illustrated in FIG. 5, a link for editing an existing (e.g., an already-created) contest may be provided in some configurations. For example, if the edit link is clicked, the computing device may navigate to an interface for editing an existing contest. For instance, an interface may be presented that enables selection of any existing contest (e.g., any incomplete contest and/or contest that has not yet ended). Data that is stored in memory corresponding to a selected existing contest may be loaded into the interface for editing the existing contest. Changes to the existing contest may be stored in memory.

The one or more contest statistics labels 574 may present one or more statistics corresponding to one or more contests. For example, the one or more contest statistics may include a total number of contests (e.g., active contest(s), future contest(s), and/or finished contests), a number of active contests, a total number of entries (for active contest(s) and/or finished contests, for example), a number of entries in active contest(s), a number of entries within a time period (e.g., within a week), and/or a number of followers (e.g., a number of social media followers of an account corresponding to a user, sponsor, vendor, brand, company, and/or entity, etc., for example). It should be noted that the computing device may determine (e.g., track) the statistics for contests, entries, and/or followers. For example, each time a new contest is created, the computing device may increment a count for a total number of contests. Each contest that is ongoing (e.g., able to accept entries, where a start condition is fulfilled, and an end condition is not yet fulfilled, etc.) may be counted as an active contest. As entries are received, the computing device may track the entries. In some configurations, times (e.g., dates, time of day, etc.) corresponding to entries may be tracked to determine how many entries have occurred within a period. Additionally or alternatively, entries corresponding to active contests may be tracked. In some configurations, the number of followers may be determined by interfacing with a third-party platform (e.g., a third-party social media platform). For example, the computing device may request and/or receive information from a third-party platform (e.g., remote computing device) that indicates a number of followers corresponding to an account.

The one or more active contest indicators 576 may indicate one or more active contests (if any). For example, information regarding each active contest (e.g., any contest where a start condition has been fulfilled and an end condition is not yet fulfilled) may be provided by the one or more active contest indicators 576. As illustrated in FIG. 5, for instance, an active contest indicator 576 may show a contest title (e.g., "Free Shoe Contest"), a number of entries corresponding to the contest, and an end condition for the contest (e.g., "Ends May 16, 2017 at 10:00 p.m."). In some configurations, the active contest indicator 576 may include a link (e.g., a see more link). The link may enable navigation to an interface that provides additional detail regarding the active contest. For example, the additional detail may include a list of participants (e.g., participant details for each entry), sources of entries (e.g., entry originating website), number of bonus actions completed, number of prizes claimed, and/or current return on investment (ROI) for the contest, etc.

The one or more finished contest indicators 578 may indicate one or more finished contests (if any). For example, information regarding one or more finished contests (e.g., any contest after the end condition has occurred) may be provided by the one or more finished contest indicators 578. As illustrated in FIG. 5, for instance, a finished contest indicator 578 may show a contest title (e.g., "Free Shirt Contest"), a number of entries corresponding to the contest, and an end condition for the contest (e.g., "Ended Mar. 1, 2017 at 1:00 p.m."). In some configurations, a finished contest indicator may include a link (e.g., a see more link). The link may enable navigation to an interface that provides additional detail regarding the finished contest. For example, the additional detail may include a list of participants (e.g., participant details for each entry), sources of entries (e.g., entry originating website), number of bonus actions completed, number of prizes claimed, and/or return on investment (ROI) for the contest, etc.

In various configurations, the contest management interface 580 may include a name dropdown 516, a notification dropdown 518, and/or an account dropdown 520. The name dropdown 516, the notification dropdown 518, and/or the account dropdown 520 may function similarly to corresponding elements described in connection with FIG. 1.

Figure 6:
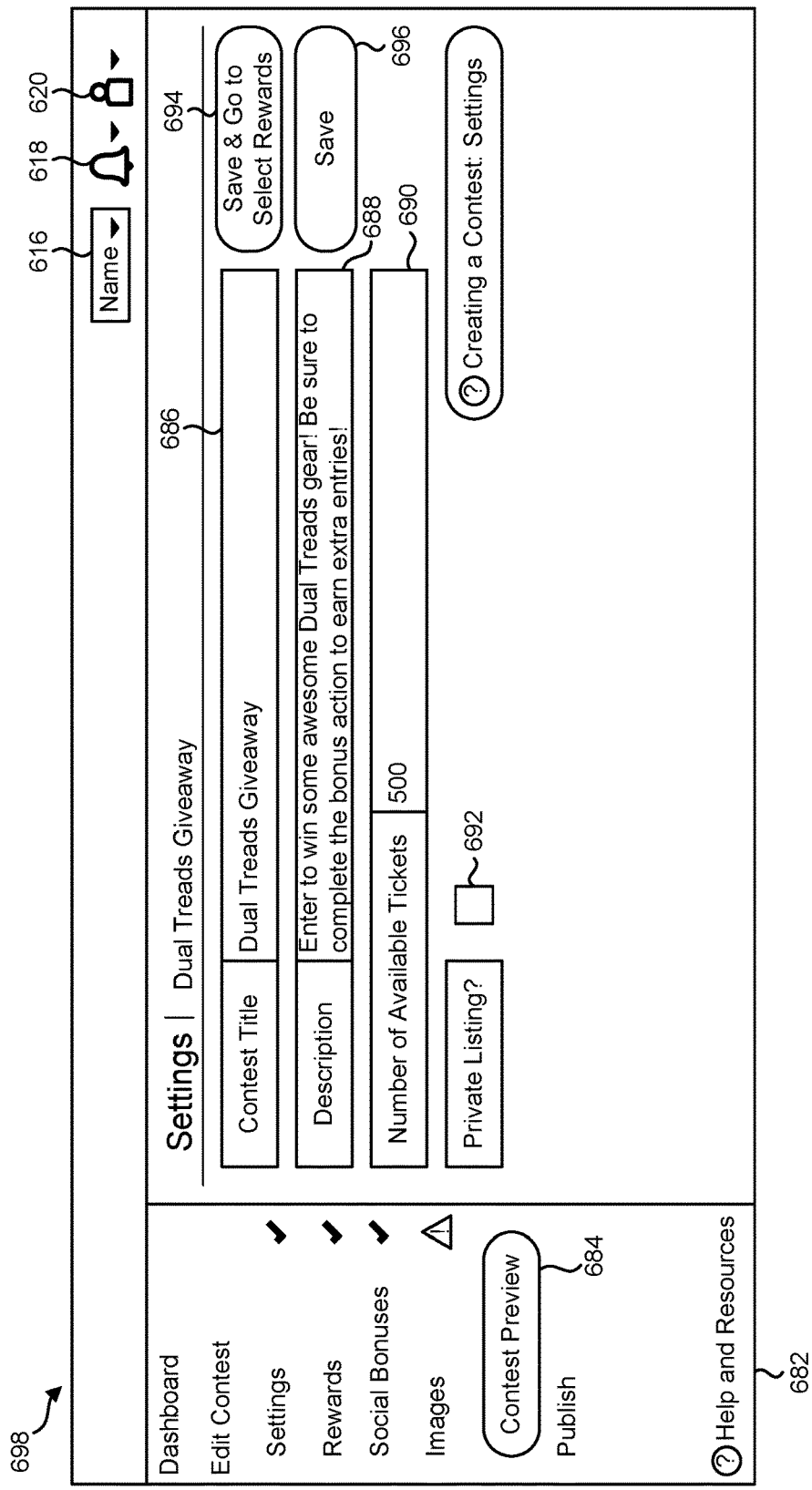
FIG. 6 is a diagram illustrating an example of a contest settings interface for contest creation and/or editing.

FIG. 6 is a diagram illustrating an example of a contest settings interface 698 for contest creation and/or editing. The contest settings interface 698 may be presented (e.g., provided, served, sent, displayed, etc.) by a computing device. For example, a computing device may generate the contest settings interface 698 based on instructions (e.g., code) and may display the contest settings interface 698. In this example, the contest settings interface 698 may include a contest editing navigator 682, a contest title field 686, a contest description field 688, an available tickets field 690, a private listing field 692, a save button 696, and/or a save and continue button 694 (e.g., save and go to select rewards button). In various configurations, a central contest platform (e.g., contest creation and/or contest management platform) may provide the contest settings interface 698.

In various configurations, the navigator 682 may present a set of steps for creating and/or editing a contest. Steps for contest creation may be listed in the navigator 682 (on the left-hand side, for instance). A computing device may receive data for items in the contest settings interface 698 (e.g., in the body of the page) for each step. For example, the navigator 682 may indicate a contest settings step (which may be similar to a contest details step, for instance), a rewards step, a bonuses step (e.g., social bonuses step), an images step, and/or a publish contest step. In some approaches, each of the steps may be an operable object (e.g., button or link) that activates navigation between each of the steps of contest creation and/or editing. For example, the computing device may receive an input (e.g., detect a click event, a tap event, etc.) corresponding to one of the steps. The computing device may navigate to an interface corresponding to the step indicated. It should be noted that although a set of particular steps for contest creation is illustrated in FIG. 6, different numbers and/or types of steps may be implemented. For instance, two or more of the steps may be combined and/or one or more of the steps may be divided. In some configurations, the navigator 682 may include a help and resources link. The computing device may provide information in response to activation of the help and resources link (e.g., browse help topics, etc.).

The navigator 682 may include a contest preview button 684 in some configurations. In some configurations, the contest preview button 684 may provide a preview of a contest (e.g., a preview of a participant view) based on one or more of the contest parameters obtained in the contest settings step, the rewards step, the bonuses step, and/or the images step. An example of an interface for the bonuses step is given in connection with FIG. 7.

In some configurations, the publish contest step may provide an interface for initiating contest presentation. For example, the publish contest step may provide a button that initiates contest presentation (e.g., posting the contest to one or more websites, making the contest details available to the public, etc.) upon detection of an event (e.g., click, tap, touch, etc.).

As illustrated in FIG. 6, each of the steps of the navigator 682 may include and/or may be accompanied by an indicator. For example, each step that has been completed (e.g., where all necessary or required information has been received and/or stored) may be indicated with a check mark. Each step that has not been completed (e.g., where not all necessary or required information has been received and/or stored) may be indicated with a warning sign (e.g., a triangle with an exclamation point). One or more other indicators may be utilized.

The contest title field 686 may receive and/or present a name for a contest (e.g., object-selection contest, object-overlay contest, and/or raffle contest, etc.). For example, the computing device may receive an input (e.g., detect keyboard inputs, touchscreen inputs, speech recognition inputs, one or more click events, one or more tap events, etc.) indicating a title (e.g., text title) for a contest. The computing device may store the contest title. For example, the computing device may store the contest title upon activation of the save button 696, upon activation of the save and continue button 694, and/or automatically. In some approaches, the contest name may be stored in memory (e.g., local memory and/or remote memory) as part of a contest instance and/or in a database for one or more contests.

The contest description field 688 may receive and/or present a description for an object-selection contest. For example, the computing device may receive an input (e.g., detect keyboard inputs, touchscreen inputs, speech recognition inputs, one or more click events, one or more tap events, etc.) indicating a description (e.g., text description) for a contest. The computing device may store the contest description. For example, the computing device may store the contest description upon activation of the save button 696, upon activation of the save and continue button 694, and/or automatically. In some approaches, the contest description may be stored in memory (e.g., local memory and/or remote memory) as part of an object-selection contest instance and/or in a database for one or more contests.

The available tickets field 690 may receive and/or present a number of available tickets for a contest. For example, the computing device may receive an input (e.g., detect keyboard inputs, touchscreen inputs, speech recognition inputs, one or more click events, one or more tap events, etc.) indicating a number of available tickets for a contest. The number of available tickets may be a number of tickets (e.g., object-overlay tickets, raffle tickets, etc.) to be generated and/or distributed for a contest. The computing device may store the number of available tickets. For example, the computing device may store the number of available tickets upon activation of the save button 696, upon activation of the save and continue button 694, and/or automatically. In some approaches, the number of available tickets may be stored in memory (e.g., local memory and/or remote memory) as part of a contest instance and/or in a database for one or more contests.

The private listing field 692 may receive and/or present an indicator for a private listing setting. For example, the computing device may receive an input (e.g., detect keyboard inputs, touchscreen inputs, speech recognition inputs, one or more click events, one or more tap events, etc.) indicating whether a contest will be privately listed (e.g., presented only to a select audience, an exclusive audience, one or more designated users, etc.). The computing device may store the private listing setting. For example, the computing device may store the private listing setting upon activation of the save button 696, upon activation of the save and continue button 694, and/or automatically. In some approaches, the private listing setting may be stored in memory (e.g., local memory and/or remote memory) as part of a contest instance and/or in a database for one or more contests. In some configurations, the computing device may present one or more private listing options (e.g., an interface for private listing options) in response to activation of the private listing field 692 (and/or when a private listing setting indicates a private listing for a contest). Some private listing options may include an age requirement (e.g., minimum age requirement), a platform requirement (e.g., the contest may only be presented to users on a particular platform such as a particular social media platform, a particular gaming platform, a particular website, etc.), a gender requirement, a location requirement (e.g., only users within a designated geographical area, a country, a state, a county, a city, etc.), a list of specific users, and/or only users with an entrance code, etc.

The save button 696 may function to initiate saving data for a contest. For example, if the save button 696 is activated (e.g., an event indicating an input corresponding to the save button 696 is detected), the computing device may save data in memory corresponding to one or more fields (e.g., contest title field 686, contest description field 688, available tickets field 690, and/or private listing field 692) in memory (e.g., in a contest database).

The save and continue button 694 may function to initiate saving data for an object-selection contest and to navigate to a next step for contest creation and/or editing. For example, if the save and continue button 694 is activated (e.g., an event indicating an input corresponding to the save and continue button 694 is detected), the computing device may save data in memory corresponding to one or more fields (e.g., contest title field 686, contest description field 688, available tickets field 690, and/or private listing field 692) in memory (e.g., in a contest database) and may navigate to a next step (e.g., selecting rewards). It should be noted that one or more of the fields (e.g., contest title field 686, contest description field 688, available tickets field 690, and/or private listing field 692) may be referred to as an "interface," as one or more fields may be utilized to receive input data.

In some configurations, the contest settings interface 698 may include and/or present one or more other elements (e.g., interface objects). For example, the contest settings interface 698 may include a name dropdown 616. The name dropdown 616 may have similar functionality as the name dropdown 116 described in connection with FIG. 1.

In some configurations, the contest settings interface 698 may include and/or present a notification dropdown 618. The notification dropdown 618 may present an indication of one or more notifications. For instance, the notification dropdown 618 may have similar functionality as the notification dropdown 118 described in connection with FIG. 1.

In some configurations, the contest settings interface 698 may include and/or present an account dropdown 620. The account dropdown 620 may present an indication of one or more account actions (e.g., sign in, sign out, change account, account details, account settings, etc.). For example, the account dropdown 620 may have similar functionality as the account dropdown 120 described in connection with FIG. 1.

In some configurations, the contest settings interface 698 may include a specific help button. In the example given in FIG. 6, the contest settings interface 698 includes a button for the specific topic of "Creating a Contest: Settings." The specific help button may provide a direct link to a topic that is relevant to the current step (e.g., creating and/or editing a contest in FIG. 6). For example, the computing device may provide information about the specific help topic in response to activation of the specific help button.

It should be noted that the contest settings interface 698 may be presented in a browser (e.g., web browser) in some configurations. For example, a contest platform (e.g., contest creation, editing, presentation, and/or management platform) may be accessed remotely over a network (e.g., the Internet) using a browser. It should be noted that the contest settings interface 698 may not be presented in a browser in some configurations and/or instances. For example, the contest settings interface 698 may alternatively be presented in a local application window.

Figure 7:
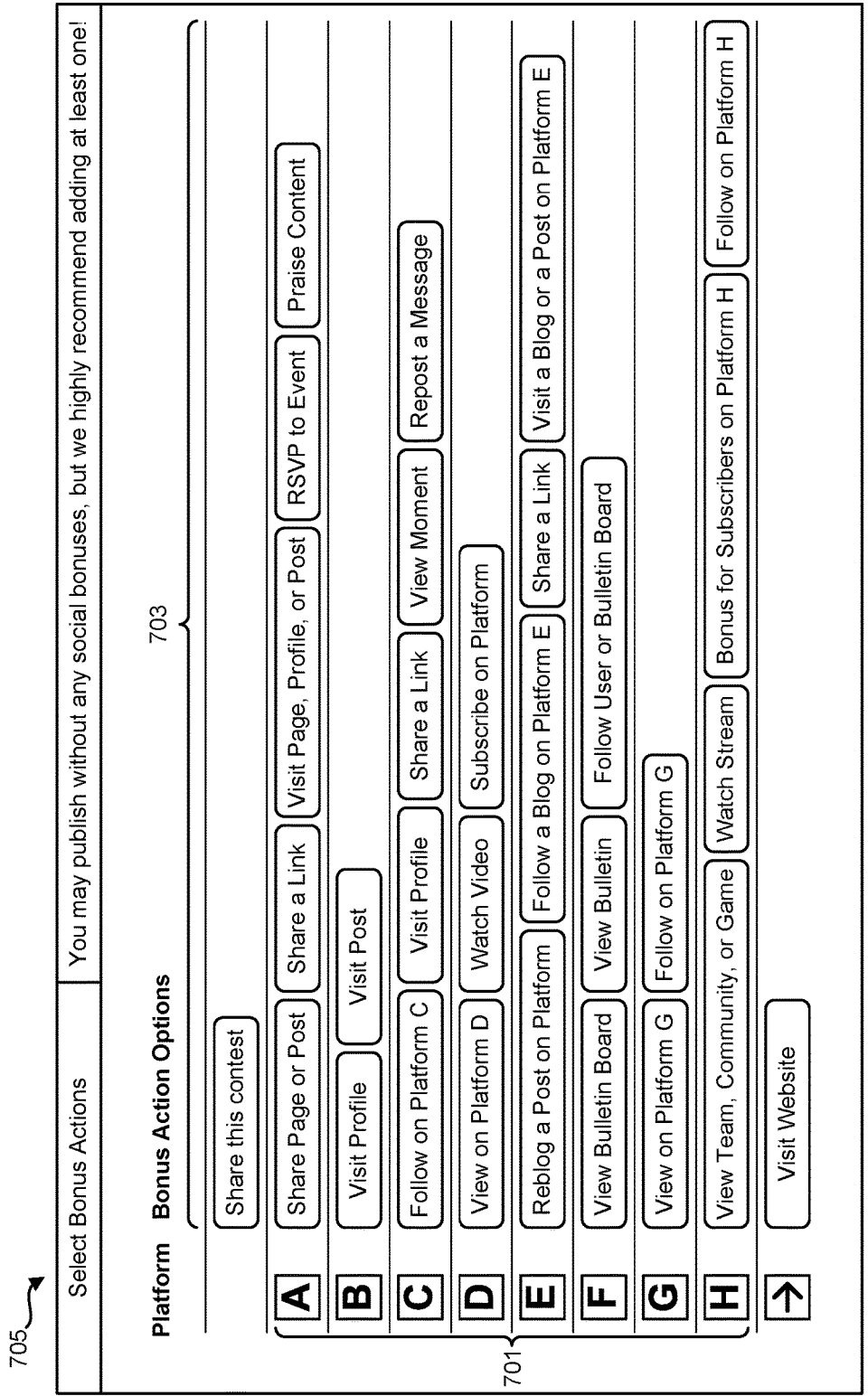
FIG. 7 is a diagram illustrating an example of a bonus specification interface.

FIG. 7 is a diagram illustrating an example of a bonus specification interface 705. The bonus specification interface 705 may enable specification (e.g., selection) of one or more contest bonuses. A contest bonus may indicate an additional contest opportunity (e.g., one or more additional entries) in exchange for a specified bonus action. The bonus specification interface 705 may provide a bonus action interface 703. As illustrated in FIG. 7, some examples of bonus actions may include sharing content (e.g., sharing the contest, sharing a page or post, and/or sharing a link, etc.), generating contest invitations (e.g., inviting one or more other users to participate in the contest), indicating praise of content (e.g., "liking," up voting, and/or indicating approval of content), accessing online content (e.g., visiting a page, visiting a profile, visiting a post, viewing content, viewing a moment, watching a video, visiting a blog, viewing a bulletin board, viewing a team, viewing a community, viewing a game, watching a stream, and/or visiting a website, etc.), indicating event attendance (e.g., indicating an RSVP to an online event or other event), following (e.g., following an account and/or content), completing a survey, propagating content (e.g., re-posting content and/or re-blogging content, etc.), and/or subscribing to content (e.g., subscribing to an account and/or to content, etc.), etc.

In some configurations, one or more contest bonuses (e.g., bonus actions) may be associated with a platform. For example, a bonus action may be carried out via a platform (e.g., third-party platform, social media platform, social media network, content provider, website, etc.). As illustrated in FIG. 7, the bonus specification interface 705 may include one or more platform indicators 701 corresponding to one or more of the bonus actions of the bonus action interface 703. For example, the bonus specification interface 705 may indicate an icon, logo, branding, text, and/or symbol corresponding to one or more of the bonus actions. Examples of platforms may include, and may not be limited to, Facebook, Instagram, Twitter, YouTube, Tumblr, Pinterest, Google+, Twitch, Myspace, Blogger, LinkedIn, etc.

The bonus action interface 703 may include one or more operable objects (e.g., buttons, links, dropdown lists, etc.) that enable selection of one or more bonus actions for a contest. If an operable object in the bonus action interface 703 is activated (e.g., if a click event, touch event, etc., corresponding to the operable object is detected), the computing device may include the contest bonus. For example, the computing device may add executable code to a contest presentation to enable performance of the contest bonus.

More technical detail regarding various implementations for bonus actions and/or tracking is given as follows. In various configurations, one or more bonus actions may be implemented and/or performed using an API (e.g., one or more platform APIs, one or more third-party APIs, etc.). For example, a bonus action may be initiated (based on user input, for instance) and the computing device (e.g., contest platform) may be authorized to have a token that allows the computing device (e.g., contest platform) to perform one or more actions with a participant's account on a third-party platform (e.g., social network, content provider, etc.). This may allow a participant (e.g., contest entrant) to click a bonus action on a contest interface. In response, the contest platform may then use the authorized token to programmatically perform the bonus action on the third-party platform.

In other approaches, a user may be asked to "like," "follow," or do some other action that must be manually completed. The action would then need to be manually checked to verify that the action was completed.

In accordance with various configurations of the systems and methods disclosed herein, one or more APIs may be utilized to complete one or more actions. This may avoid the need for a contest sponsor (e.g., brand) to spend time manually verifying that an action has been completed. Additionally or alternatively, users may not need to manually complete the actions by visiting websites. Another advantage to various configurations of the systems and methods disclosed herein is that the platform may be enabled (e.g., allowed) to provide contest creators with accurate (e.g., 100% accurate) statistics about bonus actions that are completed.

An example of bonus action procedures using API calls is given as follows. A participant with a contest platform account (e.g., Quidlum.com) may complete an object-selection contest ticket entry. After submitting the ticket, the participant may be presented with one or more bonus actions. These bonus actions may have been specified by the contest creator (based on sponsor or vendor input, for example). Completing each bonus action may allow an additional object-selection contest ticket for the participant that may be selected and submitted. It should be noted that in some approaches, bonus actions may be grouped together so that a contest participant may need to complete a group of bonus actions defined by the contest creator (based on sponsor input, for example) for an additional entry. Additionally or alternatively, there may be multiple bonus action groupings and/or single bonus actions for a contest. Accordingly, a user may choose to earn an additional contest opportunity by completing a bonus action or a group of bonus actions. In some cases, a participant may not earn all possible additional contest opportunities (e.g., entries), because they choose not to complete a bonus action or group of bonus actions required to earn a specific extra contest opportunity.

To create a bonus, the contest creator may select from a selection of available bonus actions as illustrated in FIG. 7. In various configurations, the contest platform (e.g., contest creator, bonus specification interface 705, etc.) may select the bonus action based on user (e.g., sponsor, company, etc.) input, and the contest platform may present a form with fields to be completed with required information for the bonus action. For example, the bonus specification interface 705 may receive an input from a sponsor (e.g., a company) selecting the "Follow on Platform C" (e.g., "Follow on Twitter") bonus action as shown in FIG. 7.

Figure 8:
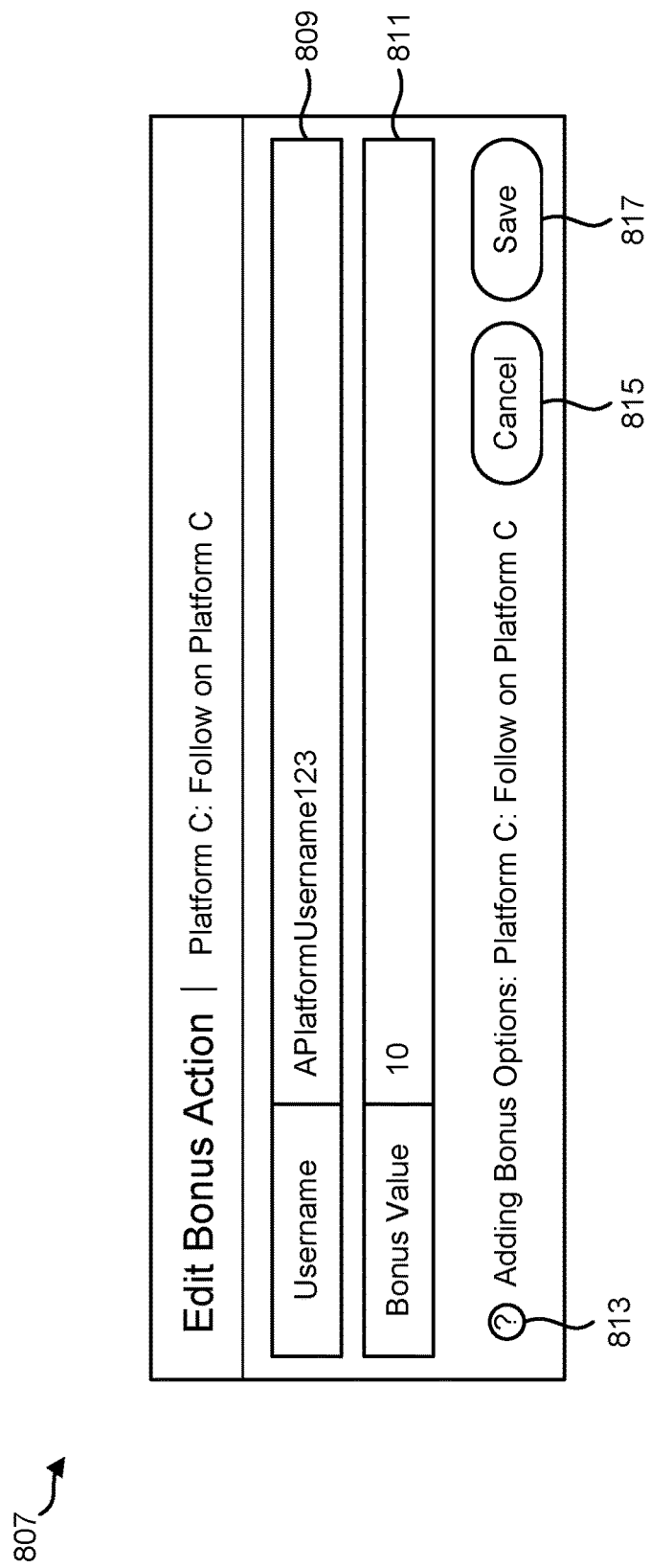
FIG. 8 is a diagram illustrating an example of an edit bonus action interface.

FIG. 8 is a diagram illustrating an example of an edit bonus action interface 807. In this example, the edit bonus action interface 807 includes a username field 809, a bonus value field 811, a help link 813, a cancel button 815, and a save button 817. Activation of the save button 817 may save values of the username field 809 and/or the bonus value field 811. Activation of the cancel button 815 may cancel editing the bonus action (e.g., may return to a bonus specification interface, such as the bonus specification interface 705 of FIG. 7). The help link 813 may navigate to an interface for displaying help on the adding bonus option topic.

The username field 809 may receive and/or present a username for a bonus action. For example, the computing device may receive an input (e.g., detect keyboard inputs, touchscreen inputs, speech recognition inputs, one or more click events, one or more tap events, etc.) indicating a username (e.g., text name) to follow on Platform C (e.g., Twitter). The computing device may store the username. For example, the computing device may store the username upon activation of the save button 817 and/or automatically. In some approaches, the username may be stored in memory (e.g., local memory and/or remote memory) as part of a contest instance and/or in a database for one or more contests.

The bonus value field 811 may receive and/or present a bonus value for a bonus action. For example, the computing device may receive an input (e.g., detect keyboard inputs, touchscreen inputs, speech recognition inputs, one or more click events, one or more tap events, etc.) indicating a bonus value (e.g., a number of additional entries provided in exchange for completing the bonus action). The computing device may store the bonus value. For example, the computing device may store the bonus value upon activation of the save button 817 and/or automatically. In some approaches, the bonus value may be stored in memory (e.g., local memory and/or remote memory) as part of a contest instance and/or in a database for one or more contests.

In various configurations, an interface (e.g., form) for editing a bonus action may be displayed in response to selection of a bonus action. The interface may include one or more fields for specifying variables to complete the bonus action. For example, after the "Follow on Platform C" bonus action is selected on the bonus specification interface 705 (described in connection with FIG. 7), the edit bonus action interface 807 is displayed. In this example, the edit bonus action interface 807 may include the username field 809 and the bonus value field 811, which may be obtained by the contest platform. For example, the edit bonus action interface 807 may receive (entered by sponsor input, for instance) the username of the account on Platform C that the sponsor wants contest participants to follow. Additionally or alternatively, the edit bonus action interface 807 may define and/or receive (entered by sponsor input, for instance) a bonus value for the completion of the bonus action. For an object-selection contest, for example, the bonus value may represent how many additional tickets the participant can enter. For the object-overlay contest, the bonus value may represent how many additional tickets the participant earns to remove the overlaying object.

Figure 9:
FIG. 9 is a diagram illustrating an example of parameters of a bonus in accordance with various configurations of the systems and methods disclosed herein.

FIG. 9 is a diagram illustrating an example of an administration interface 919 indicating parameters of a bonus in accordance with various configurations of the systems and methods disclosed herein. For example, after the bonus action is created and stored (based on received input from a contest sponsor, for instance), one or more bonus parameters (e.g., bonus action details) may be stored in a contest database. FIG. 9 provides examples of some bonus parameters that may be stored.

In the example shown in FIG. 9, each bonus action in the database has an "Actionid" parameter 921, weight parameter 923, contest instance parameter 925, platform parameter 927, action parameter 929, target parameter 931, data field 933, extra field 935, and/or order parameter 937. The Actionid parameter 921 may associate a specific bonus action with code to complete the created bonus action. For example, when a contest participant clicks a bonus action to complete it, the Actionid parameter 921 may be used to run the code function. Other information (e.g., other bonus parameters) in the database may be queried by the code function to complete the bonus action.

The weight parameter 923 may determine how many extra tickets a participant earns for completing the corresponding bonus action. The contest instance parameter 925 may associate the bonus action with a specific contest instance. The platform parameter 927 (e.g., network) may indicate a third-party platform on which the bonus action is to be completed and/or may indicate an API that may be utilized to interact with the platform. The action parameter 929 may define an action to perform on the platform. In this example, a contest participant (e.g., the participant's third-party platform account and/or profile) will be following a defined account. The target parameter 931 may define the account (e.g., username, tag, handle, brand, etc.) to be followed on the third-party network by the contest participant (e.g., the participant's third-party platform account and/or profile).

Data field 933 may include other information corresponding to a bonus action. For instance, the data field 933 may be blank for the bonus action example in FIG. 9. Another bonus action may utilize this parameter (e.g., field) if a given bonus action needs to store additional information. For example, a bonus action may allow a user to post a comment on a specific Facebook page. The data field 933 may be used to store the comment text received from and/or entered by the contest participant that is to be posted.

Extra field 935 may be an extra parameter (e.g., field) that may be utilized for other types of bonus actions. For example, the extra field 935 may not be used currently, but is in place if needed for future bonus actions.

Order parameter 937 may be a parameter (e.g., field) that defines what place in the order the bonus action should appear on a contest. For example, bonus actions may be dragged and dropped (based on sponsor input, for instance) in the order parameter 937 to be displayed in a contest.

Figure 10:
FIG. 10 is a diagram illustrating an example of a bonus interface in accordance with various configurations of the systems and methods disclosed herein.

FIG. 10 is a diagram illustrating an example of a bonus interface 1039 in accordance with various configurations of the systems and methods disclosed herein. For example, when a bonus is created as described in connection with FIGS. 7-9, the bonus interface 1039 may be presented in association with a contest. As can be observed in FIG. 10, the bonus interface 1039 may include a platform indicator (e.g., "C"), a description of the bonus action (e.g., "Follow APlatformUsername123 on Platform C"), and a bonus value indication (e.g., "+10"). In a more specific example, the platform indicator may be a Twitter icon and the bonus action in a contest may be to follow a particular account on Twitter. A computing device may receive input (e.g., a click on the bonus interface 1039) and may respond by performing the bonus action. For example, the computing device may utilize an API to perform the bonus action on a third-party platform if the authorization has already been set up. If authorization has not been set up, the contest platform (e.g., computing device) may provide an authorization interface to authorize the contest platform to interact with a participant's account on the third-party platform. An example of the authorization interface is given in connection with FIG. 11.

FIG. 11 is a diagram illustrating an example of a contest participation interface 1141 that includes an authorization interface 1143. In particular, the contest participation interface 1141 includes multiple bonus interfaces for various platforms. In this example, when a participant clicks a bonus interface, the contest platform (e.g., computing device) presents the authorization interface 1143 (if the contest platform is not already authorized to access the participant's third-party platform account, for instance). As illustrated in FIG. 11, the participant is prompted to authorize the contest platform to use the participant's account.

The authorization interface 1143 may include one or more fields to receive authorization information (e.g., third-party platform username, third-party platform password, etc.). The authorization may be granted via an API. When authorized, the contest platform may be authorized to perform one or more actions on the third-party platform for the contest participant. For example, the contest platform may have permission to do one or more of the following actions on the participant's behalf using the third-party platform API (e.g., Twitter API): read posts (e.g., Tweets) from the participant's account (e.g., timeline), see who the participant follows and follow new people, update the participant's profile, and/or make posts (e.g., tweets) for the participant.

Once authorized (based on participant input, for example), the contest platform (e.g., computing device) may receive a token from the third-party platform (e.g., Twitter, Facebook, etc.). It should be noted that many third-party platforms may perform authorization similarly. The token(s) may be stored in a database (e.g., contest database) and associated with the participant. In subsequent instances, when a participant wants to complete a bonus action, the contest platform (e.g., computing device) may check if the contest platform (e.g., database) has a valid token for the third-party platform. If there is a valid token, the contest platform may automatically complete the bonus action. If no token is valid or no authorization has been previously performed, authorization may be performed as described herein. It should be noted that in various configurations, the contest platform may request tokens multiple times from the same third-party site in order to perform different actions. For example, each bonus action may require a different permission. Instead of requesting all the permissions at once, the contest platform may request permission (e.g., a token) when the user attempts to complete a bonus action for which permission is required. Once that permission is granted for an action, it may be unnecessary to request permission (e.g., a token) again for that action.

Figure 12:
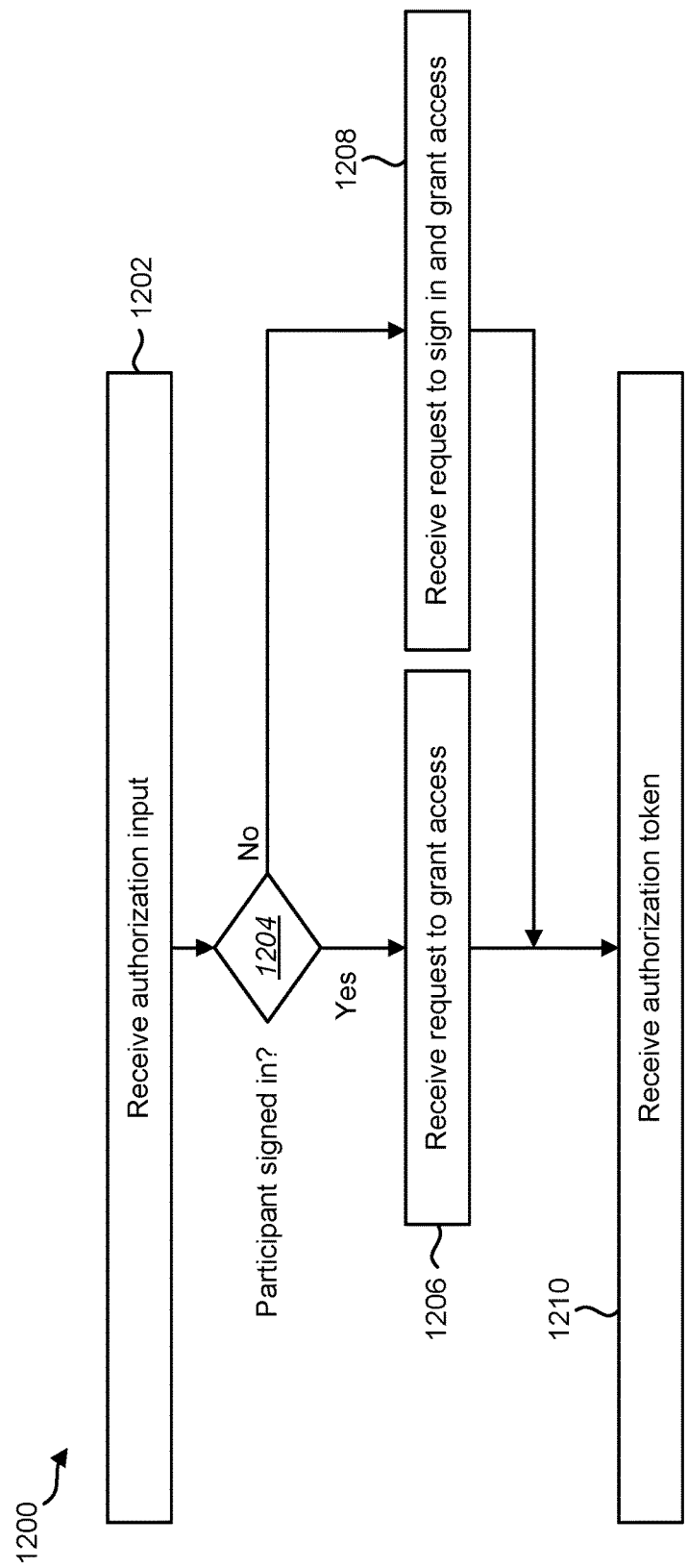
FIG. 12 is a flow diagram illustrating one example of a method for authorizing a contest platform to access a third-party platform.

FIG. 12 is a flow diagram illustrating one example of a method 1200 for authorizing a contest platform to access a third-party platform. In particular, FIG. 12 illustrates an example of a workflow for third-party platform API authorization and token retrieval. The method 1200 may be performed by a computing device (e.g., the computing device 452 described in connection with FIG. 4, a contest platform, etc.).

The computing device may receive 1202 authorization input. This may be accomplished as described in connection with FIG. 11. For example, a computing device may present an authorization interface 1143. The computing device may receive 1202 the authorization input (e.g., username, password, etc., from user input) via the authorization interface 1143. For instance, a user may click a button to sign in to a third-party platform (e.g., Twitter).

The computing device may determine 1204 whether the participant is signed in. For example, the computing device may send a request (with the authorization input, for instance) to a third-party platform to determine 1204 whether the user (e.g., participant) is signed in. If the user is not signed in, the computing device may receive 1208 a request to sign in and grant access from the third-party platform (e.g., Twitter). If the user is signed in, the computing device may receive 1206 a request to grant access from the third-party platform.

The computing device may receive 1210 an authorization token from the third-party platform. For example, when the third-party platform grants access, the third-party platform may send an authorization token (e.g., OAuth token) to the computing device (e.g., contest platform). The computing device may store the authorization token and may associate the authorization token with a contest participant. The association may be accomplished by storing the authorization token in a database field associated with the participant.

Figure 13:
FIG. 13 is a diagram illustrating another example of a bonus interface in accordance with various configurations of the systems and methods disclosed herein.

FIG. 13 is a diagram illustrating another example of a bonus interface 1345 in accordance with various configurations of the systems and methods disclosed herein. In particular, FIG. 13 illustrates an example of the bonus interface 1345 once a bonus action is completed. As illustrated in FIG. 13, a check mark (or other indicator) may be included on the bonus interface 1345 to indicate completion of the corresponding bonus action.

A more specific example of completing a bonus action is given as follows. Once authorized to perform an action on a participant's behalf, a computing device (e.g., the computing device 452 described in connection with FIG. 4, the contest platform, etc.) may complete the specific bonus action when an input is received (e.g., when a user clicks on the bonus). For a follow action (e.g., a follow action on Twitter), one or more of the following steps may be performed by the electronic device. The computing device may receive bonus action initiation input (e.g., a user may click a bonus interface). An onclick event may trigger a database query to check whether a valid token is stored in the database to perform the bonus action on behalf of the participant. If the token is stored, the computing device (e.g., contest platform) may proceed with performing the bonus action. If the token is not stored or the current token is not valid, then the computing device (e.g., contest platform) may perform authorization steps as described in connection with one or more of FIGS. 11-12.

If the token is valid, the computing device (e.g., contest platform) may call and run a defined function. The function may use the data stored in the database for the bonus action. The function may format and post the bonus action request to the third-party platform (e.g., Twitter) API using web services. The third-party platform (e.g., Twitter) API may define the format for the request. Some third-party platforms use JavaScript Object Notation (JSON), eXtensible Markup Language (XML), or other data formats, for example. Listing (1) provides an example of code for requesting a token and performing a bonus action (e.g., posting content on a third-party platform).

```
def oauth_req(url, key, secret, http_method="GET",
    post_body="",                http_headers=None):
    consumer=oauth2.Consumer
    (key=CONSUMER_KEY,
    secret=CONSUMER_SECRET)  token=oauth2.Token
```

(key=key, secret=secret) client-oauth2.Client(consumer, token) resp, content=client.request(url, method=http_method, body=post_body, headers=http_headers)
return content
home_timeline=oauth_req('https://api.twitter.com/1.1/statuses/home_timeline.json', 'abcdefg', 'hijklmnop')

Listing (1)

After the bonus action (e.g., post) is attempted, the third-party platform (e.g., Twitter) may respond with a message indicating that the action was completed or with an error message indicating what went wrong. The message or error message may be received by the computing device (e.g., contest platform). If the bonus action is successfully completed, the computing device (e.g., contest platform) may create a record (e.g., database object) for each completed bonus action that is associated with each contest participant and contest. Creating the record may enable the computing device to quickly pull analytics about what bonus actions have been completed.

The computing device may update the bonus interface 1345 (after the database is updated, for example) to show a checkmark indicator that the bonus action has successfully been completed. For example, if a participant logs back in to a specific contest in the future, the computing device may run a function to check the database to determine which bonus actions have been completed. All completed bonuses (e.g., bonus actions) may be marked as completed.

Figure 14:
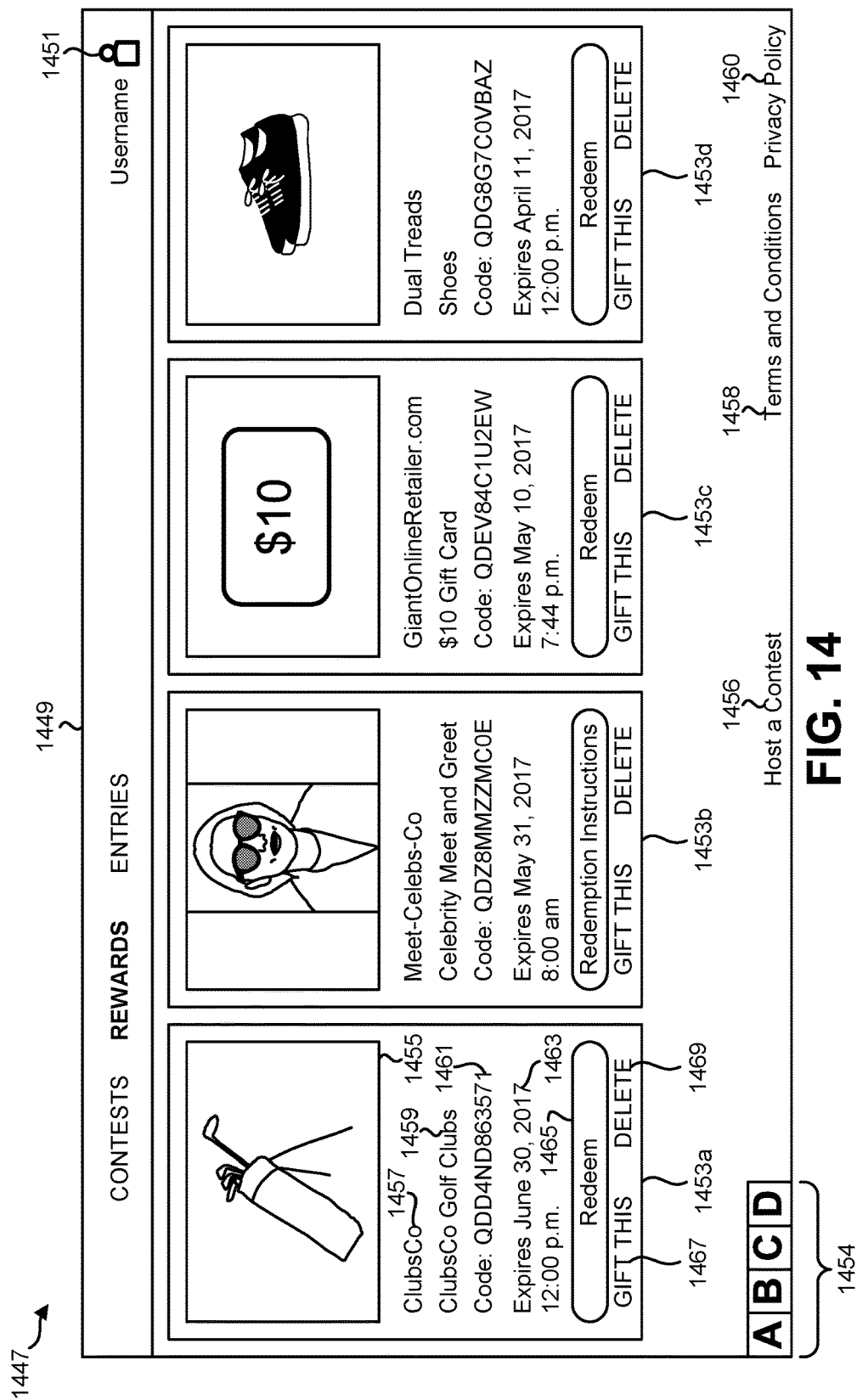
FIG. 14 is a diagram illustrating one example of a reward interface in accordance with various configurations of the systems and methods disclosed herein.

FIG. 14 is a diagram illustrating one example of a reward interface 1447 in accordance with various configurations of the systems and methods disclosed herein. The reward interface 1447 may be presented (e.g., provided, served, displayed, etc.) by a computing device (e.g., computing device 452). For example, a computing device may generate the reward interface 1447 based on instructions (e.g., code) and may present the reward interface 1447. In various configurations, a computing device may present the reward interface 1447 by sending the reward interface 1447 to a remote computing device over a network. For example, the computing device 452 described in connection with FIG. 4 may present the reward interface 1447 by sending the reward interface 1447 to a participant device 468 over a network 464. The participant device 468 may display the reward interface 1447. For instance, the computing device 452 may provide a contest participant platform that may be remotely accessed by a participant device 468. Additionally or alternatively, the reward interface 1447 may be presented locally by the computing device 452.

In various configurations, instructions for presenting the reward interface 1447 may be included in the contest presenter 458 instructions. The reward interface 1447 may be presented to a user (e.g., to a contest participant). The reward interface 1447 may indicate one or more rewards that the participant is eligible to receive.

In various configurations, the reward interface 1447 may indicate user rewards (e.g., participant rewards). For example, the reward interface 1447 may provide a page where contest participants who have won rewards can track and/or see all the rewards they have won. For instance, the reward interface 1447 may enable a user to click "Redeem" to go to a website defined by the sponsoring brands to claim the reward (e.g., use a reward code), to delete the reward, and/or to "gift" the reward. Gifting the reward may enable transferring the reward to a different platform user (for redemption and/or use, for example).

In various configurations, reward sharing may be implemented in accordance with one or more of the following aspects. Rewards may have the capability of being shared with a winner's social connections and/or may be made available for someone to claim. The reward owner may be able to "share" a reward with a social connection by transferring the reward to said connection. This may result in the reward showing up in an assignee's reward lists or social media feed. A reward owner may be able to make a reward "available" to his entire social media connections list. This may result in the reward showing up as a feed item in many people's social feeds. Once claimed, the reward may belong to the claimant.

In the example given in FIG. 14, the reward interface 1447 may include a participant interface navigator 1449 and one or more reward indicators 1453a-d. The reward interface 1447 may be an interface for a central contest platform (e.g., contest participant platform). The reward interface 1447 may be an example of (e.g., subset of) a participant interface where the computing device present contests, presents rewards, presents contest entries, etc.

In various configurations, the participant interface navigator 1449 may present a set of contest participant interface links. For example, the participant interface navigator 1449 may indicate a contests link, a rewards link, and/or an entries link. In some approaches, each of the links may be an operable object that activates navigation between interfaces. For example, the computing device (e.g., computing device 452) may receive an input (e.g., remote or local input, click event, tap event, etc.) corresponding to one of the links. The computing device may navigate to an interface corresponding to the link indicated. For example, if the contests link is clicked, the computing device may navigate to a contests interface. The contests interface may present one or more contests that the user may enter. The rewards link may navigate to the rewards interface 1447. The entries link may navigate to an entries interface. The entries interface may present one or more contest entries corresponding to the user (e.g., participant). It should be noted that although a set of particular links for the participant interface navigator 1449 are illustrated in FIG. 14, different numbers and/or types of links may be implemented.

A reward indicator 1453a may include one or more objects 1455, one or more sponsor labels 1457, one or more reward descriptions 1459, one or more reward redemption codes 1461, an expiration time 1463, a reward redeem button 1465, a gift link 1467, and/or a delete link 1469. The object(s) 1455 may provide a depiction of the reward. For example, the object(s) 1455 may include one or more images, videos, animations, symbols, characters, and/or text, etc., that depict the reward (e.g., a commercial object). The sponsor label 1457 may present a name of the contest sponsor, contest creator, and/or account managing the contest. The reward description 1459 may present a text description of the reward. The reward redemption code 1461 may present a code for reward redemption (e.g., a code that may be provided to a point-of-sale to redeem the reward). The expiration time 1463 may present a time (e.g., day, month, year, time of day, etc.) at which the reward expires (e.g., will no longer be available for redemption). In various configurations, one or more of the elements presented in the reward indicator 1453a may be obtained via a reward specification interface (e.g., the reward specification interface 344 described in connection with FIG. 3) during contest creation.

The reward redeem button 1465 may function to redeem the reward presented in the reward indicator 1453a. For example, if the reward redeem button 1465 is activated (e.g., an event indicating an input corresponding to the reward redeem button 1465 is detected), the computing device may navigate to a point of sale (e.g., an online vendor website) and/or may enter the redemption code 1461 in the point of sale. In various configurations, the reward redeem button 1465 may simply function as a link to navigate a user (e.g., participant) to a point of sale. In other configurations, the reward redeem button 1465 may automatically enter the redemption code 1461 and/or complete order details.

In various configurations and/or instances, redemption instructions may be provided in addition to or alternatively from the redemption button 1465. For instance, some rewards (e.g., celebrity meet and greet) may not be redeemable via a point of sale. Redemption instructions (e.g., a meeting time and place, contact information, etc.) may be provided to instruct the participant how to redeem the reward. As illustrated in FIG. 14, the second reward indicator 1453b provides a redemption instructions button.

The gift link 1467 may provide access to an interface for transferring the reward. For example, if the gift link 1467 is activated (e.g., an event indicating an input corresponding to the gift link 1467 is detected), the computing device may navigate to an interface (e.g., gift interface, transfer interface, etc.) for transferring the reward to another user (e.g., another participant, another account holder, another specified person, etc.). The interface may receive information to identify the reward transferee. The computing device (e.g., participant platform) may notify the transferee in some configurations. For example, the computing device may present a notification on the participant platform for the transferee and/or may send a message (e.g., email, text, chat message, call, voicemail, etc.) to the transferee, etc.

The delete link 1469 may delete the reward. For example, if the delete link 1469 is activated (e.g., an event indicating an input corresponding to the delete link 1469 is detected), the computing device may prompt the participant to ensure that deletion is intended and/or may delete the reward notification 1453a. In various configurations, the computing device (e.g., participant platform) may store a record that the reward was not redeemed. In some approaches, the computing device (e.g., participant platform) may notify a sponsor (e.g., present a notification on the contest management platform and/or send a message to the sponsor such as an email, text, chat message, call, voicemail, etc.) that the reward was not redeemed.

In some configurations, the reward interface 1447 may include and/or present one or more other elements (e.g., interface objects). For example, the reward interface 1447 may include an account icon 1451. The account icon 1451 may present an indication of one or more account actions (e.g., sign in, sign out, change account, account details, account settings, etc.). The account actions may indicate one or more actions that may be taken for or in connection with an account. If the account icon 1451 is selected (e.g., an event indicating an input corresponding to the account icon 1451 is detected), the account icon 1451 may present and enable selection of one of the account actions. This may allow account control and/or navigation to more details regarding an account. An account may be associated with a user (e.g., participant) of the contest platform.

In various configurations, the reward interface 1447 may include third-party platform links 1454, a host a contest link 1456, a terms and conditions link 1458, and/or a privacy policy link 1460. The third-party platform links 1454 may link to respective third-party platforms and/or may allow performance of one or more functions (e.g., sharing a contest, sharing news of a reward, etc.). The host a contest link 1456 may enable creating a sponsor account and/or creating one or more contests by navigating to account creation and/or contest creation interfaces. The terms and conditions link 1458 may link to terms and conditions for one or more contests and/or terms and conditions for usage of the contest platform. The privacy policy link 1460 may link to a privacy policy of the contest platform. One or more of the third-party platform links 1454, host a contest link 1456, and/or terms and conditions link 1458 may be integrated into one or more of the interfaces described herein. It should be noted that in various configurations, one or more aspects (e.g., functionality) of the reward interface 1447 may be hosted on a third-party platform (e.g., social network and/or other site(s)). For example, the result for a contest (e.g., a reward indicator) may be shown in a social network feed. For instance, the reward may be transferred to friends that a user is connected to from the feed item based on received input (e.g., user input).

The example of FIG. 14 illustrates functionality of a contest participant platform on which contest participants (e.g., entrants) can track all contests they have entered, rewards they have won, find new contests to enter, and/or see contest results. The reward interface 1447 may provide images of rewards the participant has won. As described above, a reward indicator may feature a reward code, a possible link to a website where the code can be used, and/or a "Gift This" link or button that can be used to give the reward to someone else.

Figure 15:
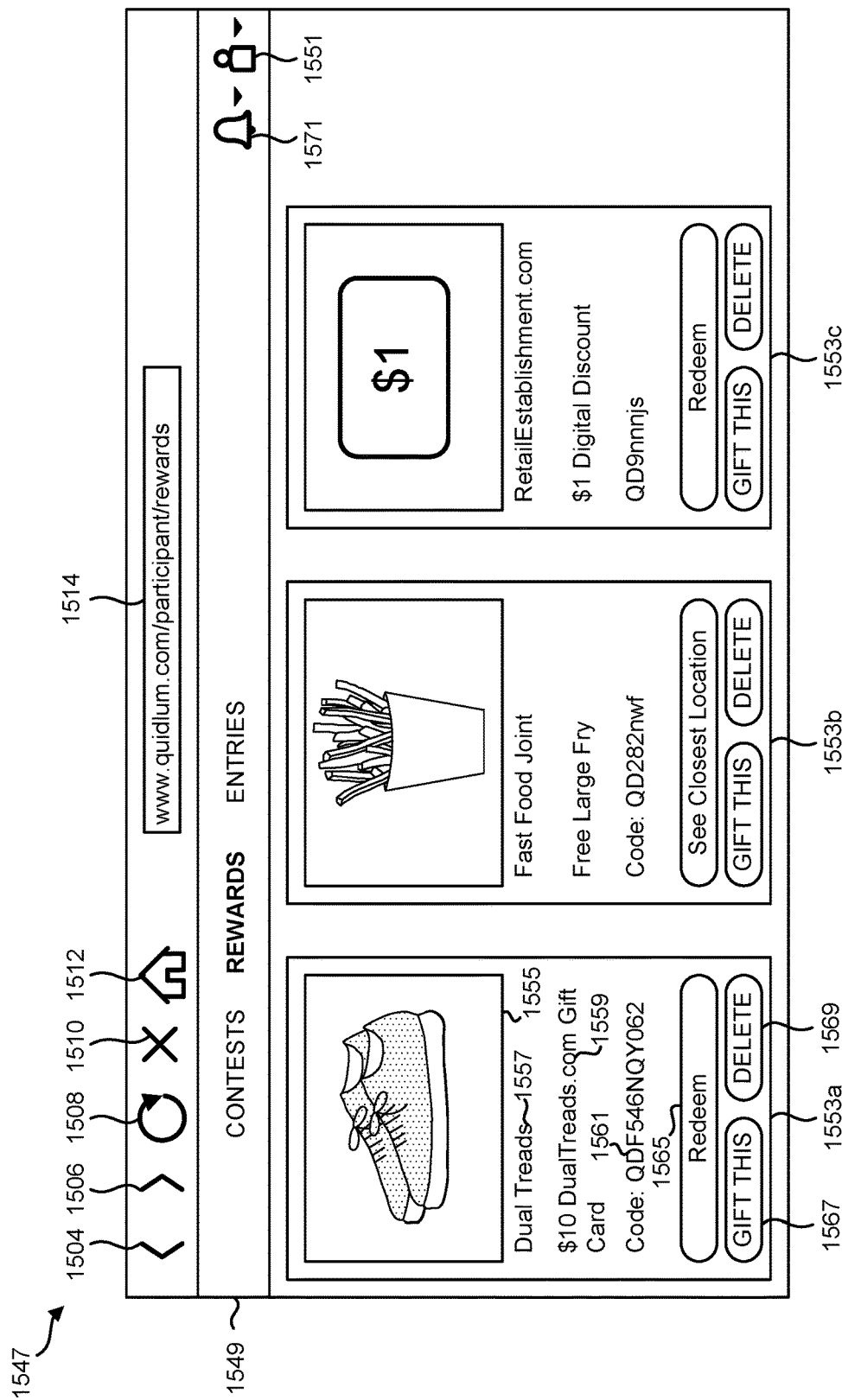
FIG. 15 is a diagram illustrating another example of a reward interface in accordance with various configurations of the systems and methods disclosed herein.

FIG. 15 is a diagram illustrating another example of a reward interface 1547 in accordance with various configurations of the systems and methods disclosed herein. The reward interface 1547 may be presented (e.g., provided, served, displayed, etc.) by a computing device (e.g., computing device 452). For example, the computing device 452 described in connection with FIG. 4 may present the reward interface 1547 by sending the reward interface 1547 to a participant device 468 over a network 464. The participant device 468 may display the reward interface 1547. For instance, the computing device 452 may provide a contest participant platform that may be remotely accessed by a participant device 468.

In the example given in FIG. 15, the reward interface 1547 may include a participant interface navigator 1549 and one or more reward indicators 1553a-c. The reward interface 1547 may be an interface for a central contest platform (e.g., contest participant platform). The reward interface 1547 may be an example of (e.g., subset of) a participant interface where the computing device presents contests, presents rewards, presents contest entries, etc.

In various configurations, the participant interface navigator 1549 may present a set of contest participant interface links. For example, the participant interface navigator 1549 may indicate a contests link, a rewards link, and/or an entries link. In some approaches, each of the links may be an operable object that activates navigation between interfaces.

A reward indicator 1553a may include one or more objects 1555, one or more sponsor labels 1557, one or more reward descriptions 1559, one or more reward redemption codes 1561, a reward redeem button 1565, a gift button 1567, and/or a delete button 1569. The object(s) 1555 may provide a depiction of the reward. The sponsor label 1557 may present a name of the contest sponsor, contest creator, and/or account managing the contest. The reward description 1559 may present a text description of the reward. The reward redemption code 1561 may present a code for reward redemption (e.g., a code that may be provided to a point-of-sale to redeem the reward).

The reward redeem button 1565 may function to redeem the reward presented in the reward indicator 1553*a*. In various configurations and/or instances, redemption instructions may be provided in addition to or alternatively from the redemption button 1565. For instance, some rewards (e.g., celebrity meet and greet) may not be redeemable via a point of sale online. Redemption instructions (e.g., a store, a location, etc.) may be provided to instruct the participant how to redeem the reward. As illustrated in FIG. 15, the second reward indicator 1553*b* provides a closest location button. In various configurations, the closest location button, when activated, may call a mapping website or application with search terms and/or a geographical location of the participant (e.g., zip code, city, state, country, etc.). This may enable the participant to find a physical location (e.g., store) that can provide the reward.

The gift button 1567 may provide access to an interface for transferring the reward. The delete button 1569 may delete the reward.

In some configurations, the reward interface 1547 may include and/or present one or more other elements (e.g., interface objects). For example, the reward interface 1547 may include a notification dropdown 1571 and an account dropdown 1551. The notification dropdown 1571 may, for example, present a number of notifications. Notifications may indicate one or more events (e.g., contest begun, contest ended, winner selected, reward won, rewards redeemed, etc.). If the notification dropdown 1571 is selected (e.g., an event indicating an input corresponding to the notification dropdown 1571 is detected), the notification dropdown 1571 may present and enable selection of one of multiple notifications. This may allow communication of events and/or navigation to more details regarding the notifications. In some approaches, a number of notifications may be superimposed over all or a portion of the notification dropdown 1571 to indicate a number of new (e.g., unviewed) notifications.

The account dropdown 1551 may present an indication of one or more account actions (e.g., sign in, sign out, change account, account details, account settings, etc.). The account actions may indicate one or more actions that may be taken for or in connection with an account. If the account dropdown 1551 is selected (e.g., an event indicating an input corresponding to the account dropdown 1551 is detected), the account dropdown 1551 may present and enable selection of one of the account actions. This may allow account control and/or navigation to more details regarding an account. An account may be associated with a user (e.g., participant) of the contest platform.

In the example given in FIG. 15, the rewards interface 1547 may be presented in a browser (e.g., web browser). For instance, the rewards interface 1547 may include a toolbar with a back button 1504, a forward button 1506, a refresh button 1508, a stop loading button 1510, and/or a home button 1512. The rewards interface 1547 may also include an address field 1514. The address field 1514 may receive and/or display address (e.g., URL) information. For example, the address field 1514 may receive address information input with an input device (e.g., touch screen, keyboard, mouse, etc.) and/or populated with a link. In some configurations, a contest platform (e.g., contest participant platform) may be accessed remotely over a network (e.g., the Internet) using a browser. It should be noted that the rewards interface 1547 may not be presented in a browser in some configurations and/or instances. For example, the rewards interface 1547 may alternatively be presented in a local application window.

Figure 16:
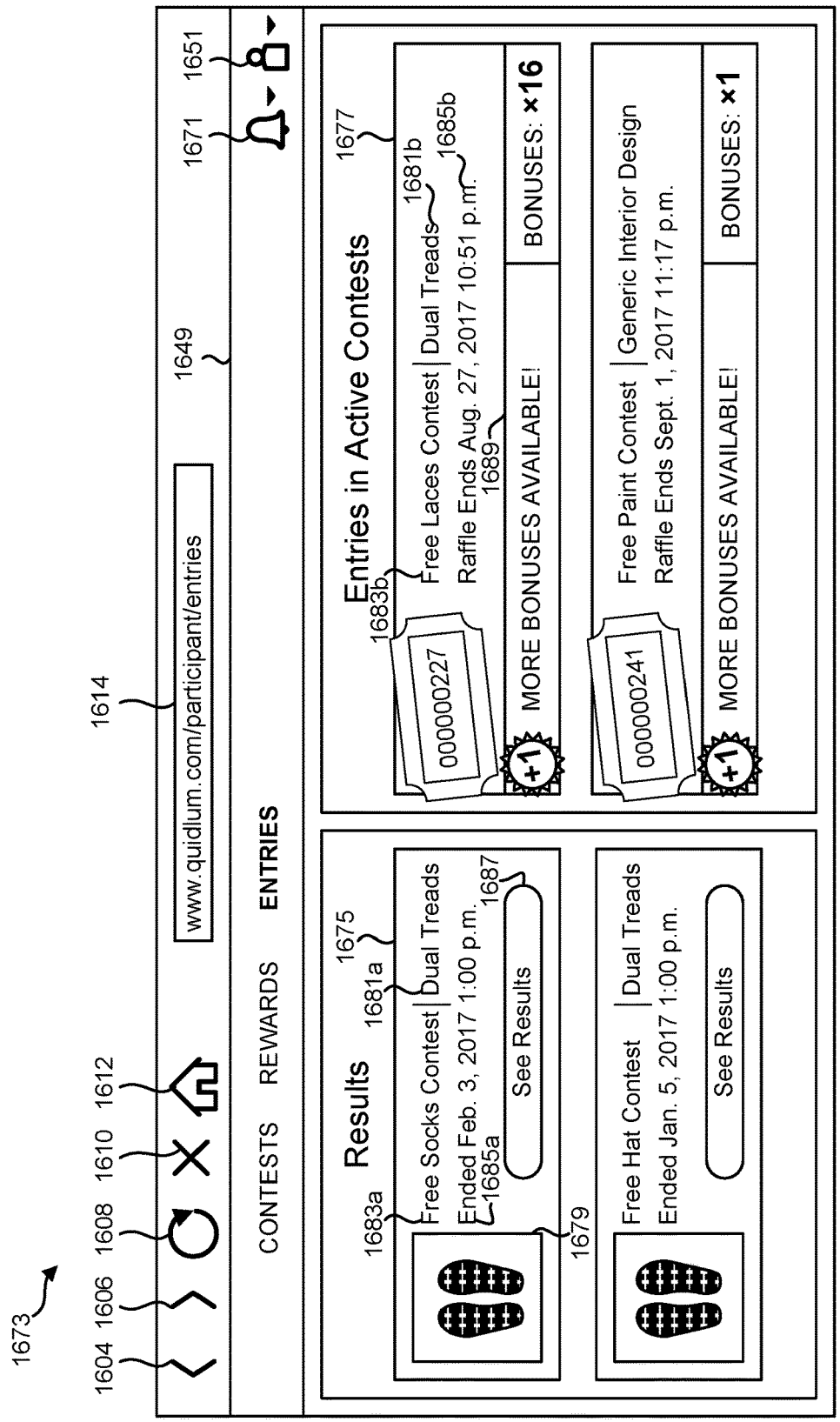
FIG. 16 is a diagram illustrating another example of an entries interface in accordance with various configurations of the systems and methods disclosed herein.

FIG. 16 is a diagram illustrating another example of an entries interface 1673 in accordance with various configurations of the systems and methods disclosed herein. The entries interface 1673 may be presented (e.g., provided, served, displayed, etc.) by a computing device (e.g., computing device 452). For example, the computing device 452 described in connection with FIG. 4 may present the entries interface 1673 by sending the entries interface 1673 to a participant device 468 over a network 464. The participant device 468 may display the entries interface 1673. For instance, the computing device 452 may provide a contest participant platform that may be remotely accessed by a participant device 468. The entries interface 1673 may enable contest participants (e.g., entrants) to track and/or view all the contests they have entered and/or all contests results from this page in some configurations.

In the example given in FIG. 16, the entries interface 1673 may include a participant interface navigator 1649, one or more results indicators 1675, and/or one or more active contest entry indicators 1677. The entries interface 1673 may be an interface for a central contest platform (e.g., contest participant platform). The entries interface 1673 may be an example of (e.g., subset of) a participant interface where the computing device present contests, presents rewards, presents contest entries, etc.

In various configurations, the participant interface navigator 1649 may present a set of contest participant interface links. For example, the participant interface navigator 1649 may indicate a contests link, a rewards link, and/or an entries link. In some approaches, each of the links may be an operable object that activates navigation between interfaces.

A results indicator 1675 may include one or more objects 1679, one or more sponsor labels 1681*a*, one or more contest descriptions 1683*a*, a contest end time 1685*a*, and/or a see results button 1687. The object(s) 1679 may indicate a sponsor (e.g., a logo, icon, symbol, text, image, animation, video, etc.). The contest description 1683*a* may present a text description of the contest. The sponsor label 1681*a* may present a name of the contest sponsor, contest creator, and/or account managing the contest. The contest end time 1685*a* may present a time that the contest ended.

The see results button 1687 may function to present contest results. For example, the see results button 1687, when activated, may present a results window (e.g., pop-up window) illustrating contest results (e.g., number of participants, number of entries, end time, reward(s), winner(s), the participant's entry(ies) (e.g., selected objects, object pattern, raffle ticket number, etc.)).

An entry indicator 1677 may include one or more sponsor labels 1681*b*, one or more contest descriptions 1683*b*, a contest end time 1685*b*, and/or a bonus indicator 1689. The contest description 1683*b* may present a text description of the contest. The sponsor label 1681*b* may present a name of the contest sponsor, contest creator, and/or account managing the contest. The contest end time 1685*b* may present an end time for the active contest. The bonus indicator 1689 may function to indicate any available bonuses. In various configurations, the bonus indicator 1689, when activated, may present an interface (e.g., an active contest interface) showing any available bonuses.

In some configurations, the entries interface 1673 may include and/or present one or more other elements (e.g., interface objects). For example, the entries interface 1673 may include a notification dropdown 1671 and an account dropdown 1651. The notification dropdown 1671 and the account dropdown 1651 may function similarly to corresponding elements described in connection with FIG. 15.

In the example given in FIG. 16, the entries interface 1673 may be presented in a browser (e.g., web browser). For instance, the entries interface 1673 may include a toolbar with a back button 1604, a forward button 1606, a refresh button 1608, a stop loading button 1610, and/or a home button 1612. The entries interface 1673 may also include an address field 1614. The address field 1614 may receive and/or display address (e.g., URL) information. In some configurations, a contest platform (e.g., contest participant platform) may be accessed remotely over a network (e.g., the Internet) using a browser. It should be noted that the entries interface 1673 may not be presented in a browser in some configurations and/or instances. For example, the entries interface 1673 may alternatively be presented in a local application window.

Figure 17:
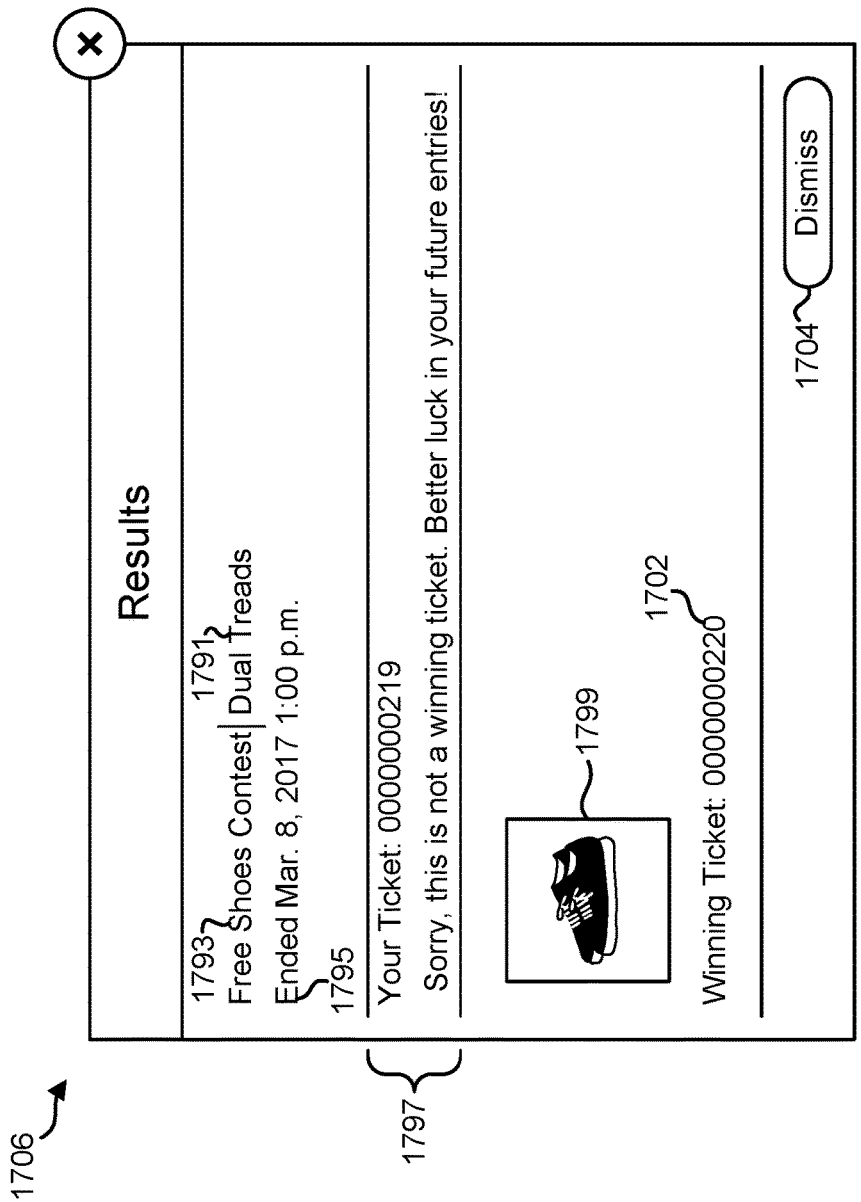
FIG. 17 is a diagram illustrating an example of a results window in accordance with various configurations of the systems and methods disclosed herein.

FIG. 17 is a diagram illustrating an example of a results window 1706 in accordance with various configurations of the systems and methods disclosed herein. The results window 1706 may be presented (e.g., provided, served, displayed, etc.) by a computing device (e.g., computing device 452). For example, the computing device 452 described in connection with FIG. 4 may present the results window 1706 by sending the results window 1706 to a participant device 468 over a network 464. The participant device 468 may display the results window 1706. For instance, the computing device 452 may provide a contest participant platform that may be remotely accessed by a participant device 468. In various configurations, the results window 1706 may be placed in front of an entries interface (e.g., the entries interface 1673 described in connection with FIG. 16). For example, the results window 1706 may function as a pop-up window when a see results button is activated.

In the example given in FIG. 17, the results window 1706 may include one or more sponsor labels 1791, one or more contest descriptions 1793, a contest end time 1795, entry details 1797, one or more objects 1799, winning entry details 1702, and/or a dismiss button 1704. The contest description 1793 may present a text description of the contest. The sponsor label 1791 may present a name of the contest sponsor, contest creator, and/or account managing the contest. The contest end time 1795 may present a time that the contest ended. The entry details 1797 may provide details on the participant's entry (e.g., object selection, object pattern, ticket number, etc.). In various configurations, the entry details 1797 may include a message indicating whether the entry was a winning entry or not. The object(s) 1799 may indicate a reward (e.g., a logo, icon, symbol, text, image, animation, video, etc.). The winning entry details 1702 may provide details about the winning entry (e.g., winning object selection, winning object pattern, winning ticket number, winner, etc.). The dismiss button 1704 may function to dismiss (e.g., close) the results window 1706. For example, the dismiss button 1704, when activated, may close the results window 1706 and return navigation to an entries interface.

In an example, FIGS. 16-17 illustrate a configuration of a contest participant platform on which participants can track all contests they have entered, rewards they have won, find new contests to enter, and/or see contest results. In particular, FIG. 17 illustrates an example of an interface for presenting contest results to a participant that entered the contest. It should be noted that in various configurations, one or more aspects (e.g., functionality) described in connection with FIGS. 16-17 may be implemented in full or part on one or more platforms (e.g., other sites, social networks, local applications, and/or mobile applications, etc.).

Figure 18:
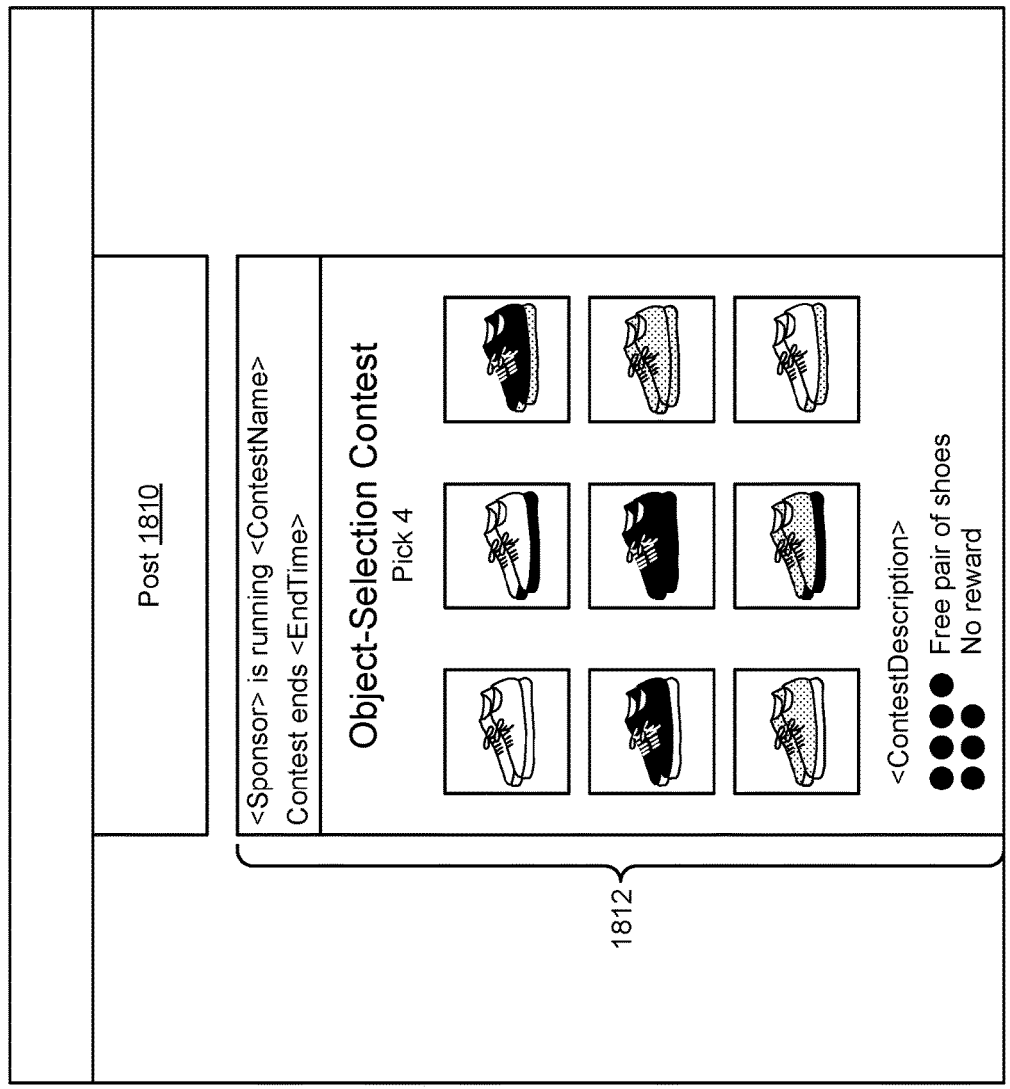
FIG. 18 is a diagram illustrating an example of a third-party interface.

FIG. 18 is a diagram illustrating an example of a third-party interface 1808. For instance, the third-party interface 1808 may include one or more posts. In the example of FIG. 18, the third-party interface 1808 includes a post 1810 and a contest interface 1812. In particular, some third-party platforms may provide an interface for viewing one or more posts (e.g., a news feed). In various configurations of the systems and methods disclosed herein, the contest interface presented by the contest platform (e.g., contest participant platform) may be integrated into one or more third-party platforms (e.g., websites). For example, a contest management platform may generate executable code that may be embedded in a third-party platform (e.g., website). In various configurations, the contest interface 1812 may be presented as a post in a third-party platform. This may enable dynamic contests in different feeds and/or social platforms. For instance, FIG. 18 illustrates how a unique contest built in accordance with various configurations of the systems and methods disclosed herein may be integrated with or built natively into a Facebook feed.

In various configurations, one or more of the contest interfaces described herein may be presented in a social media feed. A social media feed may be a social media data format that provides users with a steady stream of updates and information. This can be in the form of images, text, emojis, videos, or a combination of the above. Examples of social media feeds may include feeds in Facebook, Twitter, Instagram, Pinterest, Reddit, SnapChat, Facebook Messenger, WhatsApp, and any other social media communication site.

Figure 19:
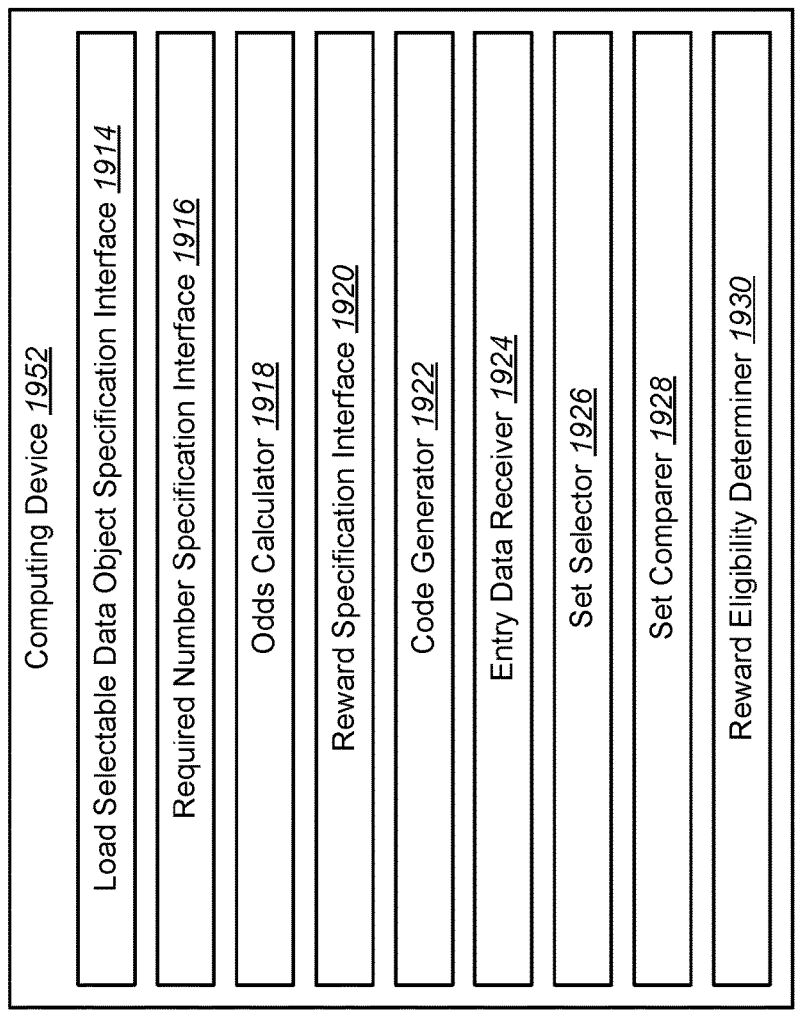
FIG. 19 is a functional block diagram illustrating an example of a computing device in which various configurations of the systems and methods disclosed herein may be implemented.

FIG. 19 is a functional block diagram illustrating an example of a computing device 1952 in which various configurations of the systems and methods disclosed herein may be implemented. The computing device 1952 may be an example of the computing device 452 described in connection with FIG. 4. Each functional block diagram disclosed herein may utilize the hardware components illustrated, for example, in the computing device 452 of FIG. 4 or the computing device 3782 of FIG. 37 to perform disclosed functions.

The computing device 1952 may include a load selectable data object specification interface 1914, a required number specification interface 1916, an odds calculator 1918, a reward specification interface 1920, a code generator 1922, an entry data receiver 1924, a set selector 1926, a set comparer 1928, and/or a reward eligibility determiner 1930. The computing device 1952 may present the load selectable data object specification interface 1914. For example, the computing device 1952 may send the load selectable data object specification interface 1914 to another computing device (e.g., a sponsor device over a network) for display and/or may display the load selectable data object specification interface 1914 locally. In some approaches, presenting the load selectable data object specification interface 1914 may include sending code (e.g., Hypertext Markup Language (HTML) code, JavaScript code, CSS code, Perl code, Python code, Personal Home Page (PHP) code, Active Server Page (ASP) code, etc.) that specifies the load selectable data object specification interface 1914. An example of the load selectable data object specification interface 1914 is given in connection with FIG. 2.

The computing device 1952 may receive, via the load selectable data object specification interface 1914, two or more selectable data objects. Each of the two or more selectable data objects may specify a visually perceptible element (e.g., image, animation, video, symbol, text, etc.). For example, the computing device 1952 may receive (via a network interface and/or one or more input devices, for instance) selectable data objects. The load selectable data object specification interface 1914 may be utilized to specify the selectable data objects for reception. For example, the load selectable data object specification interface 1914 may receive (based on user input, for instance) one or more memory addresses, memory pointers, web addresses, etc., that specify the memory location of a data object (e.g., image, animation, video, symbol, text, etc.). In some approaches, a drag-and-drop mechanism may be utilized to specify the data object (e.g., location) for reception.

The computing device 1952 may store, in memory, the two or more selectable data objects. For example, the computing device 1952 may store the selectable data objects in a particular location in memory and/or may associate each selectable data object with a particular variable. In various configurations, the computing device 1952 may store the selectable data objects in a database. For example, a contest database may include one or more fields for storing the selectable data objects in association with a contest (e.g., object-selection contest).

The computing device 1952 may present the required number specification interface 1916. For example, the computing device 1952 may send the required number specification interface 1916 to another computing device (e.g., a sponsor device over a network) for display and/or may display the required number specification interface 1916 locally. In some approaches, presenting the required number specification interface 1916 may include sending code that specifies the required number specification interface 1916. An example of the required number specification interface 1916 (e.g., required number field 346) is given in connection with FIG. 3.

The computing device 1952 may receive, via the required number specification interface 1916, a required number of the selectable data objects. The required number may be less than the two or more selectable data objects. For example, if the number of the selectable data objects is 12, the required number may be 11 or less (e.g., 6). The required number specification interface 1916 may be utilized to specify the required number for reception. For example, the required number specification interface 1916 may receive (based on user input, for instance) the required number.

The computing device 1952 may store, in memory, the required number. For example, the computing device 1952 may store the required number in a particular location in memory and/or may associate the required number with a particular variable. In various configurations, the computing device 1952 may store the required number in a database. For example, a contest database may include a field for storing the required number in association with a contest (e.g., object-selection contest).

The odds calculator 1918 may calculate at least one odds value based on the required number and a total number of the two or more selectable objects. The at least one odds value may represent a probability of selecting one set of the required number of the selectable data objects from all possible sets of the required number of the selectable data objects. In various configurations, calculating the at least one odds value may include calculating an odds value for a maximum number of matches and for each positive integer number of matches less than the maximum number of matches. For example, assuming that the required number is two and the total number of selectable objects is four, the odds calculator 1918 may calculate an odds value for selecting a particular set of two selectable objects and an odds value for selecting one of the particular set of two selectable objects. An example of odds values is given in connection with FIG. 3, where an odds value has been calculated for each number of matches from six to one. In various configurations, at least one reward may be specified for at least two numbers of matches. For example, a first reward may be specified for the maximum number of matches, a second reward may be specified for the maximum number of matches minus one, and a third reward may be specified for the maximum number of matches minus two.

The computing device 1952 may present the reward specification interface 1920. For example, the computing device 1952 may send the reward specification interface 1920 to another computing device (e.g., a sponsor device over a network) for display and/or may display the reward specification interface 1920 locally. In some approaches, presenting the reward specification interface 1920 may include sending code that specifies the reward specification interface 1920. An example of the reward specification interface 1920 is given in connection with FIG. 3.

The computing device 1952 may receive, via the reward specification interface 1920, reward data specifying one or more rewards. For example, the computing device 1952 may receive (via a network interface and/or one or more input devices, for instance) data (e.g., reward name, reward description, reward redemption code(s), etc.) and/or one or more objects (e.g., image(s), animation(s), video(s), etc.) that specify the one or more rewards. The reward specification interface 1920 may be utilized to specify the reward data for reception. For example, the reward specification interface 1920 may receive (based on user input, for instance) one or more memory addresses, memory pointers, web addresses, etc., that specify the memory location of reward data (e.g., image, animation, video, symbol, text, etc.). In some approaches, a drag-and-drop mechanism may be utilized to specify the reward data (e.g., location) for reception. Additionally or alternatively, the reward specification interface 1920 may receive (based on user input, for instance) reward data (e.g., text indicating a reward name and/or reward description). In various configurations, the computing device 1952 may receive, via the reward specification interface 1920, one or more reward redemption codes. In some examples, the reward redemption codes may be automatically generated by a sponsor device. Additionally or alternatively, one or more reward redemption codes may not be generated automatically (e.g., may be received based on input from a sponsor). For example, one or more reward redemption codes may not be generated by a processor.

The computing device 1952 may store, in memory, the reward data. For example, the computing device 1952 may store the reward data in a particular location in memory and/or may associate the reward data with one or more variables. In various configurations, the computing device 1952 may store the reward data in a database. For example, a contest database may include one or more fields for storing the reward data in association with a contest (e.g., object-selection contest).

In various configurations, the reward specification interface 1920 may present an association between each of the one or more rewards and at least one threshold number of matches (between an entry and a set of the required number of the selectable data objects, for example). For instance, reward data (e.g., a reward description and/or an image of the reward) may be presented with a threshold number of matches (e.g., six matches out of a possible six selectable objects in the winning set). Reward data may additionally or alternatively be presented with lesser thresholds of matching (e.g., five matches out of six, four matches out of six, etc.). An example of the association is given in connection with FIG. 3, where a reward of free shoes and an image of shoes are presented with a complete matching set (e.g., six out of six).

The code generator 1922 may generate executable code for accessing the contest (e.g., online object-selection contest). In various configurations, the executable code may be generated based on the two or more selectable data objects and the required number. For example, the code generator 1922 may generate executable code representing a contest interface for accessing (e.g., participating in) the contest. For instance, the executable code may include instructions for accessing the contest (e.g., object-selection contest) when embedded in a webpage (e.g., social media platform, news feed, etc.). In various configurations, the code generator 1922 may generate executable code that represents the contest interface, including one or more elements for the two or more selectable data objects, one or more elements for the required number (e.g., text indicating the required number), and/or one or more elements for the reward data, etc. Additionally or alternatively, the executable code representing the contest interface may include one or more other elements, such as a contest name, contest description, start condition, end condition, odds, and/or age requirement.

In various configurations, the computing device 1952 may publish the contest (e.g., object-selection contest). For example, the computing device 1952 may send the executable code to one or more remote computing devices (e.g., third-party platforms, participant device(s), etc.). Additionally or alternatively, the computing device 1952 may run the executable code locally.

In various configurations, the executable code may be embedded in one or more third-party platforms (e.g., placed in a post of a news feed, inserted into a webpage, etc.). One or more remote computing devices (e.g., the third-party platform(s) and/or participant device(s)) may run the executable code. Running the executable code may enable access to the contest. For example, a remote computing device may run the executable code, which may cause the remote computing device to request data (e.g., object(s), image(s), animation(s), video(s), text, etc.) from the computing device 1952 and/or to submit data (e.g., entry data, statistical data, usage data, etc.). For example, running the executable code may cause the remote computing device to display the contest interface (e.g., render the contest interface with one or more selectable data objects, contest details, etc.). Additionally or alternatively, running the executable code may cause the remote computing device to receive user input (e.g., entry data, object selections, participant identification information, account information, etc.) and send the user input (e.g., entry data) to the computing device 1952.

The entry data receiver 1924 may receive entry data specifying a set of entries. For example, the computing device 1952 may receive (via a network interface and/or one or more input devices, for instance) data that specifies one or more contest entries. In various configurations, the entry data may be received from multiple remote computing devices and/or from an input interface on the computing device 1952. The entry data may indicate a selected set of the selectable data objects for each entry in the set of entries. In various configurations, the entry data may indicate a selected order of the selectable data objects.

The computing device 1952 may store, in memory, the entry data. For example, the computing device 1952 may store the entry data in a particular location in memory and/or may associate the entry data with one or more variables. In various configurations, the computing device 1952 may store the entry data in a database. For example, a contest database may include one or more fields for storing the entry data in association with a contest (e.g., object-selection contest).

The set selector 1926 may select (e.g., randomly select) one set of the required number of the selectable data objects from among the two or more selectable data objects. For example, each of the selectable data objects may be assigned a number within a range. The set selector 1926 may include and/or use a random number generator to randomly generate a set of random numbers, where the size of the set is the required number. For example, if the required number is three, the random number generator may generate three random numbers within the range. The selectable data objects with assigned numbers matching the randomly generated numbers may be selected as the set (e.g., winning set) of the required number of the selectable data objects. In another example, the random number generator may randomly generate a set of numbers, which may be assigned to the selectable data objects. The selectable data objects with random numbers that meet a criterion based on the required number (e.g., smallest five numbers, largest five numbers, five numbers nearest a mean of the random numbers, etc.) may be selected as the set (e.g., winning set) of the required number of the selectable data objects.

The set comparer 1928 may compare, for each entry in the set of entries, the selected set of the selectable data objects to the selected one set (e.g., winning set, randomly selected set, etc.) of the required number of the selectable data objects to determine a number of matches. For each entry, for example, the set comparer 1928 may determine how many of the selected objects of the entry match the randomly selected (e.g., drawn) set.

The reward eligibility determiner 1930 may determine whether each entry in the set of entries is eligible for the one or more rewards based on the number of matches and the at least one threshold number of matches. For example, the reward eligibility determiner 1930 may compare the number of matches for each entry with one or more match thresholds. For instance, if a first match threshold is six (for a first reward) and a second match threshold is five (for a second reward), the reward eligibility determiner 1930 may determine that an entry with five matches is not eligible for the first reward because the first match threshold is not met, and may determine that the entry is eligible for the second reward because the second match threshold is met. In various configurations, the reward eligibility determiner 1930 may determine eligibility based on a selected order of selected objects. For example, the selected objects may need to be selected in a particular order to be eligible for a reward in various configurations. If the order of the selected objects matches the required order and/or depending on a degree to which order of the selected objects matches the required order, the reward eligibility determiner 1930 may determine whether each entry is eligible for a reward based on the selected objects and/or the required order. For example, one reward may correspond to a complete match of the required order, and a second reward may correspond to a partial match of the required order, etc.

Based on the eligibility determination, the computing device 1952 may produce eligibility data (e.g., eligibility indication, reward indication, reward code, and/or redemption instructions). For example, in a case that an entry is determined to be eligible for a reward, the computing device 1952 may produce eligibility data (e.g., an indication on a contest interface) that the entry is eligible for a reward. In various configurations, the computing device 1952 may additionally or alternatively provide a reward indication (e.g., indicate the reward corresponding to the entry), may indicate a reward code, and/or may indicate redemption instructions. In a case that an entry is determined to be ineligible for a reward, the computing device 1952 may produce ineligibility data (e.g., an ineligibility indication). For example, in a case that an entry is determined to be ineligible for a reward, the computing device 1952 may produce ineligibility data (e.g., an indication on a contest interface, for example) that the entry is ineligible for a reward, such as a message, image, etc. In various configurations, the computing device 1952 may additionally or alternatively provide other information (e.g., the winning set, a comparison between the winning set and the selected set of the entry, etc.).

It should be noted that in various configurations, the computing device 1952 may include one or more interfaces that may be presented for receiving one or more contest details (e.g., contest name, contest description, start condition, end condition, odds, and/or age requirement). The one or more contest details may be received and/or stored (in memory and/or in a contest database, etc.). The code generator 1922 may utilize the one or more stored contest details for generating executable code with one or more elements for one or more contest details.

In various configurations, the computing device 1952 may include and/or present a contest start condition specification interface. The computing device may receive (from a remote computing device or from a local input device, for example), via the contest start condition specification interface, contest start condition data. The contest start condition data may specify a start condition (e.g., a start time, a start event, a trigger, etc.). The start condition data may indicate how a contest will start (e.g., when valid entries for the contest may be entered and/or received). The computing device 1952 may store, in the memory (e.g., in a contest database), the contest start condition data.

In various configurations, the computing device 1952 may include and/or present a contest end condition specification interface. The computing device may receive (from a remote computing device or from a local input device, for example), via the contest end condition specification interface, contest end condition data. For example, the computing device 1952 may receive user input indicating a selection of at least one of the end times, the total number of entries, or the number and type of rewards won. The contest end condition data may specify an end condition (e.g., an end time, an end event, a total number of entries, a number and type of rewards won, etc.). For example, a contest may end when a time has expired, when a number of entries are received, when a time (e.g., date) has arrived, when a number of entries are determined to be eligible for a reward, when a number of rewards are exhausted, etc. The end condition data may indicate how a contest will end (e.g., when entries for the contest may no longer be entered and/or received). The computing device 1952 may store, in the memory (e.g., in a contest database), the contest end condition data.

In various configurations, when the entry data is received, the computing device 1952 may determine whether the contest is active based on the contest start condition data and the contest end condition data. For example, if the contest start condition is satisfied (e.g., a start date has passed) and the contest end condition is not satisfied (e.g., an end date has not yet occurred), the contest may be active. Otherwise, the contest may be inactive or finished. The computing device 1952 may store only entry data that is received when the contest is active.

In various configurations, the computing device 1952 may include and/or present a contest bonus specification interface. An example of the bonus specification interface is given in connection with FIG. 7. The computing device 1952 may receive (from a remote computing device or from a local input device, for example), via the contest bonus specification interface, contest bonus data specifying one or more contest bonuses. Each contest bonus may indicate an additional contest opportunity in exchange for a specified bonus action. Examples of bonus actions may include sharing content (e.g., sharing the contest or other content), generating contest invitations, indicating praise of content, accessing online content, indicating event attendance (e.g., online or other event), following an account, completing a survey, propagating content (e.g., posting content on a webpage, social media platform, etc.), and subscribing to content (e.g., signing up for a mailing list, subscribing to a YouTube channel, etc.). The computing device 1952 may store, in the memory, the contest bonus data. For example, the computing device 1952 may store the contest bonus data in a database (in association with the contest, for instance). Additional detail on some approaches for specifying and/or creating a bonus is given in connection with one or more of FIGS. 7-9.

In various configurations, the computing device 1952 may track one or more bonus actions during the object-selection contest. For example, the computing device 1952 may track link clicking and/or API operation. In some configurations, the computing device 1952 may perform a bonus action on behalf of a user in response to user input. For instance, when a user clicks on a bonus, the computing device 1952 may perform the bonus action on behalf of the user using an API. If the bonus action is completed successfully (e.g., the third-party platform does not return an error), the computing device 1952 may record that the bonus action was completed. Additionally or alternatively, the computing device 1952 may track whether a link is clicked on a contest interface. In various configurations, the computing device 1952 may make a record in memory (e.g., in a database) of the bonus action(s) performed. The computing device 1952 may provide the additional contest opportunity to a participant in a case that the bonus action is performed successfully. As described above, performing a bonus action may require obtaining (e.g., presenting an interface for and/or receiving) authorization information from a participant in some approaches. For example, a pop-up window may be provided that requests authorization information for the contest platform to access a participant's account on a third-party platform. This may keep the participant on the contest platform (e.g., enable bonus action completion without a participant leaving the contest platform to navigate to a third-party platform).

In various configurations, the computing device 1952 may determine one or more contest analytics (e.g., statistics). For example, the computing device 1952 may determine, based on the entry data, a number of contest participants, a number of bonus actions performed, and/or a number of entries.

In various configurations, the computing device 1952 may include and/or present an active contests interface. The active contests interface may include a number of participants and/or a number of bonus actions performed for one or more active contests. Additionally or alternatively, the active contests interface may include executable code for accessing the one or more active contests, analytics of the one or more active contests (e.g., traffic sources, number of views over time, and/or a number of entries over time). Additionally or alternatively, the active contests interface may include a participant list for the one or more active contests, a winner list for the one or more active contests, build information of the one or more active contests, and/or a demo of the one or more active contests. An example of the active contests interface is given in connection with FIG. 5.

In various configurations, the computing device 1952 may include and/or present a finished contests interface. The finished contests interface may include one or more details (e.g., analytics, total number of entries, end time, participant list, winner list, traffic sources, number of views, build information, etc.) corresponding to the finished contest(s). An example of the finished contests interface is given in connection with FIG. 5.

In various configurations, the computing device 1952 may determine one or more return on investment metrics. For example, the computing device 1952 may obtain cost data (e.g., receive cost data from a sponsor device and/or calculate cost data based on a number of rewards and a cost per reward) associated with one or more reward redemptions for the object-selection contest. The computing device 1952 may additionally or alternatively obtain earnings data (e.g., sales data, profit data, etc.) associated with the one or more reward redemptions for the object-selection contest. For example, when a reward is redeemed, other earnings data (e.g., purchases, profit on purchases, etc.) associated with the reward redemption may be tracked. Based on the cost data and the earnings data, the computing device 1952 may calculate a return on investment (e.g., cost versus earnings). The computing device 1952 may present a return on investment interface indicating the return on investment.

In various configurations, the computing device 1952 may be integrated with a sales management system. For example, the sales management system may provide (e.g., send) the cost data and/or earnings data to the computing device 1952. For instance, the sales management system may monitor one or more point of sale systems for transactions associated with reward redemptions (e.g., reward codes provided for and/or associated with the contest). A cost of one or more redeemed rewards and/or earnings associated with the redeemed reward(s) may be sent to the computing device 1952 to calculate the return on investment. Additionally or alternatively, the sales management system may monitor one or more point of sale systems for browsing and/or purchases associated with a contest. For example, a contest interface may link to one or more product pages at a point of sale. The links may be associated with the contest. For example, the links may include identifiers associated with the contest. Accordingly, when a remote device accesses a point of sale system page requested via the link, the sales management system may determine and/or track purchases driven to the point of sale system because of or through to the contest.

Figure 20:
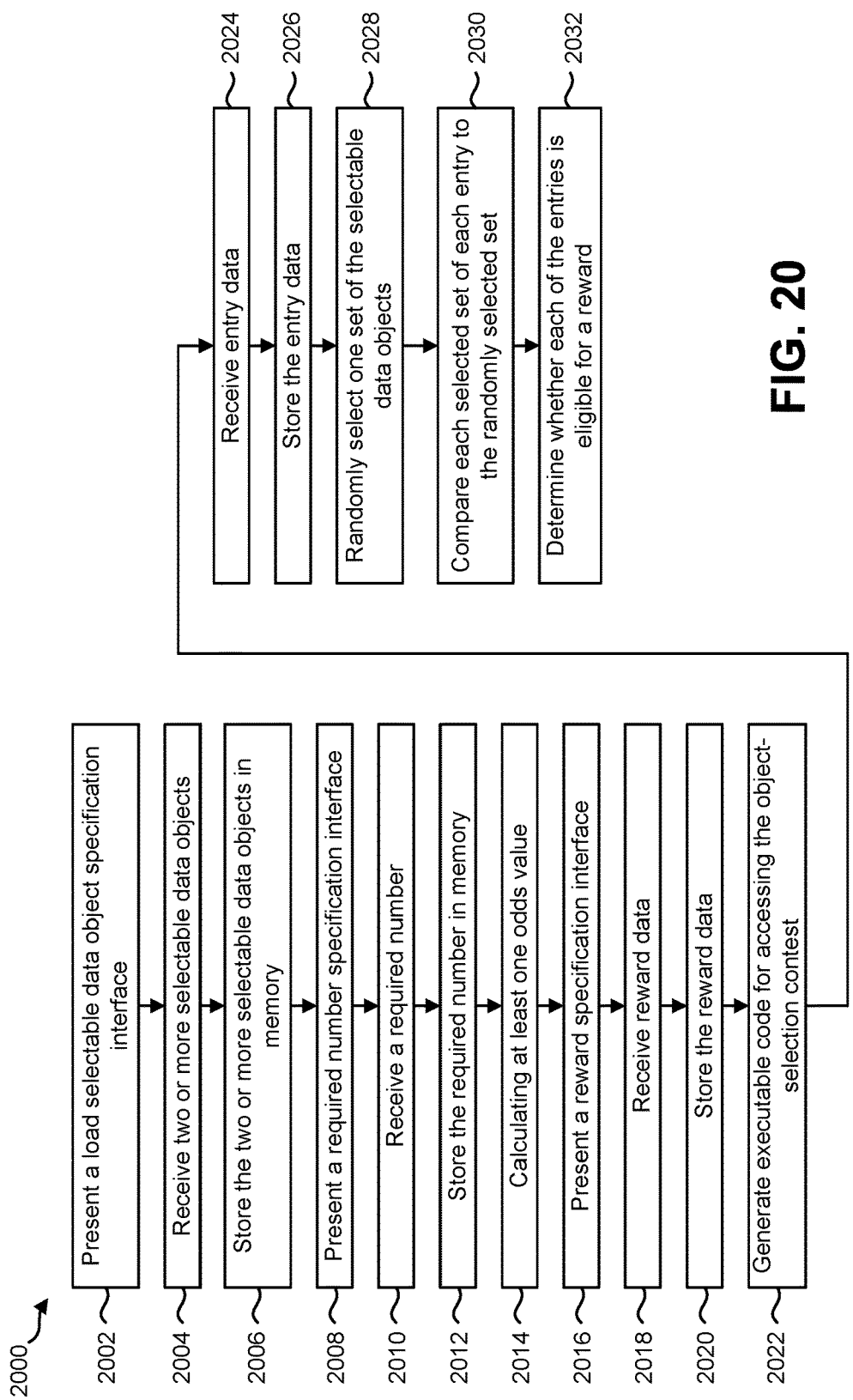
FIG. 20 is a flow diagram illustrating a configuration of a method for creating an object-selection contest.

FIG. 20 is a flow diagram illustrating a configuration of a method 2000 for creating an object-selection contest. The method 2000 may be performed by one or more of the computing devices described herein (e.g., computing device 452, computing device 1952, etc.).

The computing device may present 2002 a load selectable data object specification interface 1914. This may be accomplished as described in connection with FIG. 19. For example, the computing device may send code to a remote computing device for displaying the selectable data object specification interface.

The computing device may receive 2004 two or more selectable data objects. This may be accomplished as described in connection with FIG. 19. For example, the computing device may receive selectable objects data specifying the selectable data object(s) from a remote computing device and/or from an input port (e.g., USB port, Ethernet port, external device reader, etc.).

The computing device may store 2006 the two or more selectable data objects in memory. This may be accomplished as described in connection with FIG. 19. For example, the computing device may store 2006 the selectable objects data specifying the two or more selectable data objects at a particular address (e.g., set of pointers, etc.) in random access memory (RAM) and/or storage (e.g., hard disk drive (HDD), solid-state drive (SSD), etc.).

The computing device may present 2008 a required number specification interface 1916. This may be accomplished as described in connection with FIG. 19. For example, the computing device may send code to a remote computing device for displaying the required number specification interface 1916.

The computing device may receive 2010 the required number. This may be accomplished as described in connection with FIG. 19. For example, the computing device may receive required number data specifying the required number (e.g., a numeric value) from a remote computing device and/or from an input port (e.g., USB port, keyboard port, etc.).

The computing device may store 2012 the required number in memory. This may be accomplished as described in connection with FIG. 19. For example, the computing device may store 2012 the required number data specifying the required number (e.g., numeric value) at a particular address (e.g., a pointer, etc.) in RAM and/or other storage.

The computing device may calculate 2014 at least one odds value. This may be accomplished as described in connection with FIG. 19. For example, the computing device may calculate a probability of selecting one set (e.g., a winning set) of the required number of the selectable data objects from all possible sets of the required number of the selectable data objects.

The computing device may present 2016 a reward specification interface 1920. This may be accomplished as described in connection with FIG. 19. For example, the computing device may send code to a remote computing device for displaying the reward specification interface 1920.

The computing device may receive 2018 reward data. This may be accomplished as described in connection with FIG. 19. For example, the computing device may receive reward data specifying one or more rewards from one or more remote computing devices via a network (e.g., Internet) and/or from one or more input ports. In various configurations, the reward specification interface 1920 may present an association between each of the one or more rewards and at least one threshold number of matches with the randomly selected set (e.g., winning set) of data objects.

The computing device may store 2020 the reward data in memory. This may be accomplished as described in connection with FIG. 19. For example, the computing device may store 2020 the reward data at a particular address (e.g., set of pointers, etc.) in RAM and/or other storage.

The computing device may generate 2022 executable code for accessing the object-selection contest. This may be accomplished as described in connection with FIG. 19. For example, the computing device may generate executable code (e.g., embeddable code, HTML code, JavaScript code, etc.) that enables a remote computing device to access the contest (e.g., select one or more selectable data objects, submit an entry, etc.).

In various configurations, the computing device may publish the object-selection contest. For example, the computing device may run the executable code and/or may send (e.g., embed) the executable code to one or more remote devices and/or third-party platforms. In some approaches, the computing device may utilize one or more participant accounts (e.g., third-party platform authorization information corresponding to one or more participants) to post the executable code to one or more participant-associated third-party accounts (e.g., news feeds, social media postings, etc.).

The computing device may receive 2024 entry data. This may be accomplished as described in connection with FIG. 19. For example, the computing device may receive entry data specifying one or more entries from one or more remote computing devices via a network (e.g., Internet) and/or from one or more input ports. The entry data may indicate a selected set of the selectable data objects for each entry.

The computing device may store 2026 the entry data in memory. This may be accomplished as described in connection with FIG. 19. For example, the computing device may store 2026 the entry data at a particular address (e.g., set of pointers, etc.) in RAM and/or other storage.

The computing device may randomly select 2028 one set of the selectable data objects. This may be accomplished as described in connection with FIG. 19. For example, the computing device may utilize a random number generator to select the required number of the selectable data objects from the set of selectable data objects.

The computing device may compare 2030 each selected set of each entry to the randomly selected set. This may be accomplished as described in connection with FIG. 19. For example, the computing device may determine how many selected objects of the selected set match the randomly selected objects (from the winning set, for instance).

The computing device may determine 2032 whether each of the entries is eligible for a reward. This may be accomplished as described in connection with FIG. 19. For example, the computing device may determine whether the number of matches for each entry meets one or more threshold number of matches. If the number of matches for an entry meets a threshold number of matches that is associated with a reward, the computing device may determine 2032 that the entry is eligible for the associated reward. It should be noted that one or more of the functions and/or steps described in connection with FIG. 20 may be completed in a different order than the order shown in the method 2000 in various configurations.

In various configurations, presenting one or more of the interfaces described herein may comprise one or more of the steps of formatting, encoding, and/or transmitting instructions (e.g., HTML code, object code, etc.) to a remote device. The instructions may indicate one or more aspects (e.g., position, nesting, dimensions, color, style, elements, etc.) of the one or more interfaces. In various configurations, presenting one or more of the interfaces described herein may comprise one or more of the steps of executing instructions, rendering pixel data, and/or displaying the one or more interfaces.

In various configurations, receiving data (e.g., data objects, numbers, characters, instructions, etc.) may comprise one or more of the steps of receiving one or more electronic signals, demodulating the signals, decoding the signals, deformatting the signals, decrypting the signals, and/or interpreting the signals to obtain data.

In various configurations, transmitting or sending data (e.g., data objects, numbers, characters, instructions, etc.) may comprise one or more of the steps of formatting the data, encoding the data, modulating the data, encrypting the data, and/or generating an electronic signal (e.g., wire and/or wireless signal).

In various configurations, storing data (e.g., data objects, numbers, characters, instructions, etc.) may comprise one or more of the steps of allocating memory (e.g., allocating one or more memory addresses, pointers, etc., in non-volatile and/or volatile memory) and/or writing data to the memory.

In various configurations, determining (e.g., calculating, computing, selecting, comparing, generating, etc.) may comprise one or more of the steps of providing at least one instruction to one or more processors, executing the at least one instruction, and/or providing a result of the at least one instruction execution.

Figure 21:
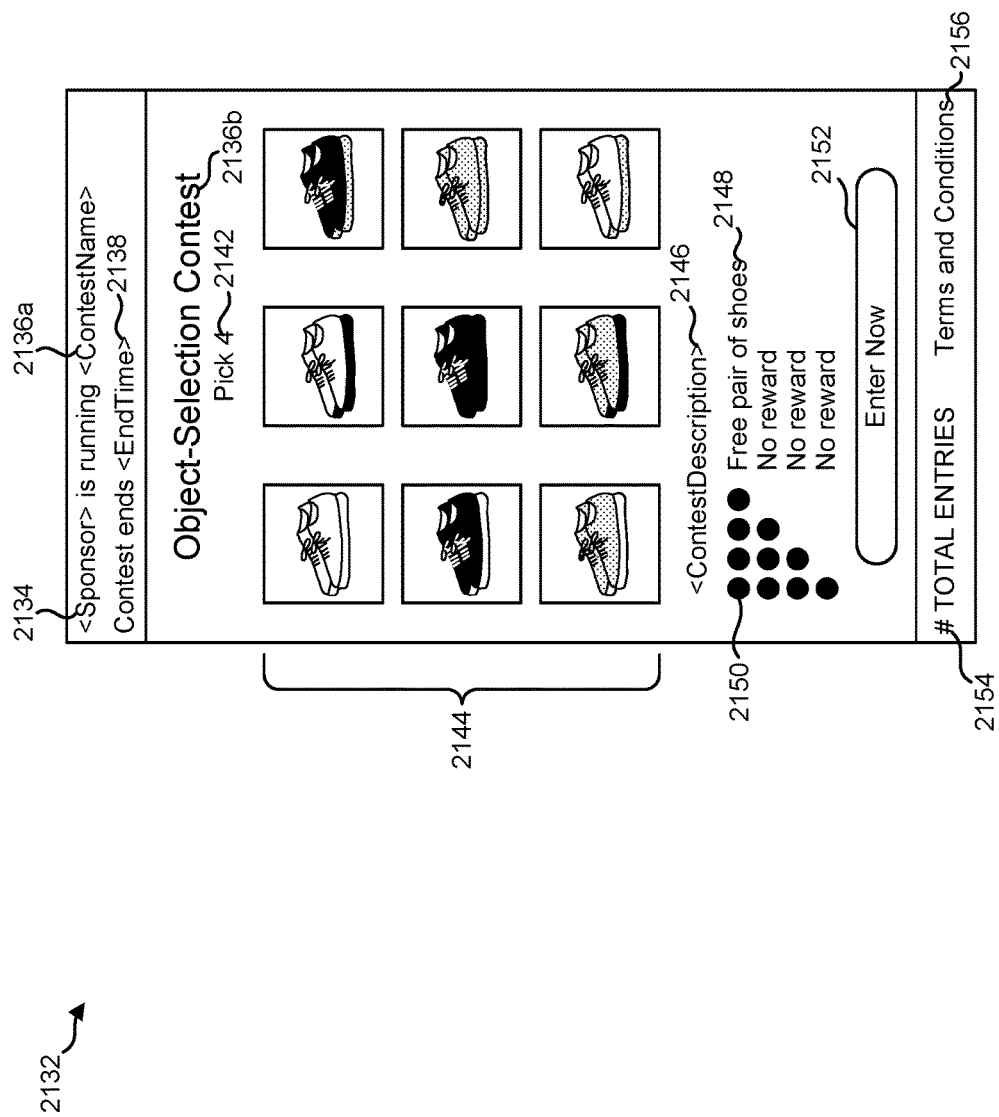
FIG. 21 is a diagram illustrating one example of a contest interface in accordance with various configurations of the systems and methods disclosed herein.

FIG. 21 is a diagram illustrating one example of a contest interface 2132 in accordance with various configurations of the systems and methods disclosed herein. The contest interface 2132 may enable a user (e.g., contest participant) to access an object-selection contest. In various configurations, the contest interface 2132 may be embedded in a feed (e.g., social media feed, news feed, etc.) and/or may be provided as part of a contest platform. In the example provided in FIG. 21, a user (e.g., participant) may input a selection indication (e.g., mouse click, touch, etc.) for indicating one or more selectable objects 2144 (e.g., products, commerce objects, etc.) as variables. In various configurations, the user (e.g., participant) may win a described reward (e.g., prize) when a set (e.g., winning set) of selectable objects is selected (e.g., drawn).

The contest interface 2132 may include a sponsor name 2134 (e.g., sponsor name, contest creator account name, etc.), a contest name 2136*a-b* (e.g., title), an end time 2138, a required number 2142, a set of selectable objects 2144 (e.g., selectable data objects), a contest description 2146, a reward description 2148, a match threshold 2150, an enter button 2152, a number of entries 2154, and/or a terms and conditions link 2156. Although a particular arrangement of interface elements is illustrated in FIG. 21, it should be noted that other arrangements of interface elements may be included. For example, various embodiments may additionally include a sponsor logo next to the sponsor name 2134. In certain embodiments, the end time 2138 could instead be an end condition of a number of entries. In various embodiments, the number of entries 2154 may not be shown, etc.

As described herein, a computing device (e.g., computing device 452, computing device 1952, etc.) may create a contest (e.g., obtain one or more parameters for a contest and/or generate executable code for accessing a contest). One or more of the elements of the contest interface 2132 may be included based on the parameters obtained (e.g., received and/or stored) during contest creation. For example, a computing device may generate executable code representing (e.g., for displaying) the contest interface 2132. The executable code may include one or more obtained parameters and/or may obtain link(s) to one or more parameters (that may have been stored in memory (e.g., in a contest database), for example). In various configurations, one or more of the corresponding elements of the contest interface 2132 may have been obtained through one or more contest creation interfaces (e.g., interfaces 102, 238, 344 described in connection with one or more of FIGS. 1-3).

The sponsor name 2134 may be a text name of a sponsor, account name, and/or entity name related to the contest. The contest name 2136*a-b* may be a text name (e.g., title) of the contest. The end time 2138 may be a text time (e.g., day, month, year, and/or time of day) indicating a time at which the contest will end. The required number 2142 may indicate a required number of the selectable objects 2144 for entering the contest. In the example in FIG. 21, the required number 2142 indicates that 4 out of 9 selectable objects should be selected for entering the contest.

The set of selectable objects 2144 (e.g., selectable data objects) may be objects that are individually selectable. For example, a computing device may receive an input (e.g., click input, touch input, gesture input, speech input, etc.) indicating or identifying one or more of the selectable objects 2144. In response, the contest interface 2132 may select the object(s). For example, the contest interface 2132 may maintain a state (e.g., record, memory, etc.) indicating which of the set of selectable objects 2144 has or have been selected. In various configurations, each of the selectable objects 2144 may depict a commercial object (e.g., a product, sponsor item, item for sale, etc.). In various configurations, the contest interface 2132 may provide a selection indication (e.g., highlighted, bolded outline, color, etc.) that indicates one or more selected objects.

The contest description 2146 may be a text description of the contest. The match threshold 2150 may indicate a threshold number of matches for a corresponding reward. In the example of FIG. 21, a match threshold of 4 (e.g., 4 matches with the winning set) is required to win a reward. Other match thresholds may be included. The reward description 2148 may be a text description of a reward. In the example of FIG. 21, a free pair of shoes is described corresponding to the match threshold of 4. Other reward descriptions may be included corresponding to other match thresholds.

The enter button 2152 may function to submit one or more entries for an object-selection contest. For example, if the enter button 2152 is activated (e.g., an event indicating an input corresponding to the enter button 2152 is detected), a computing device may save entry data (e.g., an indication of a selected set of the selectable objects 2144) in memory and/or submit (e.g., send) entry data (e.g., an indication of a selected set of the selectable objects 2144). For instance, a participant computing device (e.g., participant device 468) may send an entry (e.g., an indicator of the selected set) to another computing device (e.g., computing device 452) via a network.

The number of entries 2154 may indicate a total number of entries corresponding to the contest. For example, the number of entries 2154 may indicate a total number of entries at the time the contest interface 2132 was posted and/or displayed. In another example, the number of entries 2154 may indicate a real-time or near real-time total number of entries (which may be sent from a computing device hosting the contest, for instance). The terms and conditions link 2156 may provide a link to terms and conditions of the contest. As described herein, the terms and conditions may be generated based on a location (e.g., participant location, participant device location, etc.). For example, when a participant device runs executable code for the contest interface, the participant device may send information (e.g., global positioning system (GPS) data, Internet protocol (IP) address, etc.) that may be utilized by a contest-hosting computing device to determine a location of the participant device. The computing device that is hosting the contest may utilize the location of the participant device to dynamically generate terms and conditions for the location (e.g., city, county, state, region, and/or country, etc.) for the contest. Accordingly, the contest platform may provide different terms and conditions for differently located participant devices. The terms and conditions link 2156 may enable navigating to the terms and conditions for the contest.

Figure 22:
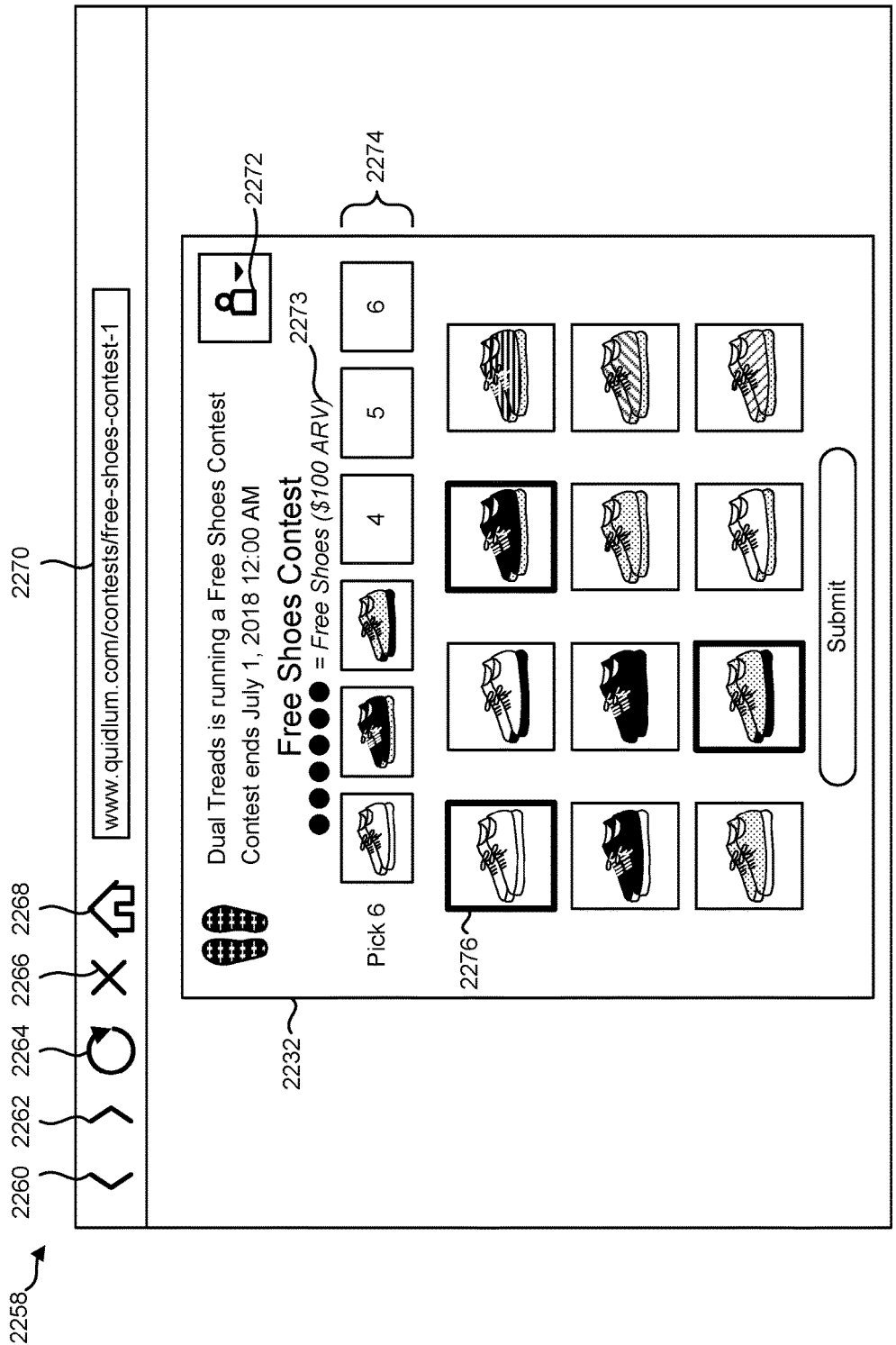
FIG. 22 is a diagram illustrating another example of a contest interface in accordance with various configurations of the systems and methods disclosed herein.

FIG. 22 is a diagram illustrating another example of a contest interface 2232 in accordance with various configurations of the systems and methods disclosed herein. In the example given in FIG. 22, the contest interface 2232 is presented in a browser (e.g., Internet browser). For instance, the contest interface 2232 may be embedded in a feed (e.g., social media feed, news feed, etc.) and/or may be provided as part of a contest platform. In the example provided in FIG. 22, a user (e.g., participant) may input a selection indication (e.g., mouse click, touch, etc.) for indicating one or more selectable objects (e.g., images of shoes) as variables.

The contest interface 2232 may include one or more elements similar to corresponding elements described in connection with FIG. 21. For example, the contest interface 2232 may include a sponsor name, a contest name, an end time, a required number, a set of selectable objects, and/or a submit button (e.g., enter button). The contest interface 2232 also includes selection indicators 2274, 2276. One of the selection indicators 2274 shows which of the selectable objects have been selected by showing a lineup of the selected objects. Another selection indicator 2276 shows a selected object with an outline of the selected object. In some examples, the contest interface 2232 may include a winning indicator 2273 indicating a number of matches required in order to win one or more rewards. In the example in FIG. 22, the winning indicator 2273 includes six dots indicating that six matches are required to win the described reward (e.g., free shoes at $100 approximate retail value (ARV)).

In some configurations, the contest interface 2232 may include and/or present an account dropdown 2272. The account dropdown 2272 may present an indication of one or more account actions (e.g., sign in, sign out, change account, account details, account settings, etc.). The account actions may indicate one or more actions that may be taken for or in connection with an account. If the account dropdown 2272 is selected (e.g., an event indicating an input corresponding to the account dropdown 2272 is detected), the account dropdown 2272 may present and enable selection of one of account actions. This may allow account control and/or navigation to more details regarding an account. An account may be associated with a user (e.g., individual, participant, etc.) of the contest interface. In various configurations, a user may be required to create an account to enter the contest. For example, a prompt may be provided to sign up when an entry is attempted to be submitted. The entry may be valid and/or stored if the user signs up. Otherwise, the entry may be invalid and/or not stored.

In the example given in FIG. 22, the contest interface 2232 may be presented in a browser 2258 (e.g., web browser). For instance, the browser 2258 may include a toolbar with a back button 2260, a forward button 2262, a refresh button 2264, a stop loading button 2266, and/or a home button 2268. The browser 2258 may also include an address field 2270. The address field 2270 may receive and/or display address (e.g., URL) information. For example, the address field 2270 may receive address information input with an input device (e.g., touch screen, keyboard, mouse, etc.) and/or populated with a link. In some configurations, a contest platform (e.g., contest participation platform) may be accessed remotely over a network (e.g., the Internet) using a browser. It should be noted that the contest interface 2232 may not be presented in a browser in some configurations and/or instances. For example, the contest interface 2232 may alternatively be presented in a local application window.

Figure 23:
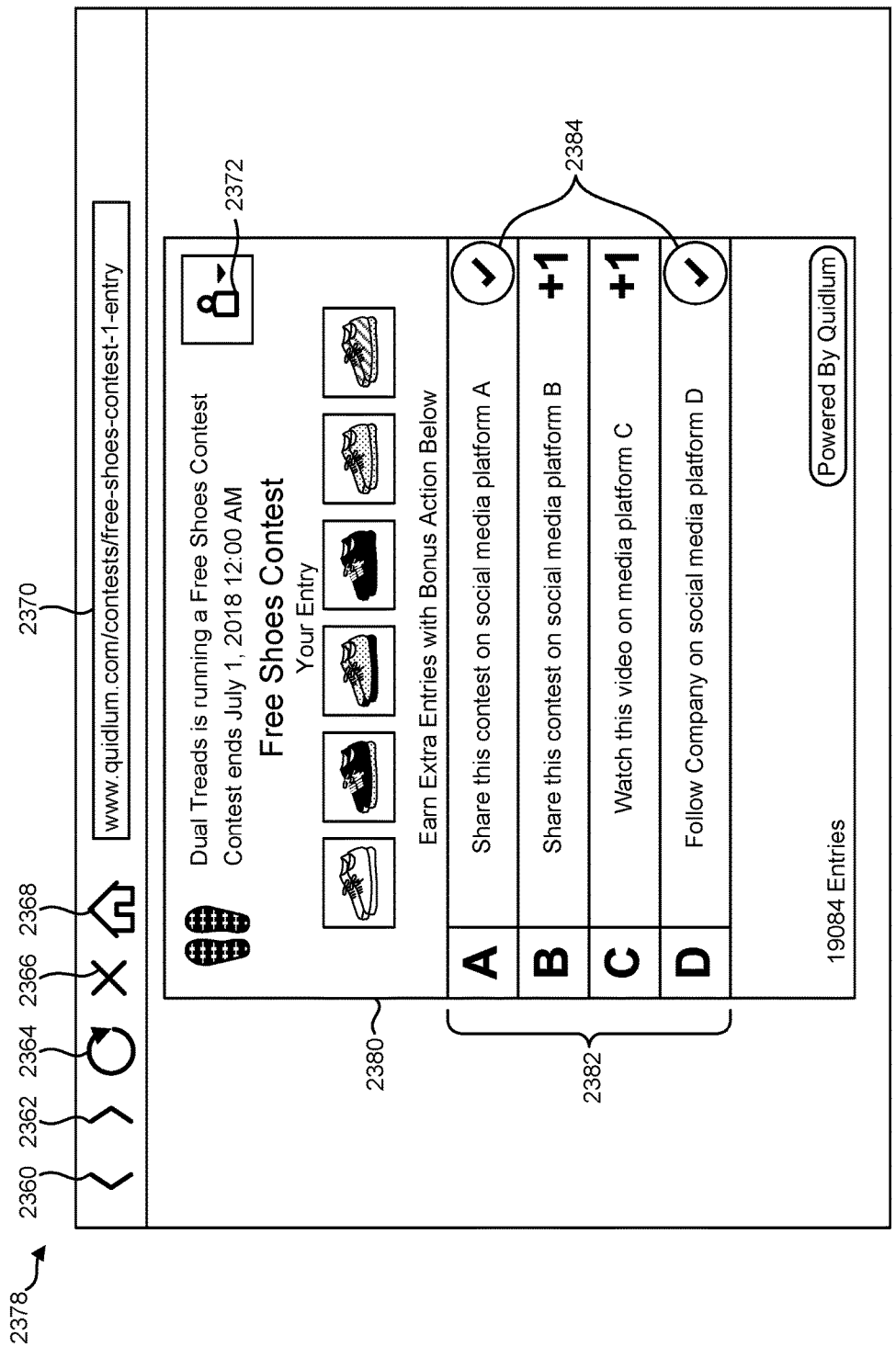
FIG. 23 is a diagram illustrating an example of a contest entry interface in accordance with various configurations of the systems and methods disclosed herein.

FIG. 23 is a diagram illustrating an example of a contest entry interface 2380 in accordance with various configurations of the systems and methods disclosed herein. In the example given in FIG. 23, the contest entry interface 2380 is presented in a browser 2378 (e.g., Internet browser). For instance, the contest entry interface 2380 may be embedded in a feed (e.g., social media feed, news feed, etc.) and/or may be provided as part of a contest platform. The contest entry interface 2380 may be presented (by a computing device, for example) in response to an entry submission.

The contest entry interface 2380 may include one or more elements similar to corresponding elements described in connection with FIG. 21. For example, the contest entry interface 2380 may include a sponsor name, a contest name, and/or an end time. The contest entry interface 2380 also includes a selection indicator corresponding to the entry.

In this example, the contest entry interface 2380 includes bonus interfaces 2382 representing multiple bonuses. In the example provided in FIG. 23, a user (e.g., participant) may input a bonus indication (e.g., mouse click, touch, etc.) for initiating performance of one or more bonus actions. If a bonus interface 2382 is clicked, for example, a computing device (e.g., computing device 452) may perform the bonus action corresponding to the bonus interface 2382 as described in connection with one or more of FIGS. 10-13. Bonus completion indicators 2384 are included in the bonus interfaces 2382. The bonus completion indicators 2384 may indicate whether bonus actions corresponding to the bonuses are completed.

In some configurations, the contest entry interface 2380 may include and/or present an account dropdown 2372. The account dropdown 2372 may present an indication of one or more account actions (e.g., sign in, sign out, change account, account details, account settings, etc.). The account actions may indicate one or more actions that may be taken for or in connection with an account. If the account dropdown 2372 is selected (e.g., an event indicating an input corresponding to the account dropdown 2372 is detected), the account dropdown 2372 may present and enable selection of one of the account actions.

In the example given in FIG. 23, the contest entry interface 2380 may be presented in a browser 2378 (e.g., web browser). For instance, the browser 2378 may include a toolbar with a back button 2360, a forward button 2362, a refresh button 2364, a stop loading button 2366, and/or a home button 2368. The browser 2378 may also include an address field 2370. The address field 2370 may receive and/or display address (e.g., URL) information. In some configurations, a contest platform (e.g., contest participation platform) may be accessed remotely over a network (e.g., the Internet) using a browser. It should be noted that the contest entry interface 2380 may not be presented in a browser in some configurations and/or instances. For example, the contest entry interface 2380 may alternatively be presented in a local application window.

Figure 24:
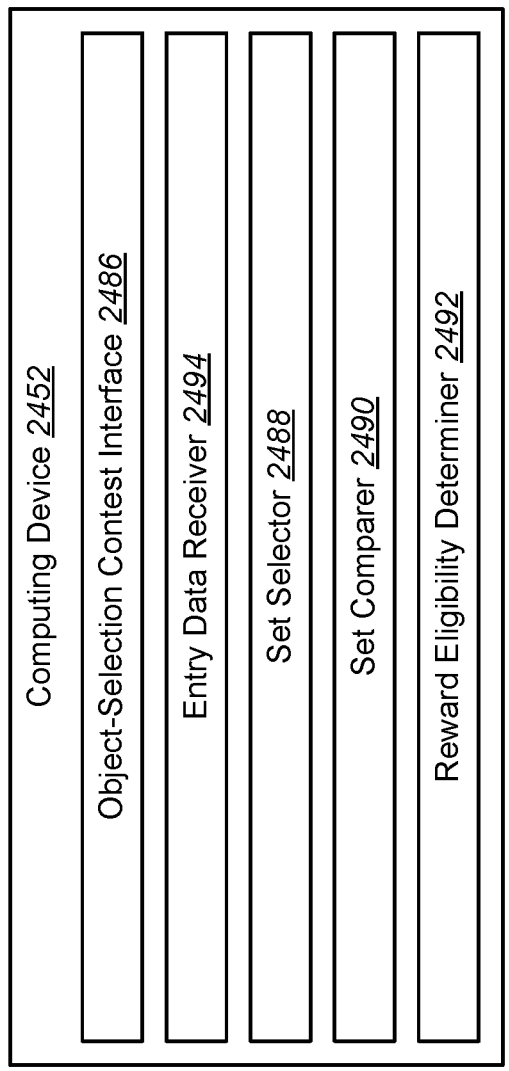
FIG. 24 is a functional block diagram illustrating another example of a computing device in which various configurations of the systems and methods disclosed herein may be implemented.

FIG. 24 is a functional block diagram illustrating another example of a computing device 2452 in which various configurations of the systems and methods disclosed herein may be implemented. The computing device 2452 may be an example of the computing device 452 described in connection with FIG. 4.

The computing device 2452 may include an object-selection contest interface 2486, an entry data receiver 2494, a set selector 2488, a set comparer 2490, and/or a reward eligibility determiner 2492. The computing device 2452 may present the object-selection contest interface 2486. For example, the computing device 2452 may send the object-selection contest interface 2486 to another computing device (e.g., a participant device over a network, a third-party computing device, etc.) for display and/or may display the object-selection contest interface 2486 locally. In some approaches, presenting the object-selection contest interface 2486 may include sending code (e.g., HTML code, JavaScript code, CSS code, Perl code, Python code, PHP code, ASP code, etc.) that specifies the object-selection contest interface 2486.

In various configurations, the object-selection contest interface 2486 may include a set (e.g., plurality) of independently selectable data objects (e.g., images, animations, videos, etc.). The data objects may be presented via one or more software applications (e.g., web browsers, windows, etc.). Each of the data objects may specify an image in some approaches. One or more of the data objects may be associated with a set of one or more vendors. For example, each data object may depict a commerce item (e.g., product, brand product, etc.) from one or more vendors. The object-selection contest interface 2486 may be electronically associated with one or more user accounts. In various configurations, the object-selection contest interface 2486 may include and/or indicate a contest start time section indicating a start time for one or more contests, a contest end time section indicating an end time for one or more contests, and/or a contest draw time indicating a draw time (e.g., a time when the computing device 2452 may randomly select the winning set of objects). An example of the object-selection contest interface 2486 is given in connection with FIG. 21.

In various configurations, the object-selection contest interface 2486 (e.g., executable code) may be embedded in one or more third-party platforms (e.g., placed in a post of a news feed, inserted into a webpage, etc.). One or more remote computing devices (e.g., the third-party platform(s) and/or participant device(s)) may display the object-selection contest interface (e.g., render the object-selection contest interface with one or more selectable data objects, contest details, etc.). For instance, a remote computing device (e.g., participant device) may run executable code that specifies the object-selection contest interface 2486, which may cause the remote computing device to request data (e.g., object(s), image(s), animation(s), video(s), text, etc.) from the computing device 2452 and/or to submit data (e.g., entry data, statistical data, usage data, etc.). Additionally or alternatively, running the executable code may cause the computing device to receive user input (e.g., entry data, object selections, participant identification information, account information, etc.) and send the user input (e.g., entry data) to the computing device 2452.

The entry data receiver 2494 may receive entry data specifying one or more (e.g., a set of) entries. For example, the computing device 2452 may receive (via a network interface and/or one or more input devices, for instance) data that specifies one or more contest entries. In various configurations, the entry data may be received from multiple remote computing devices and/or from an input interface on the computing device 2452. The entry data may indicate a selected set (e.g., selected set data) of the selectable data objects for each entry in the set of entries. The selected set (e.g., selected set data) may specify user input, received via the object-selection contest interface 2486, identifying a selected set of the selectable objects.

The computing device 2452 may store, in memory, the entry data. For example, the computing device 2452 may store the entry data in a particular location in memory and/or may associate the entry data with one or more variables. In various configurations, the computing device 2452 may store the entry data in a database. For example, a contest database may include one or more fields for storing the entry data in association with a contest (e.g., object-selection contest).

The set selector 2488 may select (e.g., randomly select) one set of the required number of the selectable data objects from among the two or more selectable data objects (e.g., individually and/or independently selectable data objects). For example, each of the selectable data objects may be assigned a number within a range. The set selector 2488 may include and/or use a random number generator to randomly generate a set of random numbers, where the size of the set is the required number. For example, if the required number is three, the random number generator may generate three random numbers within the range. The selectable data objects with assigned numbers matching the randomly generated numbers may be selected as the set (e.g., winning set) of the required number of the selectable data objects. In another example, the random number generator may randomly generate a set of numbers, which may be assigned (e.g., mapped) to the selectable data objects. The selectable data objects with random numbers that meet a criterion based on the required number (e.g., smallest five numbers, largest five numbers, five numbers nearest a mean of the random numbers, etc.) may be selected as the set (e.g., winning set) of the required number of the selectable data objects.

In various configurations, the computing device 2452 may determine when the entry data is received, whether the contest is active based on contest start condition data and contest end condition data. For example, if a contest start condition is satisfied (e.g., a start date has passed) and a contest end condition is not satisfied (e.g., an end date has not yet occurred), the contest may be active. Otherwise, the contest may be inactive or finished. The computing device 2452 may store only entry data that is received when the contest is active.

The set comparer 2490 may compare, for each entry in the set of entries, the selected set of the selectable data objects to the selected one set (e.g., winning set, randomly selected set, etc.) of the required number of the selectable data objects to determine a number of matches. For each entry, for example, the set comparer 2490 may determine how many of the selected objects of the entry match the randomly selected (e.g., drawn) set.

The reward eligibility determiner 2492 may determine whether each entry in the set of entries is eligible for the one or more rewards based on the number of matches and the at least one threshold number of matches. For example, the reward eligibility determiner 2492 may compare the number of matches for each entry with one or more match thresholds. For instance, if a first match threshold is six (for a first reward) and a second match threshold is five (for a second reward), the reward eligibility determiner 2492 may determine that an entry with five matches is not eligible for the first reward because the first match threshold is not met, and may determine that the entry is eligible for the second reward because the second match threshold is met.

Based on the eligibility determination, the computing device 2452 may produce eligibility data (e.g., eligibility indication, reward indication, reward code, and/or redemption instructions). For example, in a case that an entry is determined to be eligible for a reward, the computing device 2452 may produce eligibility data (e.g., an indication on a contest interface, for example) that the entry is eligible for a reward. In various configurations, the computing device 2452 may additionally or alternatively provide a reward indication (e.g., indicate the reward corresponding to the entry), may indicate a reward redemption code, and/or may indicate redemption instructions. In various configurations, the reward redemption instructions may include one or more reward redemption codes and/or a link to a point of sale of one or more vendors. The computing device 2452 may assign the one or more redemption codes to one or more user accounts. The reward redemption code(s) may be redeemable at the point of sale of one or more vendors. In a case that an entry is determined to be ineligible for a reward, the computing device 2452 may produce ineligibility data (e.g., an ineligibility indication). For example, in a case that an entry is determined to be ineligible for a reward, the computing device 2452 may produce ineligibility data (e.g., an indication on a contest interface, for example) that the entry is ineligible for a reward, such as a message, image, etc. In various configurations, the computing device 2452 may additionally or alternatively provide other information (e.g., the winning set, a comparison between the winning set and the selected set of the entry, etc.).

For example, if the comparison indicates at least a threshold number of matches between the stored selection set and the randomly generated winning set of the selectable objects, the computing device 2452 may provide a user interface presenting reward redemption instructions. If the comparison indicates that there are not a threshold number of matches met between the stored selection set and the randomly generated winning set of selectable objects, the computing device 2452 may provide a user interface presenting comparison results of the stored user selection and the randomly generated winning set of selectable objects. In various configurations, the reward redemption instructions may include one or more reward redemption codes and a link to a point of sale of the one or more vendors. Examples of user interfaces for rewards are provided in connection with FIGS. 14-15.

In various configurations, the computing device 2452 may include and/or present a bonus interface. An example of the bonus interface is given in connection with FIG. 23. The bonus interface may present one or more contest bonuses. Each contest bonus may indicate an additional contest opportunity (e.g., one or more additional entries) in exchange for a bonus action (e.g., sharing content, generating contest invitations, indicating praise of contest, accessing online content, indicating event attendance (e.g., online or other event), following an account, completing a survey, propagating content, and/or subscribing to content, etc.). In various configurations, the computing device 2452 may receive a bonus action initiation indicator. For example, the computing device 2452 may receive, via the bonus interface, an indicator that indicates initiation of a bonus action. For example, a participant device may generate the bonus initiation indicator in response to receiving an input (e.g., a click, touch, etc.) corresponding to the bonus interface. The computing device 2452 may perform a bonus action in response to receiving the bonus initiation indicator. Additional detail on some approaches for performing a bonus action is given in connection with one or more of FIGS. 10-13.

In various configurations, the computing device 2452 may track one or more bonus actions during the object-selection contest. For example, the computing device 2452 may track link clicking and/or API operation. For instance, when a user clicks on a bonus, the computing device 2452 may perform the bonus action on behalf of the user using an API. If the bonus action is completed successfully (e.g., the third-party platform does not return an error), the computing device 2452 may record that the bonus action was completed. In various configurations, the computing device 2452 may make a record in memory (e.g., in a database) of the bonus action(s) performed. The computing device 2452 may provide the additional contest opportunity to a participant in a case that the bonus action is performed successfully. As described above, performing a bonus action may require obtaining (e.g., presenting an interface for and/or receiving) authorization information from a participant in some approaches. For example, a pop-up window may be provided that requests authorization information for the contest platform to access a participant's account on a third-party platform. This may keep the participant on the contest platform (e.g., enable bonus action completion without a participant leaving the contest platform to navigate to a third-party platform).

In various configurations, the computing device 2452 may determine one or more contest analytics (e.g., statistics). For example, the computing device 2452 may determine, based on the entry data, a number of contest participants, a number of bonus actions performed, and/or a number of entries. One or more statistics (e.g., total number of entries) may be presented on the contest entry interface.

In various configurations, the computing device 2452 may include and/or present a contest set interface. The contest set interface may include a set of available contests (e.g., contests that are available for participation and/or entry). For example, a contest platform may include any contests that a user (e.g., user account) may currently enter.

In various configurations, the computing device 2452 may include and/or present a rewards interface. The rewards interface may indicate any rewards associated with the user (e.g., one or more user accounts) and/or any associated reward redemption instructions. Examples of the rewards interface are provided in connection with FIGS. 14-15.

In various configurations, the computing device 2452 may include and/or present an entries interface. The entries interface may include and/or indicate any active contest entries associated with the user (e.g., one or more user accounts). In some approaches, each active contest entry may include an indication of any available contest bonuses associated with the active contest entry. In various configurations, the entries interface may include and/or indicate any past contest entries (e.g., results) associated with the user (e.g., one or more user accounts). For example, each past contest entry for an object-selection contest may indicate a corresponding selected set of objects and a past winning set of objects. An example of an entries interface is given in connection with FIG. 16.

Figure 25:
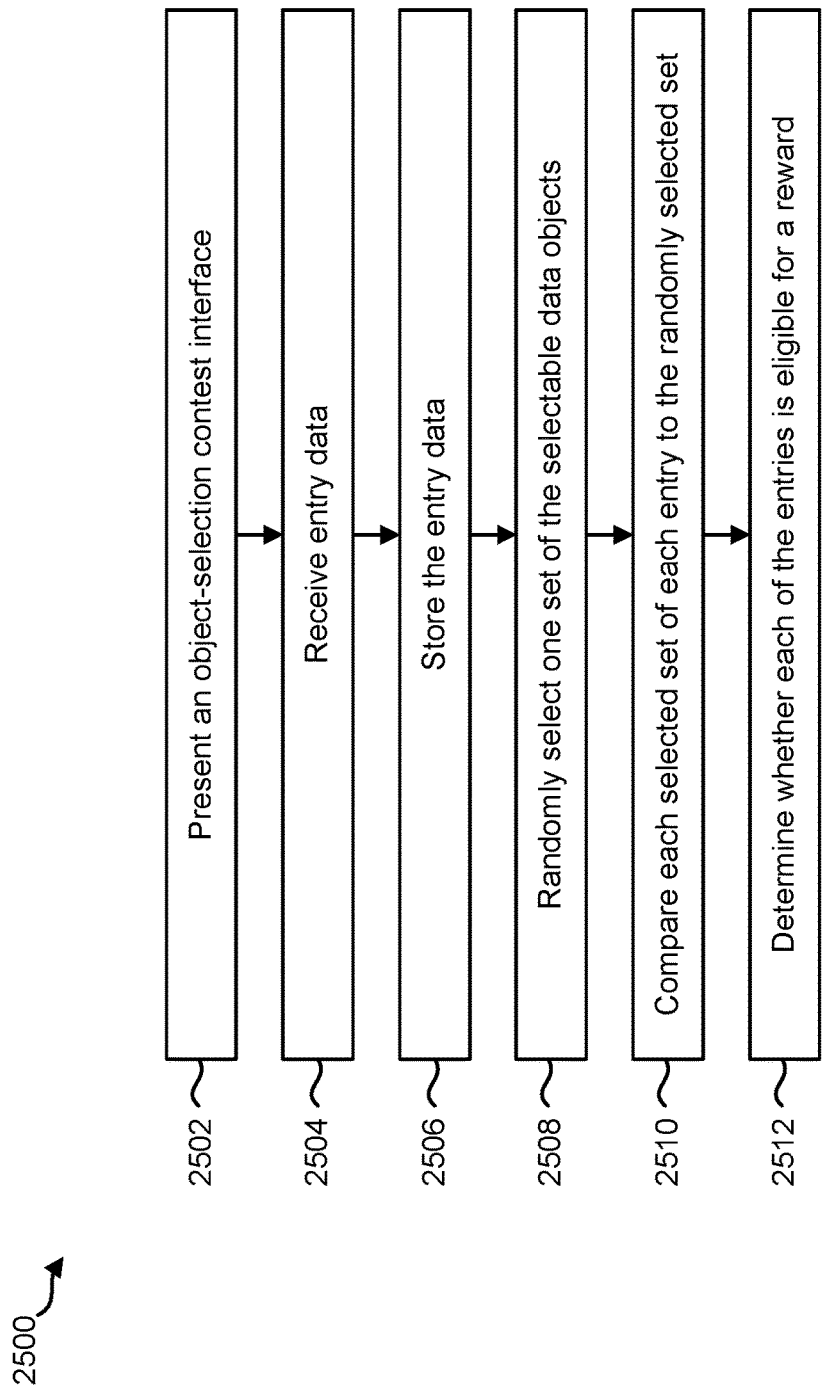
FIG. 25 is a flow diagram illustrating a configuration of a method for presenting an object-selection contest.

FIG. 25 is a flow diagram illustrating a configuration of a method 2500 for presenting an object-selection contest. The method 2500 may be performed by one or more of the computing devices described herein (e.g., computing device 452, computing device 1952, 2452, etc.).

The computing device may present 2502 an object-selection contest interface 2486. This may be accomplished as described in connection with FIG. 24. For example, the computing device may send code to a remote computing device for displaying the object-selection contest interface 2486. In various configurations, the object-selection contest interface 2486 may include a plurality of independently selectable data objects presented via one or more software applications. Each of the selectable data objects may specify an image (e.g., picture, animation, video, etc.). The object-selection contest interface 2486 may be associated with one or more user accounts. For example, a user may have an account with a contest platform (e.g., contest presentation platform), with which the object-selection contest interface 2486 may be associated. In some cases, the object-selection contest interface 2486 may be presented without an associated user account. In various configurations, a user may be required to obtain (e.g., sign up for) an account before any contest entry associated with the user is valid and/or recorded.

The computing device may receive 2504 entry data. This may be accomplished as described in connection with FIG. 24. For example, the computing device may receive entry data specifying one or more entries from one or more remote computing devices via a network (e.g., Internet) and/or from one or more input ports. The entry data may indicate (e.g., identify) a selected set of the required number of the selectable data objects for each entry.

The computing device may store 2506 the entry data in memory. This may be accomplished as described in connection with FIG. 24. For example, the computing device may store 2526 the entry data at a particular address (e.g., set of pointers, etc.) in RAM and/or other storage.

The computing device may randomly select 2508 one set of the selectable data objects (e.g., a required number of the selectable data objects). This may be accomplished as described in connection with FIG. 24. For example, the computing device may utilize a random number generator to select the required number of the selectable data objects from the set of selectable data objects.

The computing device may compare 2510 each selected set of each entry to the randomly selected set. This may be accomplished as described in connection with FIG. 24. For example, the computing device may determine how many selected objects of the selected set match the randomly selected objects (from the winning set, for instance).

The computing device may determine 2512 whether each of the entries is eligible for a reward. This may be accomplished as described in connection with FIG. 24. For example, the computing device may determine whether the number of matches for each entry meets one or more threshold number of matches. If the number of matches for an entry meets a threshold number of matches that is associated with a reward, the computing device may determine 2532 that the entry is eligible for the associated reward.

Figure 26:
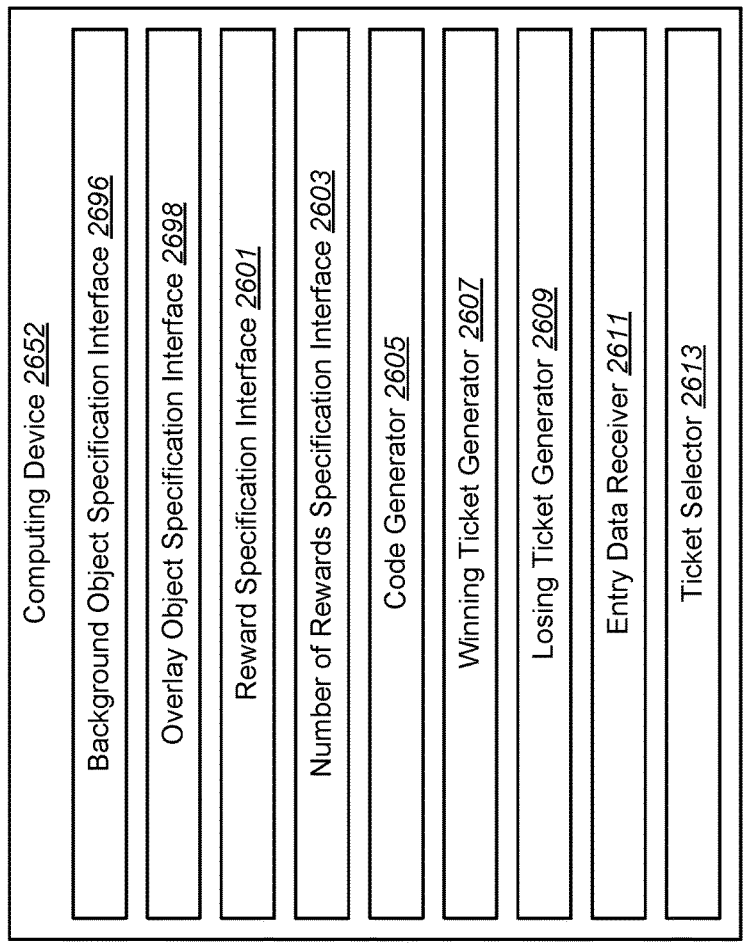
FIG. 26 is a functional block diagram illustrating another example of a computing device in which various configurations of the systems and methods disclosed herein may be implemented.

FIG. 26 is a functional block diagram illustrating another example of a computing device 2652 in which various configurations of the systems and methods disclosed herein may be implemented. The computing device 2652 may be an example of the computing device 452 described in connection with FIG. 4.

The computing device 2652 may include a background object specification interface 2696, an overlay object specification interface 2698, a reward specification interface 2601, a number of rewards specification interface 2603, a code generator 2605, a winning ticket generator 2607, a losing ticket generator 2609, an entry data receiver 2611, and/or a ticket selector 2613. The computing device 2652 may present the background object specification interface 2696. For example, the computing device 2652 may send the background object specification interface 2696 to another computing device (e.g., a sponsor device over a network) for display and/or may display the background object specification interface 2696 locally. In some approaches, presenting the background object specification interface 2696 may include sending code (e.g., HTML code, JavaScript code, CSS code, Perl code, Python code, PHP code, ASP code, etc.) that specifies the background object specification interface 2696.

A background object may be an object that appears to be in the background (e.g., covered and/or overlaid with an overlay object). For example, a background object may be an object that may be revealed by removing an overlay object. In various configurations, background object(s) may depict one or more objects (e.g., images, animations, videos, etc.). In some cases, the background object(s) may depict one or more patterns of images. For example, the background object(s) may depict a line, grid, circle, and/or other pattern of objects. One or more particular background objects and/or patterns of background objects may indicate a winning ticket. In various configurations, one or more background objects may depict one or more commercial objects (e.g., products, items associated with a vendor, etc.).

The computing device 2652 may receive, via the background object specification interface 2696, one or more data objects. Each of data object(s) may specify a visually perceptible element (e.g., image, animation, video, symbol, text, etc.). For example, the computing device 2652 may receive (via a network interface and/or one or more input devices, for instance) one or more background data objects. The background object specification interface 2696 may be utilized to specify the background data object(s) for reception. For example, the background object specification interface 2696 may receive (based on user input, for instance) one or more memory addresses, memory pointers, web addresses, etc., that specify the memory location of a data object (e.g., image, animation, video, symbol, text, visually perceptible element, etc.). In some approaches, a drag-and-drop mechanism may be utilized to specify the data object (e.g., location) for reception.

The computing device 2652 may store, in memory, the one or more background data objects. For example, the computing device 2652 may store the background data object(s) in a particular location in memory and/or may associate each background data object with a particular variable. In various configurations, the computing device 2652 may store the background data object(s) in a database. For example, a contest database may include one or more fields for storing the background data objects in association with a contest (e.g., object-overlay contest).

The computing device 2652 may present the overlay object specification interface 2698. For example, the computing device 2652 may send the overlay object specification interface 2698 to another computing device (e.g., a sponsor device over a network) for display and/or may display the overlay object specification interface 2698 locally. In some approaches, presenting the overlay object specification interface 2698 may include sending code that specifies the overlay object specification interface 2698.

An overlay object may be an object that appears to be in the foreground (e.g., covering a background object). For example, an overlay object may be an object that may be removed to reveal a background object. In various configurations, overlay object(s) may depict one or more objects (e.g., images, animations, videos, etc.). In some approaches, one overlay object may cover multiple background objects. In other approaches, each overlay object may cover one background object. For example, each overlay object may cover one background object in a pattern (e.g., line, grid, circle, and/or other pattern). In various configurations, one or more overlay objects may depict one or more commercial objects (e.g., products, items associated with a vendor, etc.).

The computing device 2652 may receive, via the overlay object specification interface 2698, one or more data objects. Each of data object(s) may specify a visually perceptible element (e.g., image, animation, video, symbol, text, etc.). For example, the computing device 2652 may receive (via a network interface and/or one or more input devices, for instance) one or more overlay data objects. The overlay object specification interface 2698 may be utilized to specify the overlay data object(s) for reception. For example, the overlay object specification interface 2698 may receive (based on user input, for instance) one or more memory addresses, memory pointers, web addresses, etc., that specify the memory location of a data object (e.g., image, animation, video, symbol, text, visually perceptible element, etc.). In some approaches, a drag-and-drop mechanism may be utilized to specify the data object (e.g., location) for reception.

The computing device 2652 may store, in memory, the one or more overlay data objects. For example, the computing device 2652 may store the overlay data object(s) in a particular location in memory and/or may associate each overlay data object with a particular variable. In various configurations, the computing device 2652 may store the overlay data object(s) in a database. For example, a contest database may include one or more fields for storing the overlay data objects in association with a contest (e.g., object-overlay contest).

The computing device 2652 may present the reward specification interface 2601. For example, the computing device 2652 may send the reward specification interface 2601 to another computing device (e.g., a sponsor device over a network) for display and/or may display the reward specification interface 2601 locally. In some approaches, presenting the reward specification interface 2601 may include sending code that specifies the reward specification interface 2601.

The computing device 2652 may receive, via the reward specification interface 2601, reward data specifying one or more rewards. For example, the computing device 2652 may receive (via a network interface and/or one or more input devices, for instance) data (e.g., reward name, reward description, reward redemption code(s), etc.) and/or one or more objects (e.g., image(s), animation(s), video(s), etc.) that specify the one or more rewards. The reward specification interface 2601 may be utilized to specify the reward data for reception. For example, the reward specification interface 2601 may receive (based on user input, for instance) one or more memory addresses, memory pointers, web addresses, etc., that specify the memory location of reward data (e.g., image, animation, video, symbol, text, etc.). In some approaches, a drag-and-drop mechanism may be utilized to specify the reward data (e.g., location) for reception. Additionally or alternatively, the reward specification interface 2601 may receive (based on user input, for instance) reward data (e.g., text indicating a reward name and/or reward description). In various configurations, the computing device 2652 may receive, via the reward specification interface, one or more reward redemption codes. In some examples, the reward redemption codes may be automatically generated by a sponsor device. Additionally or alternatively, one or more reward redemption codes may not be generated automatically (e.g., may be received based on input from a sponsor). For example, one or more reward redemption codes may not be generated by a processor.

The computing device 2652 may store, in memory, the reward data. For example, the computing device 2652 may store the reward data in a particular location in memory and/or may associate the reward data with one or more variables. In various configurations, the computing device 2652 may store the reward data in a database. For example, a contest database may include one or more fields for storing the reward data in association with a contest (e.g., object-overlay contest).

In various configurations, the reward specification interface 2601 may present an association between each of the one or more rewards and a winning background object and/or one or more winning background object patterns. For instance, reward data (e.g., a reward description and/or an image of the reward) may be presented with a winning pattern. Reward data may additionally or alternatively be presented with other winning patterns.

In various configurations, the computing device 2652 may present the number of rewards specification interface 2603. For example, the computing device 2652 may send the number of rewards specification interface 2603 to another computing device (e.g., a sponsor device over a network) for display and/or may display the number of rewards specification interface 2603 locally. In some approaches, presenting the number of rewards specification interface 2603 may include sending code that specifies the number of rewards specification interface 2601.

The computing device 2652 may receive, via the number of rewards specification interface 2603, a number of rewards. The number of rewards may specify a number and/or type of rewards available. The number of rewards specification interface 2603 may be utilized to specify one or more numbers and/or types of rewards available for redemption. For example, the number of rewards specification interface 2603 may receive (based on user input, for instance) the number(s) of rewards.

The computing device 2652 may store, in memory, the number(s) and/or type(s) of reward(s). For example, the computing device 2652 may store the number(s) and/or type(s) of reward(s) in a particular location in memory and/or may associate the number(s) and/or type(s) of reward(s) with one or more variables. In various configurations, the computing device 2652 may store the number(s) and/or type(s) of reward(s) in a database. For example, a contest database may include a field for storing the number(s) and/or type(s) of reward(s) in association with a contest (e.g., object-overlay contest).

The code generator 2605 may generate executable code for accessing the contest (e.g., online object-overlay contest). In various configurations, the executable code may be generated based on the background data object(s) and/or the overlay data object(s). For example, the code generator 2605 may generate executable code representing a contest interface for accessing (e.g., participating in) the contest. For instance, the executable code may include instructions for accessing the contest (e.g., object-overlay contest) when embedded in a webpage (e.g., social media platform, news feed, etc.). In various configurations, the code generator 2605 may generate executable code that represents the contest interface, including one or more elements for the background data object(s), one or more elements for the overlay data object(s), and/or one or more elements for the reward data, etc. Additionally or alternatively, the executable code representing the contest interface may include one or more other elements, such as a contest name, contest description, start condition, end condition, odds, and/or age requirement.

In various configurations, the computing device 2652 may publish the contest (e.g., object-overlay contest). For example, the computing device 2652 may send the executable code to one or more remote computing devices (e.g., third-party platforms, participant device(s), etc.). Additionally or alternatively, the computing device 2652 may run the executable code locally.

In various configurations, the executable code may be embedded in one or more third-party platforms (e.g., placed in a post of a news feed, inserted into a webpage, etc.). One or more remote computing devices (e.g., the third-party platform(s) and/or participant device(s)) may run the executable code. Running the executable code may enable access to the contest. For example, a remote computing device may run the executable code, which may cause the remote computing device to request data (e.g., object(s), image(s), animation(s), video(s), text, etc.) from the computing device 2652 and/or to submit data (e.g., entry data, statistical data, usage data, etc.). For example, running the executable code may cause the computing device to display the contest interface (e.g., render the contest interface with one or more background data objects, one or more overlay data objects, contest details, etc.). Additionally or alternatively, running the executable code may cause the computing device to receive user input (e.g., entry data, participant identification information, account information, etc.) and send the user input (e.g., entry data) to the computing device 2652.

The winning ticket generator 2607 may generate one or more winning tickets. A winning ticket may be a ticket with a winning background object and/or a winning pattern of background objects. In various configurations, the winning ticket generator 2607 may generate one or more winning tickets based on the number of rewards and the one or more background data objects. For example, the winning ticket generator 2607 may generate only a number of winning tickets corresponding to a number and/or type of rewards. For instance, the winning ticket generator 2607 may generate a number of tickets with the winning background object and/or winning pattern(s) of background objects limited to the number and/or type of available rewards. In various configurations, the one or more winning tickets may include one or more winning combination patterns of the one or more background objects. For example, a winning ticket may have a line (e.g., row, column, etc.) of the same kind of background objects (e.g., three in a row, etc.).

The losing ticket generator 2609 may generate one or more losing tickets. For example, the losing ticket generator 2609 may generate a predetermined number of losing tickets and/or a dynamic number of losing tickets. In some approaches, the computing device 2652 may include and/or present an odds interface utilized to receive an odds value based on input. For example, a user may specify a maximum odds value for the object-overlay contest. Generating the one or more winning tickets and/or generating the one or more losing tickets may be based on a received odds input indicating a specified odds (of winning and/or losing). For example, the losing ticket generator 2609 may generate a number of losing tickets such that the odds of getting a winning ticket are equal to or less than the maximum odds value. In some approaches, the losing ticket generator 2609 may generate losing tickets dynamically. For instance, when an entry is received, the computing device 2652 may determine whether the entry is a winning entry (e.g., whether a random number generator has generated a winning number for the entry). If the entry is not a winning entry, the losing ticket generator 2609 may generate a losing ticket. If the entry is a winning entry, the winning ticket generator 2607 may generate a winning ticket. Other approaches for generating tickets may be implemented.

The entry data receiver 2611 may receive entry data specifying a set of entries. For example, the computing device 2652 may receive (via a network interface and/or one or more input devices, for instance) data that specifies one or more object-overlay contest entries. In various configurations, the entry data may be received from multiple remote computing devices and/or from an input interface on the computing device 2652. The entry data may indicate one or more requests for an object-overlay ticket.

The ticket selector 2613 may select (e.g., randomly select) a ticket for each of the contest entries. For example, the ticket selector 2613 may randomly select a ticket from the set of one or more winning tickets and the set of one or more losing tickets for each object-overlay contest entry. The ticket selector 2613 may include and/or use a random number generator to randomly select one or more tickets. For example, each of the tickets (e.g., winning ticket(s) and/or losing ticket(s)) may be assigned a number. The random number generator may generate a number in the range of assigned numbers (excluding any previously selected ticket numbers, for example), where the randomly generated number indicates the selected ticket. In another example, the random number generator may randomly generate a number in a particular range. If the number meets a criterion (e.g., is less than a threshold in the range, is one of a set of predetermined winning numbers, etc.), the ticket selector 2613 may select a winning ticket. Otherwise, a losing ticket may be selected. In some approaches, the winning ticket generator 2607 and/or the losing ticket generator 2609 may generate a winning ticket or a losing ticket based on the random number generator.

Each selected ticket may be associated with an entry. For example, the computing device 2652 may store, in memory, the selected ticket in association with an entry. For example, the computing device 2652 may store the entry data in a particular location in memory and/or may associate the entry data with the selected ticket. In various configurations, the computing device 2652 may store the entry data and selected ticket(s) in a database. For example, a contest database may include one or more fields for storing the entry data in association with a contest (e.g., object-overlay contest).

In various configurations, the selected ticket may be presented to a contest participant (via an object-overlay contest interface, for example). In some approaches, the computing device 2652 may receive an indication of whether the overlay object has been removed from the background object. Based on the eligibility of the ticket (e.g., whether the ticket associated with the entry is a winning ticket or a losing ticket), the computing device 2652 may produce eligibility data (e.g., eligibility indication, reward indication, reward code, and/or redemption instructions). For example, in a case that an entry is determined to be eligible for a reward, the computing device 2652 may produce eligibility data (e.g., an indication on a contest interface, for example) that the entry is eligible for a reward. In various configurations, the computing device 2652 may additionally or alternatively provide a reward indication (e.g., indicate the reward corresponding to the entry), may indicate a reward code, and/or may indicate redemption instructions. In a case that an entry is determined to be ineligible for a reward, the computing device 2652 may produce ineligibility data (e.g., an ineligibility indication). For example, in a case that an entry is determined to be ineligible for a reward, the computing device 2652 may produce ineligibility data (e.g., an indication on a contest interface, for example) that the entry is ineligible for a reward, such as a message, image, etc. In various configurations, the computing device 2652 may additionally or alternatively provide other information (e.g., the winning background object(s), a comparison between the winning ticket and the ticket corresponding to the entry, etc.).

It should be noted that in various configurations, the computing device 2652 may include one or more interfaces that may be presented for receiving one or more contest details (e.g., contest name, contest description, start condition, end condition, odds, and/or age requirement). The one or more contest details may be received and/or stored (in memory and/or in a contest database, etc.). The code generator 2605 may utilize the one or more stored contest details for generating executable code with one or more elements for one or more contest details.

In various configurations, the computing device 2652 may include and/or present a contest start condition specification interface. The computing device may receive (from a remote computing device or from a local input device, for example), via the contest start condition specification interface, contest start condition data. The contest start condition data may specify a start condition (e.g., a start time, a start event, a trigger, etc.). The start condition data may indicate how a contest will start (e.g., when valid entries for the contest may be entered and/or received). The computing device 2652 may store, in the memory (e.g., in a contest database), the contest start condition data.

In various configurations, the computing device 2652 may include and/or present a contest end condition specification interface. The computing device may receive (from a remote computing device or from a local input device, for example), via the contest end condition specification interface, contest end condition data. For example, the computing device 2652 may receive user input indicating a selection of at least one of the end time, the total number of entries, or the number and type of rewards won. The contest end condition data may specify an end condition (e.g., an end time, an end event, a total number of entries, a number and type of rewards won, etc.). For example, a contest may end when a time has expired, when a number of entries are received, when a time (e.g., date) has arrived, when a number of entries are determined to be eligible for a reward, when a number of rewards are exhausted, etc. The end condition data may indicate how a contest will end (e.g., when entries for the contest may no longer be entered and/or received). The computing device 2652 may store, in the memory (e.g., in a contest database), the contest end condition data.

In various configurations, the computing device 2652 may determine when the entry data is received, whether the contest is active based on the contest start condition data and the contest end condition data. For example, if the contest start condition is satisfied (e.g., a start date has passed) and the contest end condition is not satisfied (e.g., an end date has not yet occurred), the contest may be active. Otherwise, the contest may be inactive or finished. The computing device 2652 may store only entry data that is received when the contest is active.

In various configurations, the computing device 2652 may include and/or present a contest bonus specification interface. An example of the bonus specification interface is given in connection with FIG. 7. The computing device 2652 may receive (from a remote computing device or from a local input device, for example), via the contest bonus specification interface, contest bonus data specifying one or more contest bonuses. Each contest bonus may indicate an additional contest opportunity in exchange for a specified bonus action. Examples of bonus actions may include sharing content (e.g., sharing the contest or other content), generating contest invitations, indicating praise of content, accessing online content, indicating event attendance (e.g., online or other event), following an account, completing a survey, propagating content (e.g., posting content on a webpage, social media platform, etc.), and subscribing to content (e.g., signing up for a mailing list, subscribing to a YouTube channel, etc.). The computing device 2652 may store, in the memory, the contest bonus data. For example, the computing device 2652 may store the contest bonus data in a database (in association with the contest, for instance). Additional detail on some approaches for specifying and/or creating a bonus is given in connection with one or more of FIGS. 7-9.

In various configurations, the computing device 2652 may track one or more bonus actions during the object-overlay contest. For example, the computing device 2652 may track link clicking and/or API operation. For instance, when a user clicks on a bonus, the computing device 2652 may perform the bonus action on behalf of the user using an API. If the bonus action is completed successfully (e.g., the third-party platform does not return an error), the computing device 2652 may record that the bonus action was completed. Additionally or alternatively, the computing device 2652 may track whether a link is clicked on a contest interface. In various configurations, the computing device 2652 may make a record in memory (e.g., in a database) of the bonus action(s) performed. The computing device 2652 may provide the additional contest opportunity to a participant in a case that the bonus action is performed successfully. As described above, performing a bonus action may require obtaining (e.g., presenting an interface for and/or receiving) authorization information from a participant in some approaches. For example, a pop-up window may be provided that requests authorization information for the contest platform to access a participant's account on a third-party platform. This may keep the participant on the contest platform (e.g., enable bonus action completion without a participant leaving the contest platform to navigate to a third-party platform).

In various configurations, the computing device 2652 may determine one or more contest analytics (e.g., statistics). For example, the computing device 2652 may determine, based on the entry data, a number of contest participants, a number of bonus actions performed, and/or a number of entries.

In various configurations, the computing device 2652 may include and/or present an active contests interface. The active contests interface may include a number of participants and/or a number of bonus actions performed for one or more active contests. Additionally or alternatively, the active contests interface may include executable code for accessing the one or more active contests and/or analytics of the one or more active contests (e.g., traffic sources, number of views over time, and/or a number of entries over time). Additionally or alternatively, the active contests interface may include a participant list for the one or more active contests, a winner list for the one or more active contests, build information of the one or more active contests, and/or a demo of the one or more active contests. An example of the active contests interface is given in connection with FIG. 5.

In various configurations, the computing device 2652 may include and/or present a finished contests interface. The finished contests interface may include one or more details (e.g., analytics, total number of entries, end time, participant list, winner list, traffic sources, number of views, build information, etc.) corresponding to the finished contest(s). An example of the finished contests interface is given in connection with FIG. 5.

In various configurations, the computing device 2652 may determine one or more return on investment metrics. For example, the computing device 2652 may obtain cost data (e.g., receive cost data from a sponsor device and/or calculate cost data based on a number of rewards and a cost per reward) associated with one or more reward redemptions for the object-overlay contest. The computing device 2652 may additionally or alternatively obtain earnings data (e.g., sales data, profit data, etc.) associated with the one or more reward redemptions from the object-overlay contest. For example, when a reward is redeemed, other earnings data (e.g., purchases, profit on purchases, etc.) associated with the reward redemption may be tracked. Based on the cost data and the earnings data, the computing device 2652 may calculate a return on investment (e.g., cost versus earnings). The computing device 2652 may present a return on investment interface indicating the return on investment.

In various configurations, the computing device 2652 may be integrated with a sales management system. For example, the sales management system may provide (e.g., send) the cost data and/or earnings data to the computing device 2652. For instance, the sales management system may monitor one or more point of sale systems for transactions associated with reward redemptions (e.g., reward codes provided for and/or associated with the contest). A cost of one or more redeemed rewards and/or earnings associated with the redeemed reward(s) may be sent to the computing device 2652 to calculate the return on investment. Additionally or alternatively, the sales management system may monitor one or more point of sale systems for browsing and/or purchases associated with a contest. For example, a contest interface may link to one or more product pages at a point of sale. The links may be associated with the contest. For example, the links may include identifiers associated with the contest. Accordingly, when a remote device accesses a point of sale system page requested via the link, the sales management system may determine and/or track purchases driven to the point of sale system due or because of to the contest.

Figure 27:
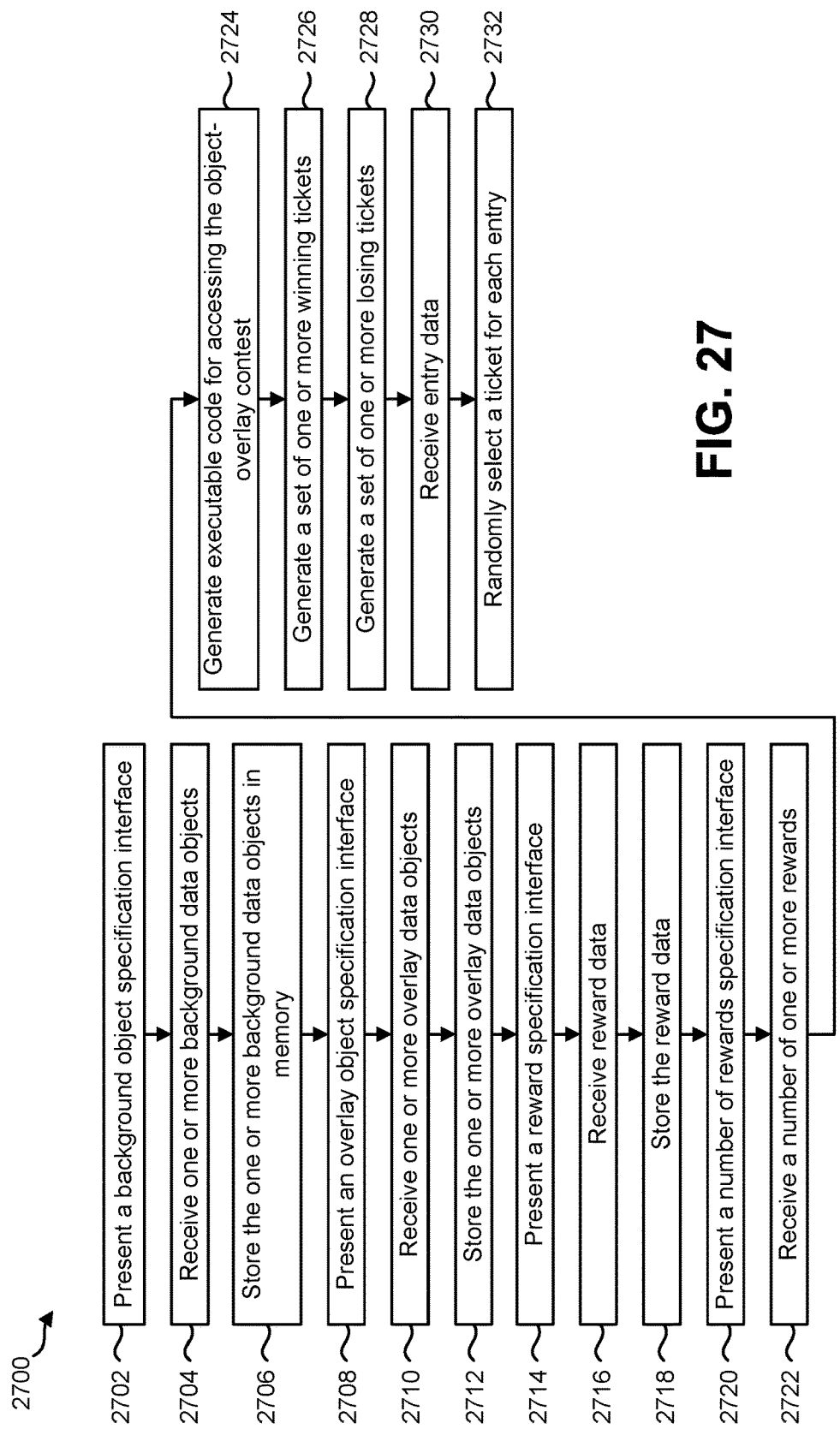
FIG. 27 is a flow diagram illustrating a configuration of a method for creating an object-overlay contest.

FIG. 27 is a flow diagram illustrating a configuration of a method 2700 for creating an object-overlay contest. The method 2700 may be performed by one or more of the computing devices described herein (e.g., computing device 452, computing device 2652, etc.).

The computing device may present 2702 a background object (e.g., data object) specification interface. This may be accomplished as described in connection with FIG. 26. For example, the computing device may send code to a remote computing device for displaying the background object specification interface 2696.

The computing device may receive 2704 one or more background data objects. This may be accomplished as described in connection with FIG. 26. For example, the computing device may receive background data specifying the background data object(s) from a remote computing device and/or from an input port (e.g., USB port, Ethernet port, external device reader, etc.).

The computing device may store 2706 the one or more background data objects in memory. This may be accomplished as described in connection with FIG. 26. For example, the computing device may store 2706 the background data specifying the one or more background data objects at a particular address (e.g., set of pointers, etc.) in RAM and/or storage (e.g., HDD, SSD, etc.).

The computing device may present 2708 an overlay object specification interface 2698. This may be accomplished as described in connection with FIG. 26. For example, the computing device may send code to a remote computing device for displaying the overlay object specification interface 2698.

The computing device may receive 2710 one or more overlay data objects. This may be accomplished as described in connection with FIG. 26. For example, the computing device may receive the overlay data object(s) from a remote computing device and/or from an input port (e.g., USB port, Ethernet port, external device reader, etc.).

The computing device may store 2712 the one or more overlay data objects in memory. This may be accomplished as described in connection with FIG. 26. For example, the computing device may store 2706 the one or more overlay data objects at a particular address (e.g., set of pointers, etc.) in RAM and/or storage (e.g., HDD, SSD, etc.).

The computing device may present 2714 a reward specification interface 2601. This may be accomplished as described in connection with FIG. 26. For example, the computing device may send code to a remote computing device for displaying the reward specification interface 2601.

The computing device may receive 2716 reward data. This may be accomplished as described in connection with FIG. 26. For example, the computing device may receive reward data specifying one or more rewards from one or more remote computing devices via a network (e.g., Internet) and/or from one or more input ports.

The computing device may store 2718 the reward data in memory. This may be accomplished as described in connection with FIG. 26. For example, the computing device may store 2718 the reward data at a particular address (e.g., set of pointers, etc.) in RAM and/or other storage.

The computing device may present 2720 a number of rewards specification interface 2603. This may be accomplished as described in connection with FIG. 26. For example, the computing device may send code to a remote computing device for displaying the number of rewards specification interface 2603.

The computing device may receive 2722 a number of one or more rewards. This may be accomplished as described in connection with FIG. 26. For example, the computing device may receive number and/or type data specifying a number and/or type of one or more rewards from one or more remote computing devices via a network (e.g., Internet) and/or from one or more input ports. In some configurations, the number and/or type data specifying the number and/or type of one or more rewards may be stored in memory.

The computing device may generate 2724 executable code for accessing the object-overlay contest. This may be accomplished as described in connection with FIG. 26. For example, the computing device may generate executable code (e.g., embeddable code, HTML code, JavaScript code, etc.) that enables a remote computing device to access the contest (e.g., submit an entry, remove the overlay object, etc.).

In various configurations, the computing device may publish the object-overlay contest. For example, the computing device may run the executable code and/or may send (e.g., embed) the executable code to one or more remote devices and/or third-party platforms. In some approaches, the computing device may utilize one or more participant accounts (e.g., third-party platform authorization information corresponding to one or more participants) to post the executable code to one or more participant-associated third-party accounts (e.g., news feeds, social media postings, etc.).

The computing device may generate 2726 a set of one or more winning tickets. This may be accomplished as described in connection with FIG. 26. For example, the computing device may generate one or more winning tickets with one or more winning background objects and/or one or more winning patterns of background objects. In various configurations, the winning tickets may be generated 2726 based on an odds value (e.g., maximum odds) and/or a number of rewards. For example, the number of winning tickets may be limited to a number of available rewards and/or the number of winning tickets may be limited by the maximum odds.

The computing device may generate 2728 a set of one or more losing tickets. This may be accomplished as described in connection with FIG. 26. For example, the computing device may generate one or more losing tickets with one or more losing background objects and/or one or more losing patterns of background objects. In various configurations, the losing tickets may be generated 2726 based on an odds value (e.g., maximum odds) and/or a number of rewards. For example, a minimum number of losing tickets may be generated such that the odds of winning are less than or equal to the maximum odds value.

The computing device may receive 2730 entry data. This may be accomplished as described in connection with FIG. 26. For example, the computing device may receive entry data specifying one or more entries from one or more remote computing devices via a network (e.g., Internet) and/or from one or more input ports. The entry data may indicate a request for a ticket.

The computing device may randomly select 2732 a ticket for each entry. This may be accomplished as described in connection with FIG. 26. For example, the computing device may utilize a random number generator to select a ticket (e.g., a winning ticket or a losing ticket) for each entry.

In various configurations, the computing device may determine whether each of the entries is eligible for a reward. This may be accomplished as described in connection with FIG. 26. For example, the computing device may determine whether a ticket provided for an entry is a winning ticket and/or whether the overlay object has been removed. If the ticket is a winning ticket and the overlay object has been removed (which may be detected based on an indicator via the object-overlay contest interface, for example), the computing device may determine 2732 that the entry is eligible for the associated reward.

Figure 28:
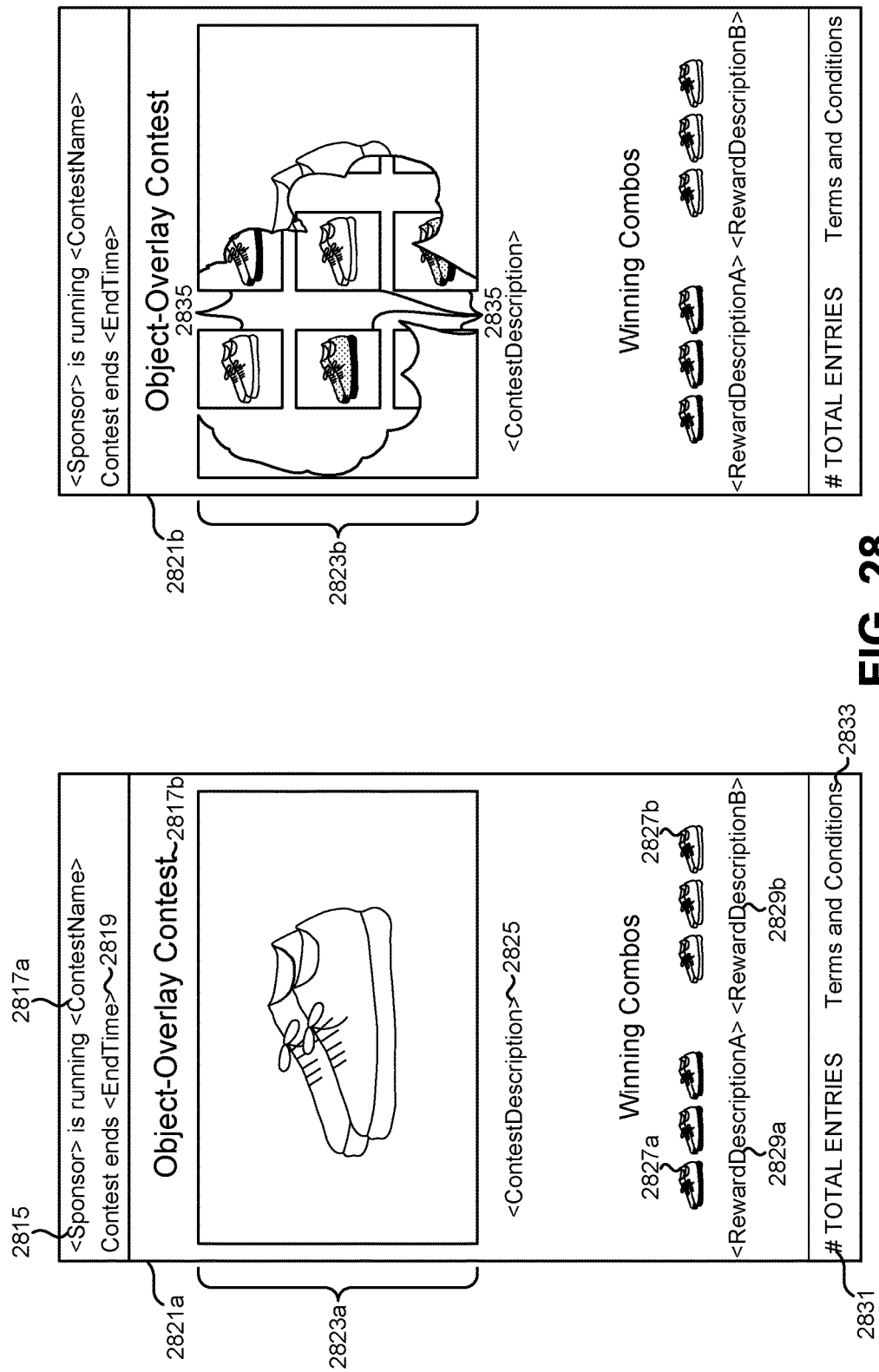
FIG. 28 is a diagram illustrating another example of a contest interface in accordance with various configurations of the systems and methods disclosed herein.

FIG. 28 is a diagram illustrating another example of a contest interface 2821*a-b* in accordance with various configurations of the systems and methods disclosed herein. In particular, FIG. 28 illustrates a contest interface 2821*a* before overlay object removal, and a contest interface 2823*b* after overlay object removal has begun. The contest interface 2821 may enable a user (e.g., contest participant) to access an object-overlay contest. In various configurations, the contest interface 2821 may be embedded in a feed (e.g., social media feed, news feed, etc.) and/or may be provided as part of a contest platform. In the example provided in FIG. 28, a user (e.g., participant) may input a removal indication (e.g., mouse click, mouse drag, touch, drag, etc.) for indicating removal (e.g., erasure) of one or more overlay objects 2823*a-b* (e.g., an image depicting one or more products, commercial objects, etc.) from one or more background objects 2835. In various configurations, the user (e.g., participant) may win a described reward (e.g., prize) when a background object or pattern of background objects (e.g., winning background object or pattern of background objects) is given on a ticket (e.g., is revealed).

The contest interface 2821*a* may include a sponsor name 2815 (e.g., sponsor name, contest creator account name, etc.), a contest name 2817*a-b* (e.g., title), an end time 2819, one or more overlay objects 2823*a* (e.g., removable data object(s)), a contest description 2825, one or more reward descriptions 2829*a-b*, one or more winning background objects or patterns 2827*a-b*, a number of entries 2831, and/or a terms and conditions link 2833. Although a particular arrangement of interface elements is illustrated in FIG. 28, it should be noted that other arrangements of interface elements may be included. For example, various embodiments may additionally include a sponsor logo next to the sponsor name 2815. In certain embodiments, the end time 2819 could instead be an end condition of a number of entries. In various embodiments, the number of entries 2831 may not be shown, etc.

As described herein, a computing device (e.g., computing device 452, computing device 2652, etc.) may create a contest (e.g., obtain one or more parameters for a contest and/or generate executable code for accessing a contest). One or more of the elements of the contest interface 2821*a-b* may be included based on the parameters obtained (e.g., received and/or stored) during contest creation. For example, a computing device may generate executable code representing (e.g., for displaying) the contest interface 2821. The executable code may include one or more obtained parameters and/or may obtain link(s) to one or more parameters (that may have been stored in memory (e.g., in a contest database), for example). In various configurations, one or more of the corresponding elements of the contest interface 2821 may have been obtained through one or more contest creation interfaces (e.g., interfaces 102 described in connection with FIG. 1).

The sponsor name 2815 may be a text name of a sponsor, account name, and/or entity name related to the contest. The contest name 2817*a-b* may be a text name (e.g., title) of the contest. The end time 2819 may be a text time (e.g., day, month, year, and/or time of day) indicating a time at which the contest will end.

The overlay object 2823*a-b* may be one or more objects that are removable (e.g., erasable). For example, a computing device may receive an input (e.g., click input, click and drag input, touch input, drag input, gesture input, speech input, etc.) indicating removal (e.g., partial and/or complete removal) of the overlay object 2823. In response, the contest interface 2821*a-b* may remove the overlay object(s) 2823*a-b*. For example, the overlay object(s) 2823*a-b* may be responsive to user input to remove at least a portion of the one or more overlay objects 2823*a-b* corresponding to the user input. Additionally or alternatively, the contest interface 2821*b* may display at least a portion of the one or more background objects 2835 in an area corresponding to the user input. In various configurations, one or more of the background objects 2835 may depict a commercial object (e.g., a product, sponsor item, item for sale, etc.). In various configurations, the contest interface 2821 may provide a selection indication (e.g., highlighted, bolded outline, color, etc.) that indicates one or more revealed background objects 2835.

The contest description 2825 may be a text description of the contest. The one or more winning background objects or patterns 2827*a-b* may indicate one or more background objects or patterns that, if included in the revealed background object(s) 2835, correspond to a reward. In the example of FIG. 28, the one or more winning background objects or patterns 2827*a-b* illustrate two patterns (e.g., combinations) of three of the same shoe type in a row to win a reward. Other winning background objects or patterns may be included. The reward description 2829*a-b* may include text description(s) of one or more rewards.

In various configurations, detected input may request a contest entry (e.g., submission of contest entry data). For example, if a user clicks on the contest interface 2821*a*, touches the contest interface 2821*a*, scrolls to the contest interface 2821*a*, and/or begins to remove the overlay object 2823*a*, etc., an entry may be requested and/or entry data may be submitted (e.g., sent to the contest platform). In various configurations, an entry may be requested and/or entry data may be submitted if the contest interface 2821*a* is displayed (by a participant device, for example). For instance, if a user scrolls to the contest interface 2821*a* in a news feed or loads a webpage that includes the contest interface 2821*a*, an entry may be requested and/or entry data may be submitted. For example, a participant computing device (e.g., participant device 468) may send an entry request (e.g., entry data) to another computing device (e.g., computing device 452) via a network.

The number of entries 2831 may indicate a total number of entries corresponding to the contest. For example, the number of entries 2831 may indicate a total number of entries at the time the contest interface 2821 was posted and/or displayed. In another example, the number of entries 2831 may indicate a real-time or near real-time total number of entries (which may be sent from a computing device hosting the contest, for instance). The terms and conditions link 2833 may provide a link to terms and conditions of the contest. As described herein, the terms and conditions may be generated based on a location (e.g., participant location, participant device location, etc.). For example, when a participant device runs executable code for the contest interface, the participant device may send information (e.g., GPS data, IP address, etc.) that may be utilized by a contest-hosting computing device to determine a location of the participant device. The computing device that is hosting the contest may utilize the location of the participant device to dynamically generate terms and conditions for the location (e.g., city, county, state, region, and/or country, etc.) for the contest. Accordingly, the contest platform may provide different terms and conditions for differently located participant devices. The terms and conditions link 2833 may enable navigating to the terms and conditions for the contest.

Figure 29:
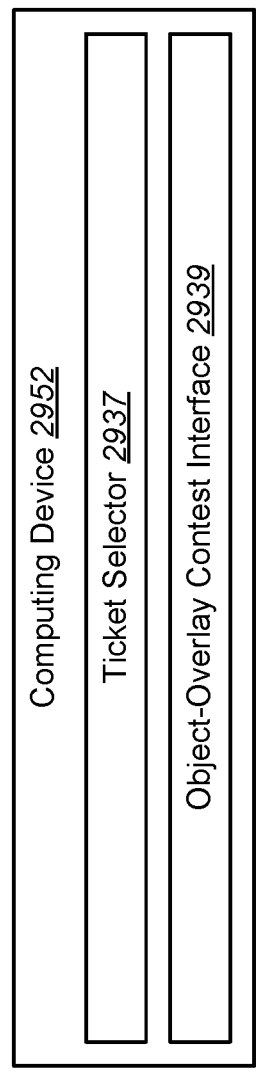
FIG. 29 is a functional block diagram illustrating another example of a computing device in which various configurations of the systems and methods disclosed herein may be implemented.

FIG. 29 is a functional block diagram illustrating another example of a computing device 2952 in which various configurations of the systems and methods disclosed herein may be implemented. The computing device 2952 may be an example of the computing device 452 described in connection with FIG. 4.

The computing device 2952 may include a ticket selector 2937 and/or an object-overlay contest interface 2939. The computing device 2952 may present the object-overlay contest interface 2939. For example, the computing device 2952 may send the object-overlay contest interface 2939 to another computing device (e.g., a participant device over a network, a third-party computing device, etc.) for display and/or may display the object-overlay contest interface 2939 locally. In some approaches, presenting the object-overlay contest interface 2939 may include sending code (e.g., HTML code, JavaScript code, CSS code, Perl code, Python code, PHP code, ASP code, etc.) that specifies the object-overlay contest interface 2939.

In various configurations, the object-overlay contest interface 2939 may include one or more background objects (e.g., images, animations, videos, symbols, characters, etc.) and/or one or more overlay objects (e.g., images, animations, videos, symbols, characters, etc.). The data objects may be presented via one or more software applications (e.g., web browsers, windows, etc.). Each of the data objects may specify an image in some approaches. One or more of the data objects may be associated with a set of one or more vendors. For example, each data object may depict a commerce item (e.g., product, brand product, etc.) from one or more vendors. The object-overlay contest interface 2939 may be electronically associated with one or more user accounts. In various configurations, the object-overlay contest interface 2939 may include and/or indicate a contest start time section indicating a start time for one or more contests, and/or a contest end time section indicating an end time for one or more contests. An example of the object-overlay contest interface 2939 is given in connection with FIG. 28.

In various configurations, the object-overlay contest interface 2939 (e.g., executable code) may be embedded in one or more third-party platforms (e.g., placed in a post of a news feed, inserted into a webpage, etc.). One or more remote computing devices (e.g., the third-party platform(s) and/or participant device(s)) may display the object-overlay contest interface 2939 (e.g., render the object-overlay 2939 contest interface with one or more overlay objects, background objects, and/or contest details, etc.). For instance, a remote computing device (e.g., participant device) may run executable code that specifies the object-overlay contest interface 2939, which may cause the remote computing device to request data (e.g., object(s), image(s), animation (s), video(s), text, etc.) from the computing device 2952 and/or to submit data (e.g., entry data, statistical data, usage data, etc.). Additionally or alternatively, running the executable code may cause the computing device to receive user input (e.g., entry data, object removal input, participant identification information, account information, etc.) and send the user input (e.g., entry data) to the computing device 2952.

In various configurations, the computing device 2952 may include an entry data receiver. The entry data receiver may receive entry data specifying a ticket request. For example, the computing device 2952 may receive (via a network interface and/or one or more input devices, for instance) data that requests one or more object-overlay contest entries. In various configurations, the entry data may be received from multiple remote computing devices and/or from an input interface on the computing device 2952. The entry data may indicate one or more requests for an object-overlay ticket.

The ticket selector 2937 may select (e.g., randomly select) a ticket for each of the contest entries. For example, the ticket selector 2937 may randomly select a ticket from the set of one or more winning tickets and the set of one or more losing tickets for each object-overlay contest entry. In various configurations, the ticket selector 2937 may select a unique object-overlay ticket from a database of object-overlay tickets. The database may include a set of one or more winning tickets and/or a set of one or more losing tickets. In various configurations, the ticket selector 2937 may include and/or use a random number generator to randomly select one or more tickets. For example, each of the tickets (e.g., winning ticket(s) and/or losing ticket(s)) may be assigned a number. The random number generator may generate a number in the range of assigned numbers (excluding any previously selected ticket numbers, for example), where the randomly generated number indicates the selected ticket. In another example, the random number generator may randomly generate a number in a particular range. If the number meets a criterion (e.g., is less than a threshold in the range, is one of a set of predetermined winning numbers, etc.), the ticket selector 2937 may select a winning ticket. Otherwise, a losing ticket may be selected. In some approaches, a winning ticket generator and/or a losing ticket generator may generate a winning ticket or a losing ticket based on the random number generator. In various configurations, the set of one or more winning tickets and/or the set of one or more losing tickets may be generated in accordance with predetermined odds. As described herein, a unique object-overlay ticket may be a winning ticket if a pattern of one or more background data objects matches at least one predetermined winning pattern in some approaches.

Each selected ticket may be associated with an entry. For example, the computing device 2952 may store, in memory, the selected ticket in association with an entry. For example, the computing device 2952 may store the entry data in a particular location in memory and/or may associate the entry data with the selected ticket. In various configurations, the computing device 2952 may store the entry data and selected ticket(s) in a database. For example, a contest database may include one or more fields for storing the entry data in association with a contest (e.g., object-overlay contest).

In various configurations, the selected ticket may be presented to a contest participant (via the object-overlay contest interface 2939, for example). The object-overlay contest interface 2939 may include a dynamic user interface that includes the one or more background data objects overlaid with the one or more overlay data objects. The object-overlay contest interface 2939 may be responsive to user input to remove at least a portion of the one or more overlay data objects corresponding to the user input and/or to display at least a portion of the one or more background data objects in an area corresponding to the user input. For example, the object-overlay contest interface 2939 may track user input to remove (e.g., erase) an area of the overlay object and to display a corresponding area of one or more background objects. For instance, a computing device (e.g., object-overlay contest interface 2939) may move a region (e.g., point, circle, box, etc.) along with a detected user input. Any area of the overlay object that intersects the region may be removed (e.g., erased) and/or a corresponding area of the one or more background objects may be displayed. The displayed area may be within the bounds of the overlay object(s) in various configurations.

In various configurations, the computing device 2952 may present a user interface providing a reward indication. In the case of a winning ticket, for example, the user interface may provide a reward indication (e.g., indicate the reward corresponding to the entry), may indicate a reward code, and/or may indicate redemption instructions for one or more associated rewards. In some approaches, the computing device 2952 may receive an indication of whether the overlay object (e.g., all or a portion of the overlay object) has been removed from the background object. Based on the eligibility of the ticket (e.g., whether the ticket associated with the entry is a winning ticket or a losing ticket), the computing device 2952 may produce eligibility data (e.g., eligibility indication, reward indication, reward code, and/or redemption instructions). For example, in a case that an entry is determined to be eligible for a reward, the computing device 2952 may produce eligibility data (e.g., an indication on a contest interface, for example) that the entry is eligible for a reward. In various configurations, the reward redemption instructions may include one or more reward redemption codes and/or a link to a point of sale of one or more vendors. The computing device 2952 may assign the one or more redemption codes to one or more user accounts. The reward redemption code(s) may be redeemable at the point of sale of one or more vendors.

In a case that an entry is determined to be ineligible for a reward, the computing device 2952 may produce ineligibility data (e.g., an ineligibility indication). For example, in a case that an entry is determined to be ineligible for a reward, the computing device 2952 may produce ineligibility data (e.g., an indication on a contest interface, for example) that the entry is ineligible for a reward, such as a message, image, etc. In various configurations, the computing device 2952 may additionally or alternatively provide other information (e.g., the winning background object(s), winning pattern, a comparison between the winning ticket pattern and the ticket corresponding to the entry, etc.).

In various configurations, the computing device 2952 may determine when the entry data is received, whether the contest is active based on contest start condition data and contest end condition data. For example, if a contest start condition is satisfied (e.g., a start date has passed) and a contest end condition is not satisfied (e.g., an end date has not yet occurred), the contest may be active. Otherwise, the contest may be inactive or finished. The computing device 2952 may store only entry data that is received when the contest is active.

In various configurations, the computing device 2952 may include and/or present a bonus interface. An example of the bonus interface is given in connection with FIG. 23. The bonus interface may present one or more contest bonuses. Each contest bonus may indicate an additional contest opportunity (e.g., one or more additional entries) in exchange for a bonus action (e.g., sharing content, generating contest invitations, indicating praise of contest, accessing online content, indicating event attendance (e.g., online or other event), following an account, completing a survey, propagating content, and/or subscribing to content, etc.). In various configurations, the computing device 2952 may receive a bonus action initiation indicator. For example, the computing device 2952 may receive, via the bonus interface, an indicator that indicates initiation of a bonus action. For example, a participant device may generate the bonus initiation indicator in response to receiving an input (e.g., a click, touch, etc.) corresponding to the bonus interface. The computing device 2952 may perform a bonus action in response to receiving the bonus initiation indicator. Additional detail on some approaches for performing a bonus action is given in connection with one or more of FIGS. 10-13.

In various configurations, the computing device 2952 may track one or more bonus actions during the object-selection contest. For example, the computing device 2952 may track link clicking and/or API operation. For instance, when a user clicks on a bonus, the computing device 2952 may perform the bonus action on behalf of the user using an API. If the bonus action is completed successfully (e.g., the third-party platform does not return an error), the computing device 2952 may record that the bonus action was completed. In various configurations, the computing device 2952 may make a record in memory (e.g., in a database) of the bonus action(s) performed. The computing device 2952 may provide the additional contest opportunity to a participant in a case that the bonus action is performed successfully. As described above, performing a bonus action may require obtaining (e.g., presenting an interface for and/or receiving) authorization information from a participant in some approaches. For example, a pop-up window may be provided that requests authorization information for the contest platform to access a participant's account on a third-party platform. This may keep the participant on the contest platform (e.g., enable bonus action completion without a participant leaving the contest platform to navigate to a third-party platform).

In various configurations, the computing device 2952 may include and/or present a contest set interface. The contest set interface may include a set of available contests (e.g., contests that are available for participation and/or entry). For example, a contest platform may include any contests that a user (e.g., user account) may currently enter.

In various configurations, the computing device 2952 may include and/or present a rewards interface. The rewards interface may indicate any rewards associated with the user (e.g., one or more user accounts) and/or any associated reward redemption instructions. Examples of the rewards interface are provided in connection with FIGS. 14-15.

In various configurations, the computing device 2952 may include and/or present an entries interface. The entries interface may include and/or indicate any active contest entries associated with the user (e.g., one or more user accounts). In some approaches, each active contest entry may include an indication of any available contest bonuses associated with the active contest entry. In various configurations, the entries interface may include and/or indicate any past contest entries (e.g., results) associated with the user (e.g., one or more user accounts). For example, each past contest entry for an object-selection contest may indicate a corresponding pattern of background objects and at least one winning pattern. An example of an entries interface is given in connection with FIG. 16.

Figure 30:
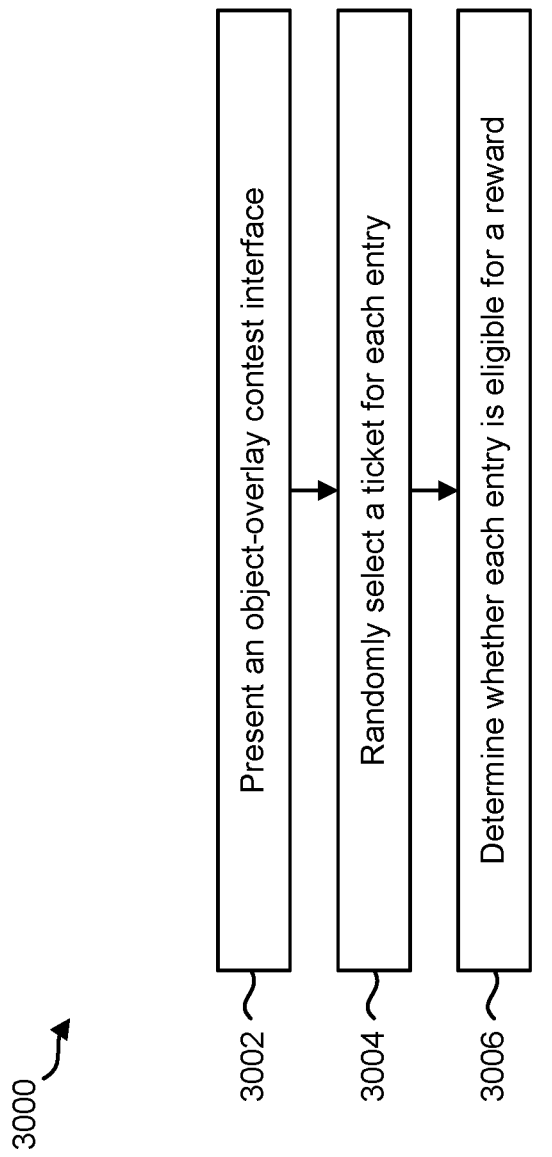
FIG. 30 is a flow diagram illustrating a configuration of a method for presenting an object-overlay contest.

FIG. 30 is a flow diagram illustrating a configuration of a method 3000 for presenting an object-overlay contest. The method 3000 may be performed by one or more of the computing devices described herein (e.g., computing device 452, computing device 2952, etc.).

The computing device may present 3002 an object-overlay contest interface 2939. This may be accomplished as described in connection with FIG. 29. For example, the computing device may send code to a remote computing device for displaying the object-overlay contest interface 2939. The object-overlay contest interface 2939 may include a dynamic interactive user interface. For example, the dynamic interactive user interface may include a unique object-overlay ticket including one or more background data objects overlaid with one or more overlay data objects responsive to user input to remove at least a portion of the one or more overlay data objects corresponding to the user input and to display at least a portion of the one or more background data objects in an area corresponding to the user input. The dynamic interactive user interface may be electronically associated with a pre-established set of one or more user accounts.

The computing device may randomly select 3004 a ticket for each entry. This may be accomplished as described in connection with FIG. 29. For example, the computing device may receive entry data (e.g., an entry request) based on received input for the object-overlay contest interface 2939. In various configurations, the computing device may randomly select a unique object-overlay ticket from a database of object-overlay tickets. The database of object-overlay tickets may include a set of one or more winning tickets and a set of one or more losing tickets. The unique object-overlay ticket may be a winning ticket if a pattern of one or more background data objects matches at least one predetermined winning pattern. The one or more background data objects may include one or more images.

It should be noted that different approaches may be utilized for presenting 3002 the object-overlay contest interface 2939 and/or for selecting 3004 a ticket for each entry. In some approaches, a ticket may be selected 3004 before presenting 3002 the object-overlay contest interface 2939. Accordingly, when the object-overlay contest interface 2939 is presented 3002, it may already include the selected ticket (e.g., background object(s) and/or background object pattern). If entry data is not received for the ticket (e.g., the ticket is unused), then the ticket may be made available for one or more potential future entries. In other approaches, the object-overlay contest interface 2939 may be presented 3002 before the ticket is selected 3004. For example, the object-overlay contest interface 2939 may be presented 3002, where the overlay object is shown before any removal. When user input is received (e.g., an input is detected interacting with the object-overlay contest interface 2939, such as a click, a mouse-over, a touch, and/or scrolling, etc.), the computing device may receive an indication of the input, may select 3004 the ticket, and/or may send the ticket to the object-overlay contest interface 2939 (e.g., may load the object-overlay contest interface 2939 with one or more background objects and/or a pattern of background object(s)). The background object(s) may be loaded before removal of the overlay object(s).

In various configurations, the computing device may determine 3006 whether each of the entries is eligible for a reward. This may be accomplished as described in connection with FIG. 29. For example, the computing device may determine whether a ticket provided for an entry is a winning ticket and/or whether the overlay object has been removed. If the ticket is a winning ticket and the overlay object has been removed (which may be detected based on an indicator via the object-overlay contest interface 2939, for example), the computing device may determine 3006 that the entry is eligible for the associated reward.

Figure 31:
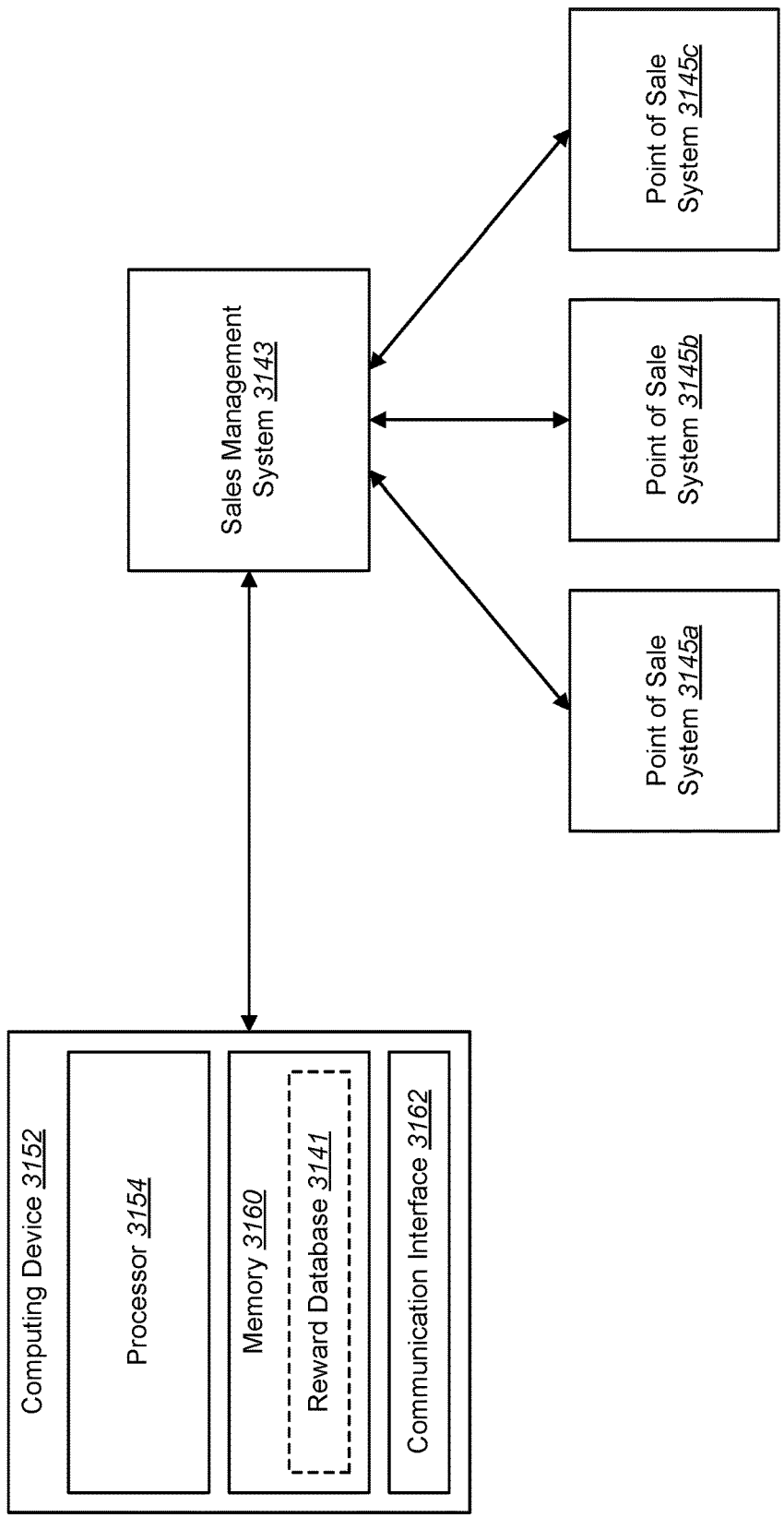
FIG. 31 is a block diagram illustrating another configuration of a computing device in which systems and methods for creating, managing and/or providing a contest may be implemented.

FIG. 31 is a block diagram illustrating another configuration of a computing device 3152 in which systems and methods for creating, managing and/or providing a contest may be implemented. The computing device 3152 described in connection with FIG. 31 may be an example of the computing device 452 described in connection with FIG. 4.

In some configurations, the computing device 3152 may include a processor 3154, memory 3160, and/or a communication interface 3162. The processor 3154, memory 3160, and/or communication interface 3162 may be examples of corresponding elements described in connection with FIG. 4.

In various configurations, the memory 3160 may store a reward database 3141. The reward database 3141 may include data indicating one or more rewards (from one or more sponsors, for example).

The communication interface 3162 may enable the computing device 3152 to communicate with one or more other computing devices. For example, the communication interface 3162 may provide an interface for wired and/or wireless communications. In some configurations, the communication interface 3162 may be coupled to one or more antennas for transmitting and/or receiving radio frequency (RF) signals. Additionally or alternatively, the communication interface 3162 may enable one or more kinds of wireline (e.g., USB, Ethernet, etc.) communication.

In some configurations, the computing device 3152 may utilize the communication interface(s) 3162 to communicate with a sales management system 3143. The sales management system 3143 may be one or more computing devices that manage sales (e.g., tracks sales of one or more products). The computing device 3152 may be integrated with the sales management system 3143 in various configurations. For example, sales data (e.g., product cost, earning data, sales numbers, and/or inventory, etc.) may be shared (e.g., sent and/or received) between the computing device 3152 (e.g., contest platform) and the sales management system 3143. The sales data may be transferred in one or more ways. For example, the sales data may be transferred via API integration, web services, webhooks, in JSON, in XML, and/or in other formats.

The sales management system 3143 may communicate with one or more point of sale systems 3145*a-c*. The point of sale system(s) 3145*a-c* may include one or more systems for processing sales of one or more products. Examples of point of sale system(s) 3145*a-c* may include web servers that process sales, sales systems for physical retail locations, inventory management systems, and/or other computing devices. The point of sale system(s) 3145*a-c* may provide information regarding the sale of one or more products.

In various configurations of the systems and methods disclosed herein, the computing device 3152 may track sales data corresponding to one or more contests. For example, the sales management system 3143 (and/or a sponsor device) may provide one or more reward codes to the computing device 3152. The reward codes may be stored in the reward database 3141. When a reward code is redeemed at a point of sale system 3145, the point of sale system 3145 may notify the sales management system of the code redemption and/or of any other purchases associated with the code redemption (e.g., one or more additional products purchased in the same order as the code redemption, one or more products purchased within a time period from a code redemption, one or more products purchased in a session linked from a contest interface, etc.). The sales management system 3143 may provide corresponding sales data to the computing device 3152, which may calculate an ROI based on the sales data.

In various configurations, sales management system 3143 (e.g., e-commerce) integration and/or point of sale system 3145*a-c* integration may operate in accordance with one or more aspects of the following. A sponsor's sales management system 3143 may be integrated into the contest platform so that rewards (e.g., discounts, gift cards, coupons, etc.) can be tracked from the sales management system 3143 back to a specific contest. This may entail utilizing an API, webhooks, and/or other network communication techniques to share applicable information between the computing device 3152 (e.g., contest platform) and the sales management system 3143. Integration may allow rewards (e.g., prizes such as gift cards, discounts, free products, and/or other things redeemable from a store) to be created on the sales management system 3143 and then loaded into the contest platform to be given away in contests, or to be created on the contest platform and concurrently created (through an API or other automated technique, for example) on the sales management system 3143 so that said rewards can be used on the sponsor's website or in stores. Integration may allow the contest platform to track when rewards are redeemed and/or to track and present key analytics associated with rewards. The analytics (e.g., sales data, earning data, ROI metrics, etc.) that may be tracked and/or presented may include: when specific rewards are redeemed, specific total purchase amount in which the reward was redeemed, average total purchase amount in which the reward was redeemed, who redeemed a reward compared to who won a reward, value of specific and average contest entrants versus how many rewards they redeem and the total value of their purchases, total revenue generated by a specific contest, average revenue generated by all contests, and/or average revenue generated by a specific contest participant across all contests or a defined subset.

As described herein, a computing device (e.g., computing device 452, computing device 3152) may calculate ROI in some approaches. In various configurations, ROI may be calculated in accordance with Equation (1).

$$ROI = \frac{Profit_{Contest}}{Investment_{Contest}} * 100 \quad (1)$$

In Equation (1), ROI is the return on investment, $Profit_{Contest}$ is the total profit generated by the contest (e.g., sales profit from the contest), and $Investment_{Contest}$ is the total investment in the contest (e.g., cost of prizes, cost of sponsoring the contest, etc.). For example, $1000 in profit from sales/$5000 investment in the form of rewards*100=0.2 or 20% ROI.

Figure 32:
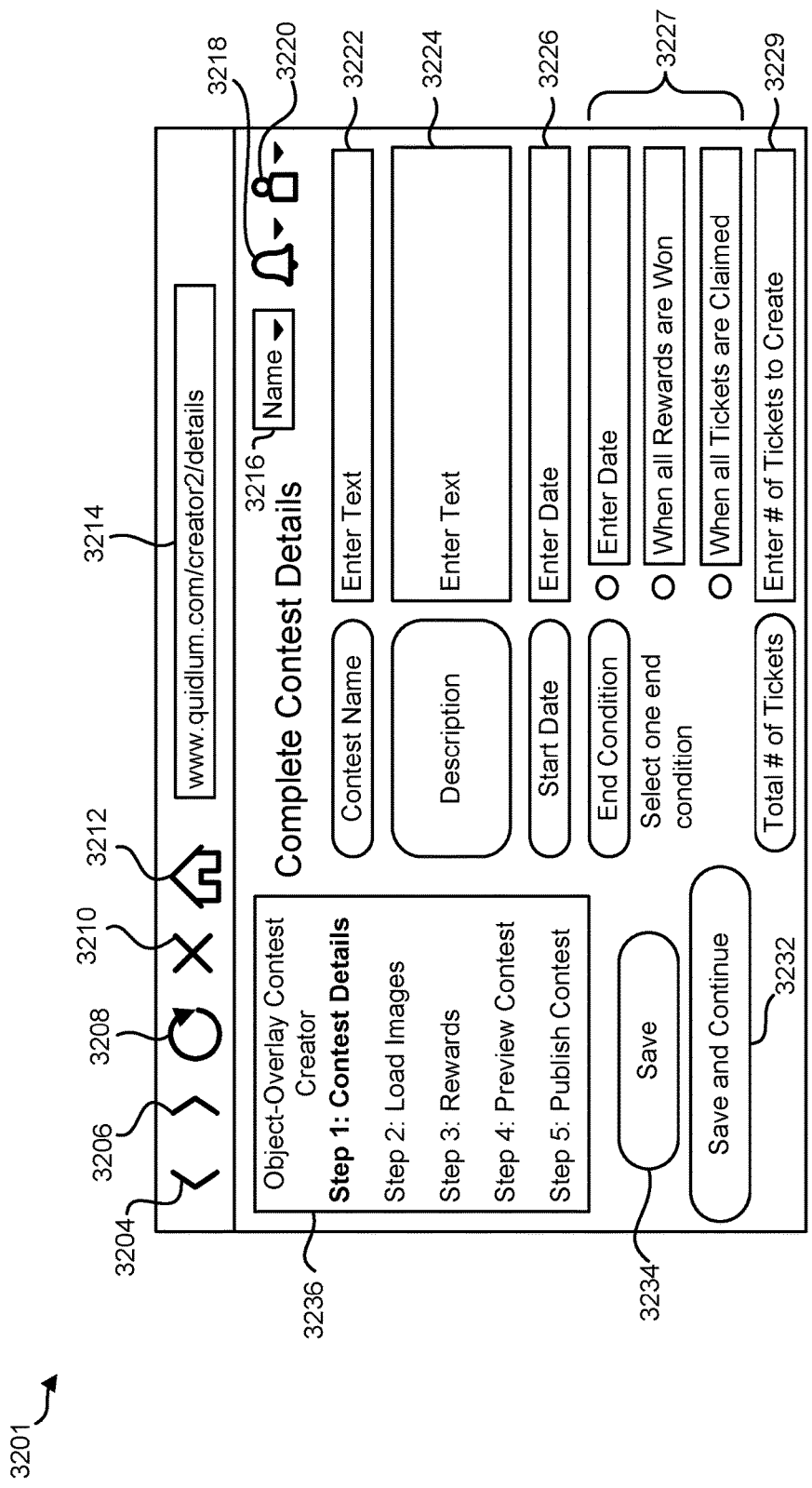
FIG. 32 is a diagram illustrating another example of a contest details interface for contest creation.

FIG. 32 is a diagram illustrating another example of a contest details interface 3201 for contest creation. The contest details interface 3201 may be presented (e.g., provided, served, sent, displayed, etc.) by a computing device. For example, a computing device may generate the contest details interface 3201 based on instructions (e.g., code) and may display the contest details interface 3201. In this example, the contest details interface 3201 may include an object-overlay contest creator navigator 3236, a contest name field 3222, a contest description field 3224, a start date field 3226, an end condition field 3227, a number of tickets to create field 3229, a save button 3234, and/or a save and continue button 3232. It should be noted that the contest details interface 3201 may be optionally presented in addition to or alternatively from the contest details interface 102 described in connection with FIG. 1. For example, a computing device may provide (e.g., present an interface with) an option to select a contest type. If an object-selection contest is selected, the computing device may present the contest details interface 102 described in connection with FIG. 1 (and/or other interfaces described in connection with one or more of FIGS. 2-3, for example). If an object-overlay contest is selected, the computing device may present the contest details interface 3201 described in connection with FIG. 32 (and/or other interfaces described in connection with one or more of FIGS. 33-36, for example).

In various configurations, the navigator 3236 may present a set of steps for creating a contest. For example, the navigator 3236 may indicate a contest details step, a load images (or object) step, a rewards step, a preview contest step, and/or a publish contest step. In some approaches, each of the steps may be an operable object (e.g., button or link) that activates navigation between each of the steps of contest creation. For example, the computing device may receive an input (e.g., detect a click event, a tap event, etc.) corresponding to one of the steps. The computing device may navigate to an interface corresponding to the step indicated. It should be noted that although a set of particular steps for contest creation is illustrated in FIG. 32, different numbers and/or types of steps may be implemented. For instance, two or more of the steps may be combined and/or one or more of the steps may be divided.

Figure 33:
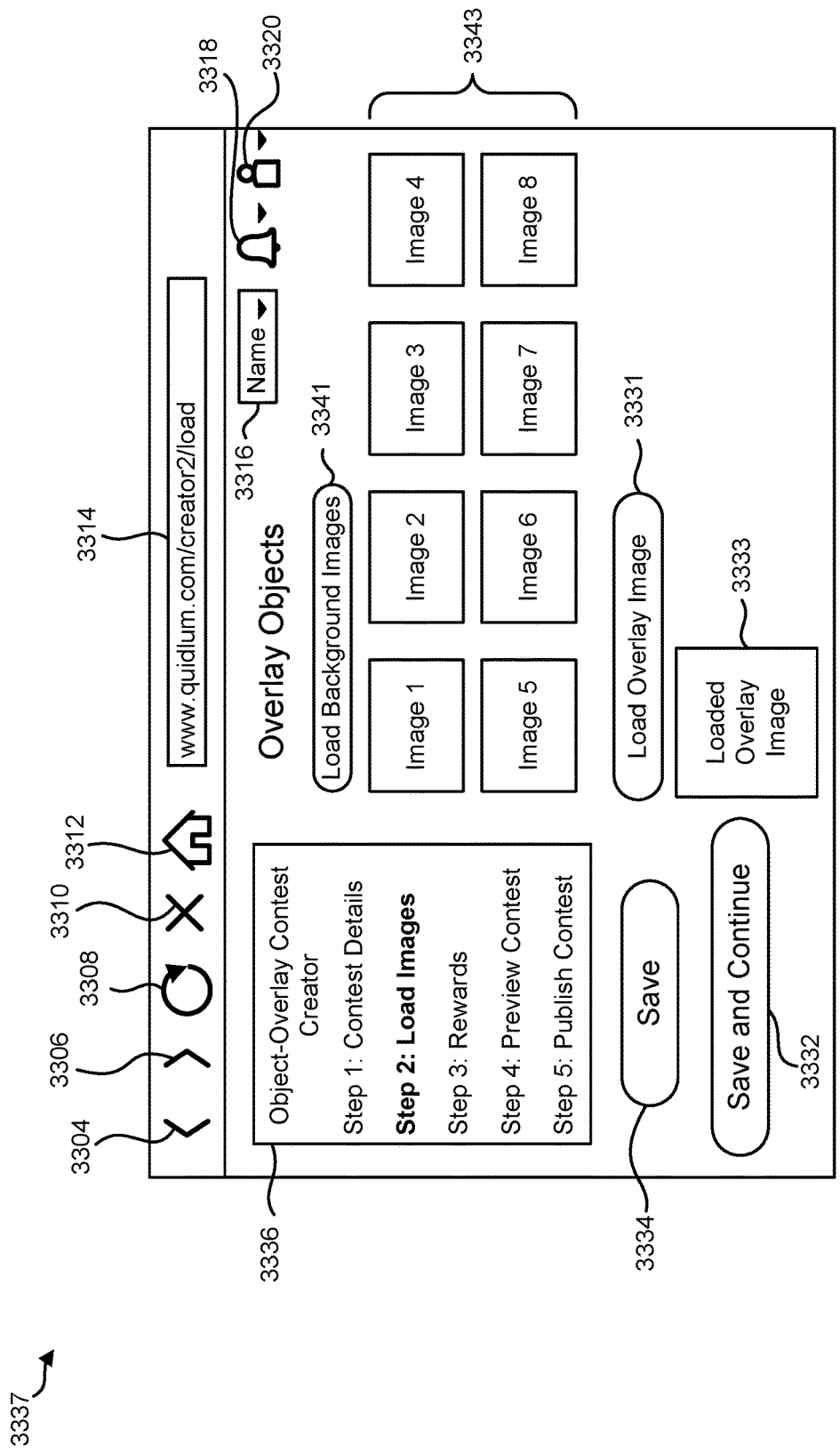
FIG. 33 is a diagram illustrating an example of a load objects interface for contest creation.

An example of an interface for the load images step is provided in connection with FIG. 33. An example of an interface for the rewards step is provided in connection with FIG. 34. An example of an interface for the preview contest step is provided in connection with FIG. 35. An example of an interface for the publish contest step is provided in connection with FIG. 36. It should be noted that one or more of the interfaces described in connection with one or more of FIGS. 32-36 (and/or other interface(s) described herein) may be presented by one or more of the computing devices 452, 1952, 2452, 2652, 3152 described herein, in various configurations.

The contest name field 3222 may receive and/or present a name for an object-overlay contest. For example, the computing device may receive an input (e.g., detect keyboard inputs, touchscreen inputs, speech recognition inputs, one or more click events, one or more tap events, etc.) indicating a name (e.g., text name) for an object-overlay contest. The computing device may store the contest name. For example, the computing device may store the contest name upon activation of the save button 3234, upon activation of the save and continue button 3232, and/or automatically. In some approaches, the contest name may be stored in memory (e.g., local memory and/or remote memory) as part of an object-overlay contest instance and/or in a database for one or more contests.

The contest description field 3224 may receive and/or present a description for an object-overlay contest. For example, the computing device may receive an input (e.g., detect keyboard inputs, touchscreen inputs, speech recognition inputs, one or more click events, one or more tap events, etc.) indicating a description (e.g., text description) for an object-overlay contest. The computing device may store the contest description. For example, the computing device may store the contest description upon activation of the save button 3234, upon activation of the save and continue button 3232, and/or automatically. In some approaches, the contest description may be stored in memory (e.g., local memory and/or remote memory) as part of an object-overlay contest instance and/or in a database for one or more contests.

The contest start date field 3226 may receive and/or present a start date for an object-overlay contest. For example, the computing device may receive an input (e.g., detect keyboard inputs, touchscreen inputs, speech recognition inputs, one or more click events, one or more tap events, etc.) indicating a start date for an object-overlay contest. The start date may be expressed in terms of calendar date, relative date, and/or time (e.g., Jan. 1, 2018 at 1:00 pm, 01/01/2018, Next Monday at 3 pm, etc.). In some configurations, an event to enter the start date may trigger presentation of an interactive calendar for date selection and/or presentation of an interface for selecting time. The computing device may store the contest start date. For example, the computing device may store the contest start date upon activation of the save button 3234, upon activation of the save and continue button 3232, and/or automatically. In some approaches, the contest start date may be stored in memory (e.g., local memory and/or remote memory) as part of an object-overlay contest instance and/or in a database for one or more contests.

The contest end condition field 3227 may receive and/or present one or more end conditions (e.g., end date, when all rewards are won, or when all tickets are claimed) for an object-overlay contest. For example, the computing device may receive an input (e.g., detect keyboard inputs, touchscreen inputs, speech recognition inputs, one or more click events, one or more tap events, etc.) indicating an end condition for an object-overlay contest. In a case that the end condition is an end date, the end date may be expressed in terms of calendar date, relative date, and/or time (e.g., Jan. 1, 2018 at 1:00 pm, 01/01/2018, Next Monday at 3 pm, etc.).

In some configurations, an event to enter the end date may trigger presentation of an interactive calendar for date selection and/or presentation of an interface for selecting time. The computing device may store the contest end condition. For example, the computing device may store the contest condition upon activation of the save button 3234, upon activation of the save and continue button 3232, and/or automatically. In some approaches, the contest end condition may be stored in memory (e.g., local memory and/or remote memory) as part of an object-overlay contest instance and/or in a database for one or more contests. It should be noted that multiple contest end conditions may be selected and/or implemented in some configurations. For example, a contest may end when the first of any of the end date condition, all rewards won condition, or all tickets claimed condition occurs.

The number of tickets to create field 3229 may receive and/or present a number of tickets for an object-overlay contest. For example, the computing device may receive an input (e.g., detect keyboard inputs, touchscreen inputs, speech recognition inputs, one or more click events, one or more tap events, etc.) indicating a number of tickets (e.g., total number of tickets, maximum number of tickets, etc.) for an object-overlay contest. The number of tickets may be expressed as a whole number (e.g., 200, 1000, 20,000, etc.). The number of tickets may indicate a number of tickets to be generated for the object-overlay contest. The computing device may store the number of tickets. For example, the computing device may store the number of tickets upon activation of the save button 3234, upon activation of the save and continue button 3232, and/or automatically. In some approaches, the number of tickets may be stored in memory (e.g., local memory and/or remote memory) as part of an object-overlay contest instance and/or in a database for one or more contests. In various configurations, a computing device may generate a number of unique tickets according to the number of tickets indicated.

The save button 3234 may function to initiate saving data for an object-overlay contest. For example, if the save button 3234 is activated (e.g., an event indicating an input corresponding to the save button 3234 is detected), the computing device may save data in memory corresponding to one or more fields (e.g., contest name field 3222, contest description field 3224, contest start date field 3226, contest end condition field 3227, and/or number of tickets to create field 3229) in memory (e.g., in a contest database).

The save and continue button 3232 may function to initiate saving data for an object-overlay contest and to navigate to a next step for object-overlay contest creation. For example, if the save and continue button 3232 is activated (e.g., an event indicating an input corresponding to the save and continue button 3232 is detected), the computing device may save data in memory corresponding to one or more fields (e.g., contest name field 3222, contest description field 3224, contest start date field 3226, contest end condition field 3227, and/or number of tickets to create field 3229) in memory (e.g., in a contest database) and may navigate to a next step (e.g., loading images or objects). It should be noted that one or more of the fields (e.g., contest name field 3222, contest description field 3224, contest start date field 3226, contest end condition field 3227, and/or number of tickets to create field 3229) may be referred to as an "interface," as one or more fields may be utilized to receive input data.

In some configurations, the contest details interface 3201 may include and/or present one or more other elements (e.g., interface objects). For example, the contest details interface 3201 may include a name dropdown 3216. The name dropdown 3216 may present a contest sponsor name and/or may enable selection between multiple contest sponsor names. For instance, the name dropdown 3216 may present the name of the current contest sponsor (e.g., a company name, an individual name, etc.). If the name dropdown 3216 is selected (e.g., an event indicating an input corresponding to the name dropdown 3216 is detected), the name dropdown 3216 may present and enable selection of one of multiple potential sponsor names. This may allow selection of (e.g., management of) contests for multiple different sponsors. In some approaches, the contest sponsor name (as indicated by the name dropdown 3216, for example) may be presented when the contest is accessed (e.g., "Company A is giving away free shoes!").

In some configurations, the contest details interface 3201 may include and/or present a notification dropdown 3218. The notification dropdown 3218 may, for example, present a number of notifications. Notifications may indicate one or more events (e.g., contest begun, contest ended, winner selected, rewards redeemed, incomplete contest creations, etc.). If the notification dropdown 3218 is selected (e.g., an event indicating an input corresponding to the notification dropdown 3218 is detected), the notification dropdown 3218 may present and enable selection of one of multiple notifications. This may allow communication of events and/or navigation to more details regarding the notifications. In some approaches, a number of notifications may be superimposed over all or a portion of the notification dropdown 3218 to indicate a number of new (e.g., unviewed) notifications.

In some configurations, the contest details interface 3201 may include and/or present an account dropdown 3220. The account dropdown 3220 may present an indication of one or more account actions (e.g., sign in, sign out, change account, account details, account settings, etc.). The account actions may indicate one or more actions that may be taken for or in connection with an account. If the account dropdown 3220 is selected (e.g., an event indicating an input corresponding to the account dropdown 3220 is detected), the account dropdown 3220 may present and enable selection of one of the account actions. This may allow account control and/or navigation to more details regarding an account. An account may be associated with a user (e.g., individual, company, etc.) authorized to create contests.

In the example given in FIG. 32, the contest details interface 3201 may be presented in a browser (e.g., web browser). For instance, the contest details interface 3201 may include a toolbar with a back button 3204, a forward button 3206, a refresh button 3208, a stop loading button 3210, and/or a home button 3212. The contest details interface 3201 may also include an address field 3214. The address field 3214 may receive and/or display address (e.g., uniform resource locator (URL)) information. For example, the address field 3214 may receive address information input with an input device (e.g., touch screen, keyboard, mouse, etc.) and/or populated with a link. In some configurations, a contest platform (e.g., contest creation, presentation, and/or management platform) may be accessed remotely over a network (e.g., the Internet) using a browser. It should be noted that the contest details interface 3201 may not be presented in a browser in some configurations and/or instances. For example, the contest details interface 3201 may alternatively be presented in a local application window.

FIG. 33 is a diagram illustrating an example of a load objects interface 3337 for contest creation. The load objects interface 3337 may be presented (e.g., provided, served, displayed, etc.) by a computing device. For example, a computing device may generate the load objects interface 3337 based on instructions (e.g., code) and may present the load objects interface 3337. In this example, the load objects interface 3337 may include an object-overlay contest creator navigator 3336, a load background image(s) button 3341, a background images area 3343, a load overlay image(s) button 3331, a loaded overlay image(s) area 3333, a save button 3334, and/or a save and continue button 3332. It should be noted that although images are provided as an example of objects in FIG. 33, animations, videos, and/or other objects may be loaded and/or utilized.

The load background image(s) button 3341 may function to initiate loading one or more background images for an object-overlay contest. If the load background image(s) button 3341 is activated (e.g., an event indicating an input corresponding to the load background image(s) button 3341 is detected), the computing device may present an interface for identifying a background image. For example, the interface may receive one or more addresses of image files for loading to a contest. One or more addresses may be local or remote. For instance, an address may identify a path to a locally stored image file (in, for example, computing device local storage, locally coupled storage (e.g., thumb drive, external hard drive, optical disc drive, etc.), etc.) or to a remotely stored image file (e.g., image file at a web address, a network address, etc.). The computing device may present one or more of the identified background images in the background images area 3343. For example, each identified background image or other representation (e.g., a thumbnail image) of the identified background image may be presented in the background images area 3343. As used herein, the term "background" may refer to an object (e.g., image, animation, video, etc.) to be rendered behind (e.g., underneath) one or more overlay objects. It should also be noted that other elements besides background images may be utilized in accordance with some configurations of the systems and methods disclosed herein. Any object such as a background image, background programmatic object (e.g., field, text box, radio button, etc.), or combination thereof may be utilized. In some configurations, one or more background objects may be visually perceptible elements. In the example illustrated in FIG. 33, 8 images have been loaded and are presented in the background images area 3343.

The load overlay image(s) button 3331 may function to initiate loading one or more overlay images for an object-overlay contest. If the load overlay image(s) button 3331 is activated (e.g., an event indicating an input corresponding to the load overlay image(s) button 3331 is detected), the computing device may present an interface for identifying an overlay image. For example, the interface may receive one or more addresses of image files for loading to a contest. One or more addresses may be local or remote. For instance, an address may identify a path to a locally stored image file (in, for example, computing device local storage, locally coupled storage (e.g., thumb drive, external hard drive, optical disc drive, etc.), etc.) or to a remotely stored image file (e.g., image file at a web address, a network address, etc.). The computing device may present one or more of the identified overlay images in the loaded overlay image(s) area 3333. For example, each identified overlay image or other representation (e.g., a thumbnail image) of the identified overlay image may be presented in the loaded overlay image(s) area 3333. As used herein, the term "overlay" may refer to an object (e.g., image, animation, video, etc.) to be rendered in front of (e.g., on top of) one or more overlay objects. An overlay object may be partially and/or completely removable to reveal one or more background objects (in a published contest, for example). It should also be noted that other elements besides overlay images may be utilized in accordance with some configurations of the systems and methods disclosed herein. Any object such as an overlay image, overlay programmatic object (e.g., field, text box, radio button, etc.), or combination thereof may be utilized. In some configurations, one or more overlay objects may be visually perceptible elements. In the example illustrated in FIG. 33, one image has been loaded and is presented in the loaded overlay image(s) area 3333.

The navigator 3336 may present a set of steps for creating a contest. For example, the navigator 3336 may include elements and/or function as described in connection with the corresponding element of FIG. 32.

The save button 3334 may function to initiate saving data for an object-overlay contest. For example, if the save button 3334 is activated (e.g., an event indicating an input corresponding to the save button 3334 is detected), the computing device may save data in memory corresponding to the images (and/or other object(s)). The save and continue button 3332 may function to initiate saving data for an object-overlay contest and to navigate to a next step for object-overlay contest creation. For example, if the save and continue button 3332 is activated (e.g., an event indicating an input corresponding to the save and continue button 3332 is detected), the computing device may save data in memory corresponding to the images (and/or other object(s)) and may navigate to a next step (e.g., rewards). It should be noted that the load background image(s) button 3341, the background images area 3343, the load overlay image(s) button 3331, and/or the loaded overlay image(s) area 3333 may be referred to as an "interface" for loading one or more images (and/or objects).

In some configurations, the load objects interface 3337 may include and/or present one or more other elements (e.g., interface objects). For example, the load objects interface 3337 may include a name dropdown 3316, a notification dropdown 3318, and/or an account dropdown 3320. The name dropdown 3316, the notification dropdown 3318, and/or the account dropdown 3320 may function similarly to corresponding elements described in connection with FIG. 32.

In the example given in FIG. 33, the load objects interface 3337 may be presented in a browser (e.g., web browser). For instance, the load objects interface 3337 may include a toolbar with a back button 3304, a forward button 3306, a refresh button 3308, a stop loading button 3310, and/or a home button 3312. The load objects interface 3337 may also include an address field 3314, which may function as described in connection with the corresponding elements described in connection with FIG. 32. It should be noted that the load objects interface 3337 may not be presented in a browser in some configurations and/or instances. For example, the load objects interface 3337 may alternatively be presented in a local application window.

Figure 34:
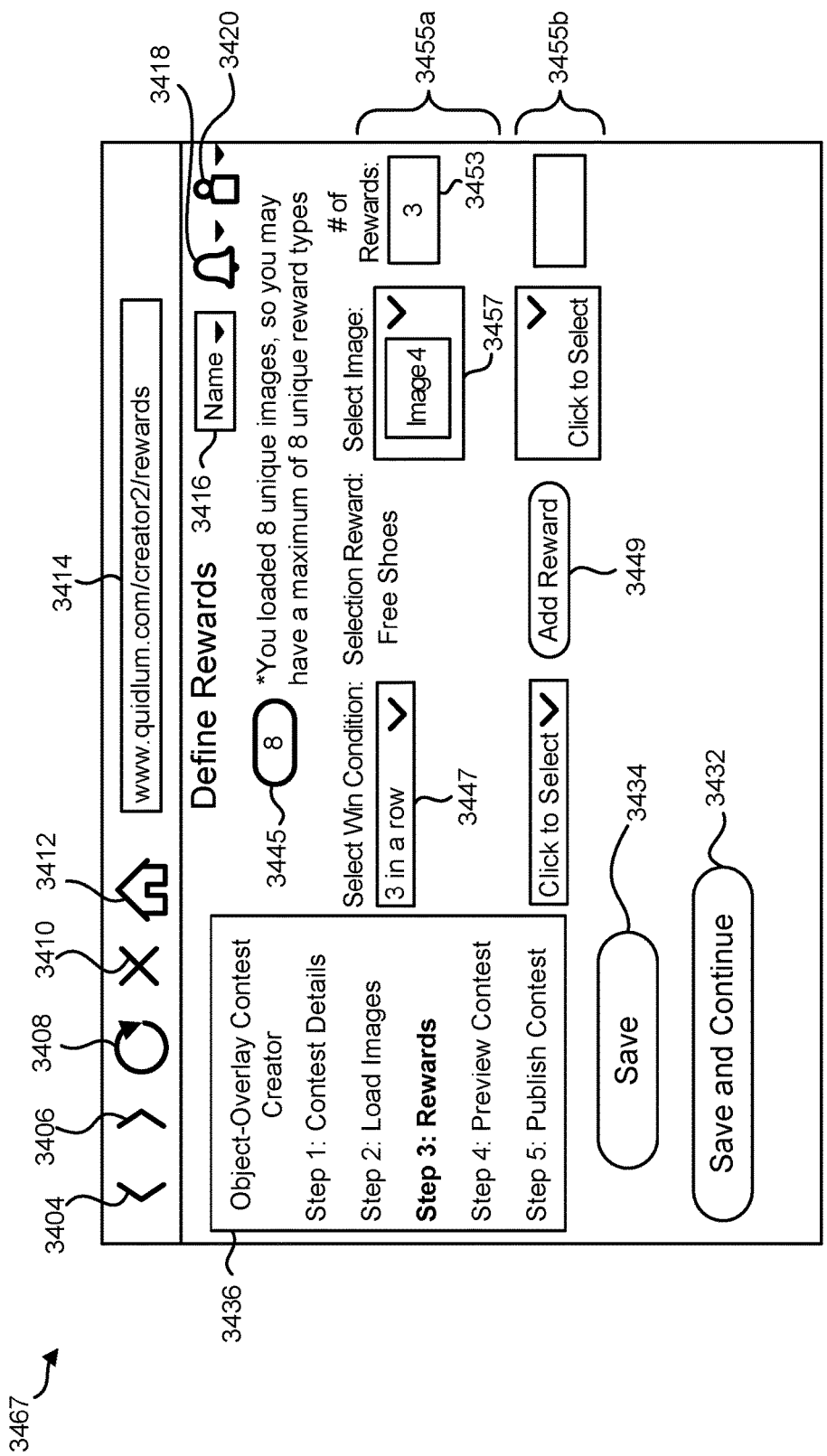
FIG. 34 is a diagram illustrating an example of a reward specification interface for contest creation.

FIG. 34 is a diagram illustrating an example of a reward specification interface 3467 for contest creation. The reward specification interface 3467 may be presented (e.g., provided, served, displayed, etc.) by a computing device. For example, a computing device may generate the reward specification interface 3467 based on instructions (e.g., code) and may present the reward specification interface 3467. In this example, the reward specification interface 3467 may include an object-overlay contest creator navigator 3436, a number of objects indicator 3445, one or more reward specification sections 3455*a-b*, one or more win condition fields 3447, one or more add reward buttons 3449, one or more object selectors 3457, one or more reward number fields 3453, a save button 3434, and/or a save and continue button 3432.

The number of objects indicator 3445 may present a loaded number of objects (e.g., background objects) for an object-overlay contest. For example, the computing device may indicate a number of loaded background objects (e.g., images) for an object-overlay contest. In some approaches, the loaded number of objects may correspond to a maximum possible number of rewards, where each of the loaded objects may be associated with a reward. In some approaches, other combinations of objects may be utilized to allow a greater number of possible rewards.

Each reward specification section 3455 may include one or more objects and/or interfaces for specifying one or more reward aspects. For example, each reward specification section 3455 may include a win condition field 3447, an add reward button 3449 (or a label indicating the reward (e.g., "free shoes") once the reward has been added or selected, for instance), an object selector 3457, and/or a reward number field 3453.

The win condition field(s) 3447 may function to specify one or more win conditions for an object-overlay contest. For example, a win condition may indicate a condition for an entry to win a reward. For instance, a win condition may be a number of the same object in a sequence (e.g., row) or a particular combination of objects in a sequence (e.g., row). If the win condition field(s) 3447 is activated (e.g., an event indicating an input corresponding to the win condition field(s) 3447 is detected), the computing device may present an interface for identifying a win condition (e.g., 2 in a row, 3 in a row, a sequence of 3 objects, etc.). For example, the win condition field 3447 may be a drop-down list specifying potential selections for the win condition. The win condition field 3447 may receive input (e.g., an event, a mouse click, a touch, a gesture, etc.) specifying the win condition. The computing device may store the win condition(s). For example, the computing device may store the win condition(s) upon activation of the save button 3434, upon activation of the save and continue button 3432, and/or automatically. In some approaches, the win condition(s) may be stored in memory (e.g., local memory and/or remote memory) as part of an object-overlay contest instance and/or in a database for one or more contests.

The add reward button(s) 3449 may function to specify one or more rewards for an object-overlay contest. If the add reward button(s) 3449 is activated (e.g., an event indicating an input corresponding to the add reward button(s) 3449 is detected), the computing device may present an interface for identifying a reward (depicted by an image, text, and/or other object, for instance). For example, the interface may receive reward data (e.g., image, photo, animation, video, text, symbol, character(s), visually perceptible element, programmatic object, etc.). For instance, the interface may receive text that describes a reward. The text may be presented on the reward specification interface 3467 (e.g., "Free Shoes"). The computing device may store the reward identification(s). For example, the computing device may store the reward identification(s) upon activation of the save button 3434, upon activation of the save and continue button 3432, and/or automatically. In some approaches, the reward identification(s) may be stored in memory (e.g., local memory and/or remote memory) as part of an object-overlay contest instance and/or in a database for one or more contests.

The object selector(s) 3457 may function to specify one or more objects (e.g., background objects, background images) for a win condition in an object-overlay contest. For example, the selected object(s) may be selected from the loaded background object(s). The selected object(s) may be associated with the win condition. For example, an object may be selected, where if the object appears in a sequence of three (the corresponding win condition) on a generated ticket, the ticket (e.g., entry) may be a winning ticket. If the object selector(s) 3457 is activated (e.g., an event indicating an input corresponding to the object selector(s) 3457 is detected), the computing device may present an interface for identifying an object (e.g., background object, background image, etc.) corresponding to the specified reward and/or win condition. For example, the object selector 3457 may be a drop-down list specifying potential selections for the background object(s). The object selector 3457 may receive input (e.g., an event, a mouse click, a touch, a gesture, etc.) specifying the selected object(s). The computing device may store the selected object(s). For example, the computing device may store the selected object(s) upon activation of the save button 3434, upon activation of the save and continue button 3432, and/or automatically. In some approaches, the selected object(s) may be stored in memory (e.g., local memory and/or remote memory) as part of an object-overlay contest instance and/or in a database for one or more contests. In some examples, the reward and/or selected object may identify (e.g., depict) a commerce object (e.g., an item for sale by one or more vendors), may be of a particular brand, and/or may be associated with a vendor.

The reward number field(s) 3453 may function to receive and/or present a number of rewards. For example, a reward number field 3453 may specify a number of the type of reward specified via the add reward button 3449. The computing device may store the reward number(s). For example, the computing device may store the reward number(s) upon activation of the save button 3434, upon activation of the save and continue button 3432, and/or automatically. In some approaches, the reward number(s) may be stored in memory (e.g., local memory and/or remote memory) as part of an object-overlay contest instance and/or in a database for one or more contests.

The navigator 3436 may present a set of steps for creating a contest. For example, the navigator 3436 may include elements and/or function as described in connection with the corresponding element of FIG. 32.

The save button 3434 may function to initiate saving data for an object-overlay contest. For example, if the save button 3434 is activated (e.g., an event indicating an input corresponding to the save button 3434 is detected), the computing device may save data in memory corresponding to the win condition(s), the reward identification(s), the selected object(s), and/or the number(s) of reward(s). The save and continue button 3432 may function to initiate saving data for an object-overlay contest and to navigate to a next step for object-overlay contest creation. For example, if the save and continue button 3432 is activated (e.g., an event indicating an input corresponding to the save and continue button 3432 is detected), the computing device may save data in memory corresponding to the win condition(s), the reward identification(s), the selected object(s), and/or the number(s) of reward(s) and may navigate to a next step (e.g., preview contest). It should be noted that the object-overlay contest creator navigator 3436, the number of objects indicator 3445, the one or more reward specification sections 3455*a-b*, the one or more win condition fields 3447, the one or more add reward buttons 3449, the one or more object selectors 3457, the one or more reward number fields 3453, the save button 3434, and/or the save and continue button 3432 may be referred to as one or more "interfaces."

In some configurations, the reward specification interface 3467 may include and/or present one or more other elements (e.g., interface objects). For example, the reward specification interface 3467 may include a name dropdown 3416, a notification dropdown 3418, and/or an account dropdown 3420. The name dropdown 3416, the notification dropdown 3418, and/or the account dropdown 3420 may function similarly to corresponding elements described in connection with FIG. 32.

In the example given in FIG. 34, the reward specification interface 3467 may be presented in a browser (e.g., web browser). For instance, the reward specification interface 3467 may include a toolbar with a back button 3404, a forward button 3406, a refresh button 3408, a stop loading button 3410, and/or a home button 3412. The reward specification interface 3467 may also include an address field 3414, which may function as described in connection with the corresponding elements described in connection with FIG. 32. It should be noted that the reward specification interface 3467 may not be presented in a browser in some configurations and/or instances. For example, the reward specification interface 3467 may alternatively be presented in a local application window.

Figure 35:
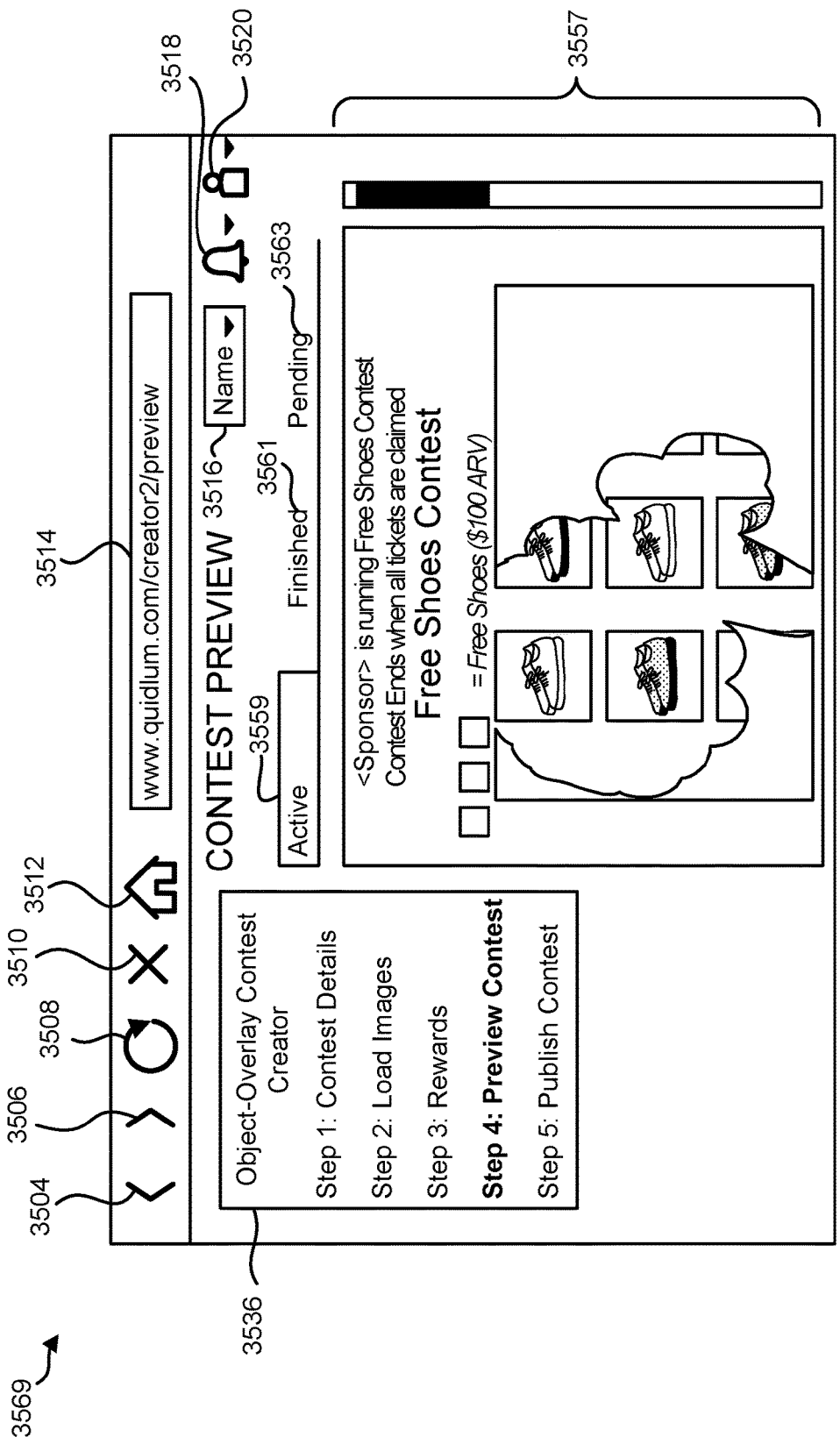
FIG. 35 is a diagram illustrating an example of a preview contest interface for contest creation.

FIG. 35 is a diagram illustrating an example of a preview contest interface 3569 for contest creation. In some configurations, the preview contest step may provide a preview of a contest (e.g., a preview of a participant view) based on one or more of the contest parameters obtained in the contest details step, the load images step, and/or the rewards step. The preview contest interface 3569 may be presented (e.g., provided, served, displayed, etc.) by a computing device. For example, a computing device may generate the preview contest interface 3569 based on instructions (e.g., code) and may present the preview contest interface 3569. In this example, the preview contest interface 3569 may include a navigator 3536, an active tab 3559, a finished tab 3561, a pending tab 3563, and/or a preview area 3557.

The navigator 3536 may present a set of steps for creating a contest. For example, the navigator 3536 may include elements and/or function as described in connection with the corresponding element of FIG. 32.

The active tab 3559 may function to select presentation of a preview for one or more interfaces for active contests. For example, if the active tab 3559 is activated (e.g., an event indicating an input corresponding to the active tab 3559 is detected), the computing device may present a preview of one or more active contest interfaces in the preview area 3557. The finished tab 3561 may function to select presentation of a preview for one or more interfaces for finished contests. For example, if the finished tab 3561 is activated (e.g., an event indicating an input corresponding to the finished tab 3561 is detected), the computing device may present a preview of one or more finished contest interfaces in the preview area 3557. The pending tab 3563 may function to select presentation of a preview for one or more interfaces for pending contests (e.g., contests that are not yet active and/or that have not yet been published). For example, if the pending tab 3563 is activated (e.g., an event indicating an input corresponding to the pending tab 3563 is detected), the computing device may present a preview of one or more finished contest interfaces in the preview area 3557. It should be noted that the active tab 3559, the finished tab 3561, the pending tab 3563, and/or the preview area 3557 may be referred to as one or more "interfaces."

In some configurations, the preview contest interface 3569 may include and/or present one or more other elements (e.g., interface objects). For example, the preview contest interface 3569 may include a name dropdown 3516, a notification dropdown 3518, and/or an account dropdown 3520. The name dropdown 3516, the notification dropdown 3518, and/or the account dropdown 3520 may function similarly to corresponding elements described in connection with FIG. 32.

In the example given in FIG. 35, the preview contest interface 3569 may be presented in a browser (e.g., web browser). For instance, the preview contest interface 3569 may include a toolbar with a back button 3504, a forward button 3506, a refresh button 3508, a stop loading button 3510, and/or a home button 3512. The preview contest interface 3569 may also include an address field 3514, which may function as described in connection with the corresponding elements described in connection with FIG. 32. It should be noted that the preview contest interface 3569 may not be presented in a browser in some configurations and/or instances. For example, the preview contest interface 3569 may alternatively be presented in a local application window.

Figure 36:
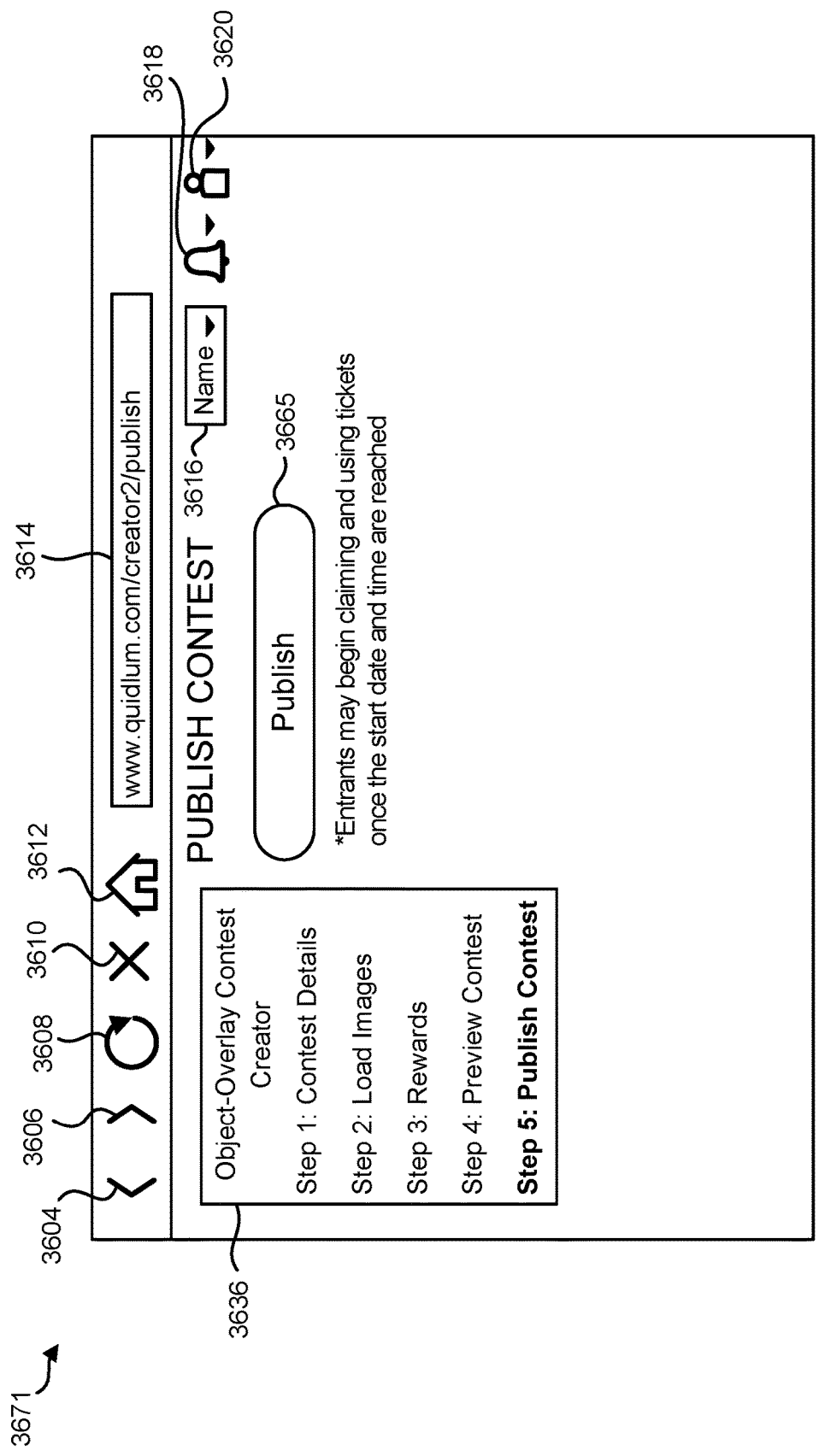
FIG. 36 is a diagram illustrating an example of a publish contest interface for contest creation.

FIG. 36 is a diagram illustrating an example of a publish contest interface 3671 for contest creation. In some configurations, the publish contest step may provide an interface for initiating contest presentation. For example, the publish contest step may provide a publish button 3665 that initiates contest presentation (e.g., posting the contest to one or more websites, making the contest details available to the public, etc.) upon detection of an event (e.g., click, tap, touch, etc.). The publish contest interface 3671 may be presented (e.g., provided, served, displayed, etc.) by a computing device. For example, a computing device may generate the publish contest interface 3671 based on instructions (e.g., code) and may present the publish contest interface 3671. In this example, the publish contest interface 3671 may include a navigator 3636 and/or a publish contest button 3665.

The navigator 3636 may present a set of steps for creating a contest. For example, the navigator 3636 may include elements and/or function as described in connection with the corresponding element of FIG. 32.

The publish contest button 3665 may function to publish a contest. For example, if the publish contest button 3665 is activated (e.g., an event indicating an input corresponding to the publish contest button 3665 is detected), the computing device may publish the contest (e.g., post the contest to one or more websites, make the contest details available to the public, send messages to contest platform users, present contest interfaces on a contest platform, advertise the contest, etc.). It should be noted that the publish contest button 3665 may be referred to as an "interface."

In some configurations, the publish contest interface 3671 may include and/or present one or more other elements (e.g., interface objects). For example, the publish contest interface 3671 may include a name dropdown 3616, a notification dropdown 3618, and/or an account dropdown 3620. The name dropdown 3616, the notification dropdown 3618, and/or the account dropdown 3620 may function similarly to corresponding elements described in connection with FIG. 32.

In the example given in FIG. 36, the publish contest interface 3671 may be presented in a browser (e.g., web browser). For instance, the publish contest interface 3671 may include a toolbar with a back button 3604, a forward button 3606, a refresh button 3608, a stop loading button 3610, and/or a home button 3612. The publish contest interface 3671 may also include an address field 3614, which may function as described in connection with the corresponding elements described in connection with FIG. 32. It should be noted that the publish contest interface 3671 may not be presented in a browser in some configurations and/or instances. For example, the publish contest interface 3671 may alternatively be presented in a local application window.

Figure 37:
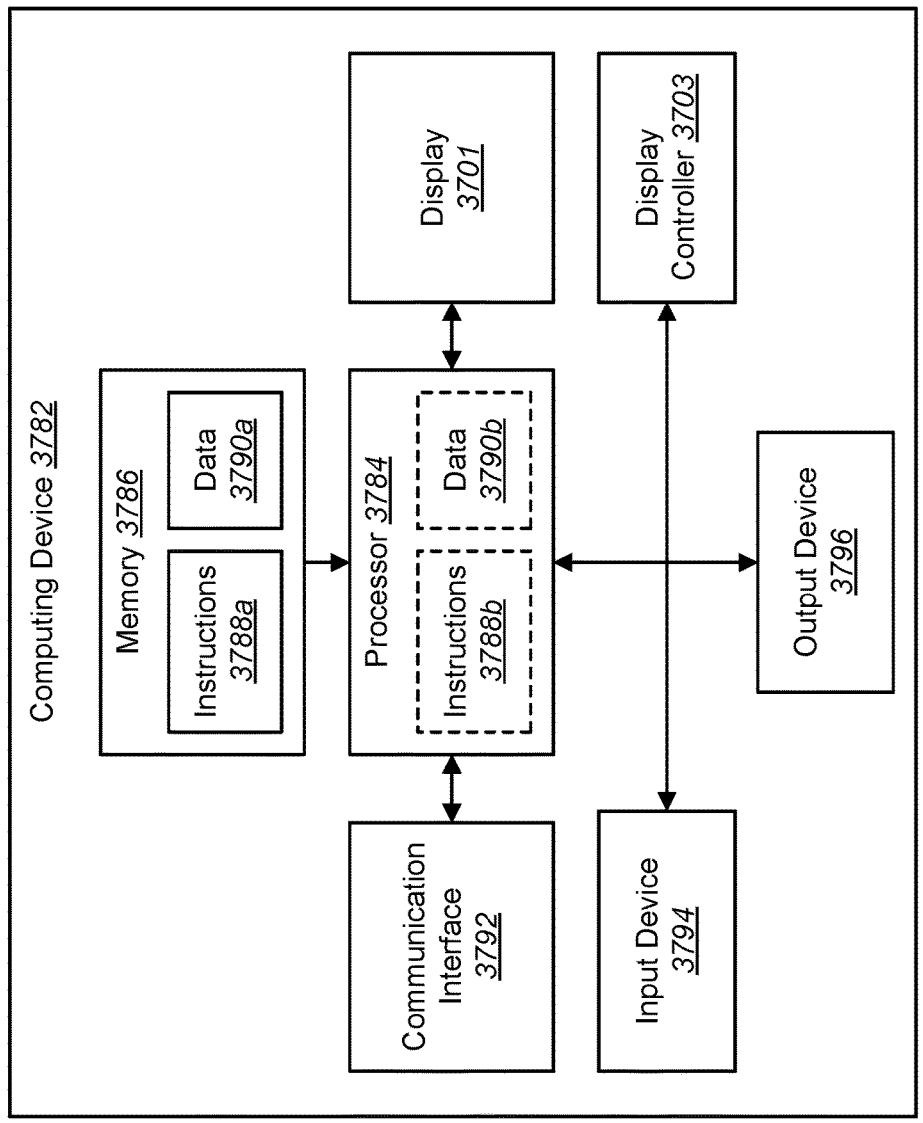
FIG. 37 illustrates various components that may be utilized on a computing device.

FIG. 37 illustrates various components that may be utilized on a computing device 3782. One or more of the computing devices 452, 1952, 2452, 2652, 2952, 3152, sponsor devices 466, participant devices 468, third-party devices 469, sales management system 3143, and/or point of sale systems 3145a-c described above may be implemented in accordance with the computing device 3782 illustrated in FIG. 37. For example, the computing device 3782 may be configured to perform one or more of the methods 1200, 2000, 2500, 2700, 3000 described above. The illustrated components may be located within the same physical structure or in separate housings or structures.

The computing device 3782 may include a processor 3784 and memory 3786. The processor 3784 controls the operation of the computing device 3782 and may be implemented as a microprocessor, a microcontroller, a digital signal processor (DSP), or other device known in the art. The memory 3786 may include (e.g., store) instructions 3788a and data 3790a. The processor 3784 may perform logical and arithmetic operations based on program instructions 3788a and/or data 3790a stored within the memory 3786. For example, instructions 3788b and data 3790b may be stored and/or run on the processor 3784. The instructions 3788a-b may be executable to perform one or more of the methods described above.

The computing device 3782 may include one or more communication interfaces 3792 for communicating with other electronic devices. The communication interfaces 3792 may be based on wireless communication technology, wired communication technology, or both. Examples of different types of communication interfaces 3792 include a serial port, a parallel port, a USB, an Ethernet adapter, an IEEE 1394 bus interface, a small computer system interface (SCSI) bus interface, an infrared (IR) communication port, a Bluetooth wireless communication adapter, and so forth.

The computing device 3782 may include one or more input devices 3794 and one or more output devices 3796. Examples of different kinds of input devices 3794 include a keyboard, mouse, microphone, remote control device, button, joystick, trackball, touchpad, lightpen, etc. Examples of different kinds of output devices 3796 include a speaker, printer, etc. One specific type of output device that may be typically included in a computer system is a display device 3701. Display devices 3701 used with configurations disclosed herein may utilize any suitable image projection technology, such as a cathode ray tube (CRT), liquid crystal display (LCD), light-emitting diode (LED), gas plasma, electroluminescence or the like. A display controller 3703 may also be provided for converting data stored in the memory 3786 into text, graphics and/or moving images (as appropriate) shown on the display device 3701.

It should be noted that FIG. 37 illustrates only one possible configuration of a computing device wherein systems and methods for creating, managing and/or providing a contest may be performed. Various other architectures and components may be utilized.

In the above description, reference numbers have sometimes been used in connection with various terms. Where a term is used in connection with a reference number, this may refer to a specific element that is shown in one or more of the Figures. Where a term is used without a reference number, this may refer generally to the term without limitation to any particular Figure.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. It should be noted that a computer-readable medium may be non-transitory and tangible. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method(s). The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computer program product for creating an online object-selection contest, the computer program product comprising:
   a non-transitory computer-readable medium; and
   computer program code, stored on the non-transitory computer-readable medium, configured to cause a set of one or more processors to perform the steps of:
      presenting a load selectable data object specification interface;
      receiving, via the load selectable data object specification interface, selectable objects data specifying two or more selectable data objects, wherein each of the two or more selectable data objects specifies a visually perceptible element;
      storing, in memory, the selectable objects data specifying two or more selectable data objects;
      presenting a required number specification interface;
      receiving, via the required number specification interface, required number data specifying a required number of the selectable data objects, wherein the required number is less than the two or more selectable data objects;
      storing, in the memory, the required number data specifying the required number;
      calculating at least one odds value based on the required number and a total number of the two or more selectable data objects, wherein the at least one odds value represents a probability of selecting one set of the required number of the selectable data objects from all possible sets of the required number of the selectable data objects;
      presenting a reward specification interface;
      receiving, via the reward specification interface, reward data specifying one or more rewards, wherein the reward specification interface presents an association between each of the one or more rewards and at least one threshold number of matches with one set of the required number of the selectable data objects;
      storing, in the memory, the reward data;
      generating executable code for accessing the online object-selection contest based on the two or more selectable data objects and the required number;
      receiving, from a plurality of remote computing devices, entry data specifying a set of entries, wherein the entry data indicates a selected set of the selectable data objects for each entry in the set of entries;
      storing, in the memory, the entry data;
      randomly selecting one set of the required number of the selectable data objects from among the two or more selectable data objects;
      comparing, for each entry in the set of entries, the selected set of the selectable data objects to the randomly selected one set of the required number of the selectable data objects to determine a number of matches with the randomly selected one set of the required number of the selectable data objects;
      determining whether each entry in the set of entries is eligible for the one or more rewards based on the number of matches and the at least one threshold number of matches;
      through one or more electronic communication interfaces with an e-commerce sales management system of a sponsor of the object-selection contest, adding a reward redemption code for a reward of the one or more rewards to the e-commerce sales management system, wherein the reward redemption code is configured to be input at a point of sale system in electronic communication with the e-commerce sales management system to obtain the reward for an entry of the set of entries that is eligible for the reward, wherein the e-commerce sales management system comprises one or more computing devices in electronic communication with but physically separate from one or more computing devices on which the computer program code operates; and
      through the one or more electronic communication interfaces with the e-commerce sales management system, obtaining sales data for an e-commerce transaction in which the reward redemption code is input at the point of sale system.

2. The computer program product of claim 1, wherein the computer program code is further configured to cause the set of one or more processors to perform the steps of:
   through the one or more electronic communication interfaces with the e-commerce sales management system, obtaining cost data for a set of e-commerce transactions employing the reward redemption code and a set of one or more other reward redemption codes;

through the one or more electronic communication interfaces with the e-commerce sales management system, obtaining earnings data for the set of e-commerce transactions; and wherein the computer program code is further configured to cause the set of one or more processors to perform the steps of:

calculating a return on investment based on the cost data and the earnings data; and presenting a return on investment interface indicating the return on investment.

3. The computer program product of claim 1, wherein the computer program code is further configured to cause the set of one or more processors to perform the steps of:

through the one or more electronic communication interfaces with the e-commerce sales management system, obtain data from the e-commerce sales management system; and wherein presenting the reward specification interface comprises presenting an interface through which one or more potential rewards are selectable as a reward utilizing the data obtained from the e-commerce sales management system, and wherein, through use of the data, the one or more potential rewards comprise at least one product, discount or gift card supported by the e-commerce sales management system.

4. The computer program product of claim 1, wherein the computer program code is further configured to cause the set of one or more processors to perform the steps of:

presenting a contest bonus specification interface;

receiving, via the contest bonus specification interface, contest bonus data specifying one or more contest bonuses, wherein each contest bonus indicates an additional contest opportunity in exchange for a specified bonus action; and storing, in the memory, the contest bonus data; and performing the specified bonus action on behalf of a user in response to user input.

5. The computer program product of claim 1, wherein the computer program code is further configured to cause the set of one or more processors to perform the steps of:

determining, based on the entry data, a number of contest participants, a number of bonuses claimed, and a number of entries;

presenting an active contests interface, wherein the active contests interface indicates:

the number of contest participants and the number of bonuses claimed for one or more active contests, executable code for accessing the one or more active contests, analytics of the one or more active contests comprising at least one of:

traffic sources, number of views over time, and number of entries over time, a participant list for the one or more active contests, build information of the one or more active contests, and a demo of the one or more active contests; and presenting a finished contests interface.

6. The computer program product of claim 1, wherein the computer program code is further configured to cause the set of one or more processors to perform the steps of:

obtaining cost data associated with one or more reward redemptions for the object-selection contest;

obtaining earnings data associated with the one or more reward redemptions for the object-selection contest;

calculating a return on investment based on the cost data and the earnings data; and presenting a return on investment interface indicating the return on investment.

7. The computer program product of claim 1, wherein the computer program code is further configured to cause the set of one or more processors to perform the step of:

receiving, via the reward specification interface, one or more reward redemption codes.

8. The computer program product of claim 1, wherein calculating the at least one odds value comprises calculating an odds value for a maximum number of matches and for each positive integer number of matches less than the maximum number of matches.

9. The computer program product of claim 8, wherein at least one reward is specified for at least two numbers of matches.

10. The computer program product of claim 1, wherein the executable code comprises instructions for accessing the object-selection contest when embedded in a webpage.

11. A method for creating an online object-selection contest, the method comprising:

presenting, by at least one of a set of one or more processors, a load selectable data object specification interface;

receiving, by at least one of the set of one or more processors, via the load selectable data object specification interface, selectable objects data specifying two or more selectable data objects, wherein each of the two or more selectable data objects specifies a visually perceptible element;

storing, in at least one of a set of one or more memories, the selectable objects data specifying the two or more selectable data objects;

presenting, by at least one of the set of one or more processors, a required number specification interface;

receiving, by at least one of the set of one or more processors, via the required number specification interface, a required number data specifying a required number of the selectable data objects, wherein the required number is less than the two or more selectable data objects;

storing, in at least one of the set of one or more memories, the required number data specifying the required number;

calculating, by at least one of the set of one or more processors, at least one odds value based on the required number and a total number of the two or more selectable data objects, wherein the at least one odds value represents a probability of selecting one set of the required number of the selectable data objects from all possible sets of the required number of the selectable data objects;

presenting, by at least one of the set of one or more processors, a reward specification interface;

receiving, by at least one of the set of one or more processors, via the reward specification interface, reward data specifying one or more rewards, wherein the reward specification interface presents an association between each of the one or more rewards and at least one threshold number of matches with one set of the required number of the selectable data objects;

storing, in at least one of the set of one or more memories, the reward data;

generating, by at least one of the set of one or more processors, executable code for accessing the online object-selection contest based on the two or more selectable data objects and the required number;

receiving, by at least one of the set of one or more processors, from a plurality of remote computing devices, entry data specifying a set of entries, wherein the entry data indicates a selected set of the selectable data objects for each entry in the set of entries;

storing, in at least one of the set of one or more memories, the entry data;

randomly selecting, by at least one of the set of one or more processors, one set of the required number of the selectable data objects from among the two or more selectable data objects;

comparing, by at least one of the set of one or more processors, for each entry in the set of entries, the selected set of the selectable data objects to the randomly selected one set of the required number of the selectable data objects to determine a number of matches with the randomly selected one set of the required number of the selectable data objects;

determining, by at least one of the set of one or more processors, whether each entry in the set of entries is eligible for the one or more rewards based on the number of matches and the at least one threshold number of matches;

through one or more electronic communication interfaces with an e-commerce sales management system of a sponsor of the object-selection contest, adding a reward redemption code for a reward of the one or more rewards to the e-commerce sales management system, wherein the reward redemption code is configured to be input at a point of sale system in electronic communication with the e-commerce sales management system to obtain the reward for an entry of the set of entries that is eligible for the reward, wherein the e-commerce sales management system comprises one or more computing devices in electronic communication with but physically separate from one or more computing devices on which the method is performed; and through the one or more electronic communication interfaces with the e-commerce sales management system, obtaining sales data for an e-commerce transaction in which the reward redemption code is input at the point of sale system.

12. The method of claim 11, further comprising: presenting, by at least one of the set of one or more processors, a contest bonus specification interface;

receiving, by at least one of the set of one or more processors, via the contest bonus specification interface, contest bonus data specifying one or more contest bonuses, wherein each contest bonus indicates an additional contest opportunity in exchange for a specified bonus action including at least one of sharing content, generating contest invitations, indicating praise of content, accessing online content, indicating online event attendance, following an account, completing a survey, propagating content, or subscribing to content;

storing, in at least one of the set of one or more memories, the contest bonus data; and performing the specified bonus action on behalf of a user in response to user input.

13. The method of claim 11, further comprising:

determining, by at least one of the set of one or more processors, based on the entry data, a number of contest participants, a number of bonuses claimed, and a number of entries;

presenting, by at least one of the set of one or more processors, an active contests interface, wherein the active contests interface indicates:
 the number of contest participants and the number of bonuses claimed for one or more active contests,
 executable code for accessing the one or more active contests,
 analytics of the one or more active contests comprising at least one of traffic sources, number of views over time, or number of entries over time,
 a participant list for the one or more active contests,
 build information of the one or more active contests, and
 a demo of the one or more active contests; and presenting, by at least one of the set of one or more processors, a finished contests interface.

14. The method of claim 11, further comprising:

obtaining, by at least one of the set of one or more processors, cost data associated with one or more reward redemptions for the object-selection contest;

obtaining, by at least one of the set of one or more processors, earnings data associated with the one or more reward redemptions for the object-selection contest;

calculating, by at least one of the set of one or more processors, a return on investment based on the cost data and the earnings data; and presenting, by at least one of the set of one or more processors, a return on investment interface indicating the return on investment.

15. A set of one or more computing devices for creating an online object-selection contest, the set of one or more computing devices comprising:

a set of one or more memory units;

a set of one or more processors in electronic communication with at least one of the set of one or more memory units, wherein the set of one or more processors is configured to:

present a load selectable data object specification interface;

receive, via the load selectable data object specification interface, selectable objects data specifying two or more selectable data objects, wherein each of the two or more selectable data objects specifies a visually perceptible element;

store, in at least one of the set of one or more memory units, the selectable objects data specifying the two or more selectable data objects;

present a required number specification interface;

receive, via the required number specification interface, required number data specifying a required number of the selectable data objects, wherein the required number is less than the two or more selectable data objects;

store, in at least one of the set of one or more memory units, the required number data specifying the required number;

calculate at least one odds value based on the required number and a total number of the two or more selectable data objects, wherein the at least one odds value represents a probability of selecting one set of the required number of the selectable data objects from all possible sets of the required number of the selectable data objects;

present a reward specification interface;

receive, via the reward specification interface, reward data specifying one or more rewards, wherein the reward specification interface presents an association between each of the one or more rewards and at least one threshold number of matches with one set of the required number of the selectable data objects;

store, in at least one of the set of one or more memory units, the reward data;

generate executable code for accessing the online object-selection contest based on the two or more selectable data objects and the required number;

receive, from a plurality of remote computing devices, entry data specifying a set of entries, wherein the entry data indicates a selected set of the selectable data objects for each entry in the set of entries;

store, in at least one of the set of one or more memory units, the entry data;

randomly select one set of the required number of the selectable data objects from among the two or more selectable data objects;

compare, for each entry in the set of entries, the selected set of the selectable data objects to the randomly selected one set of the required number of the selectable data objects to determine a number of matches with the randomly selected one set of the required number of the selectable data objects;

determine whether each entry in the set of entries is eligible for the one or more rewards based on the number of matches and the at least one threshold number of matches;

through one or more electronic communication interfaces with an e-commerce sales management system of a sponsor of the object-selection contest, add a reward redemption code for a reward of the one or more rewards to the e-commerce sales management system, wherein the reward redemption code is configured to be input at a point of sale system in electronic communication with the e-commerce sales management system to obtain the reward for an entry of the set of entries that is eligible for the reward, wherein the e-commerce sales management system comprises one or more computing devices in electronic communication with but physically separate from the set of one or more computing devices; and through the one or more electronic communication interfaces with the e-commerce sales management system, obtaining sales data for an e-commerce transaction in which the reward redemption code is input at the point of sale system.

16. The set of one or more computing devices of claim 15, wherein at least one of the set of one or more processors is configured to:

present a contest bonus specification interface;

receive, via the contest bonus specification interface, contest bonus data specifying one or more contest bonuses, wherein each contest bonus indicates an additional contest opportunity in exchange for a specified bonus action including at least one of sharing content, generating contest invitations, indicating praise of content, accessing online content, indicating online event attendance, following an account, completing a survey, propagating content, or subscribing to content;

store, in at least one of the set of one or more memory units, the contest bonus data; and perform the specified bonus action on behalf of a user in response to user input.

17. The set of one or more computing devices of claim 15, wherein at least one of the set of one or more processors is configured to:

determine, based on the entry data, a number of contest participants, a number of bonuses claimed, and a number of entries;

present an active contests interface, wherein the active contests interface indicates:
the number of contest participants and the number of bonuses claimed for one or more active contests,
executable code for accessing the one or more active contests,
analytics of the one or more active contests comprising at least one of traffic sources, number of views over time, or number of entries over time,
a participant list for the one or more active contests,
build information of the one or more active contests, and
a demo of the one or more active contests; and present a finished contests interface.

18. The set of one or more computing devices of claim 15, wherein at least one of the set of one or more processors is configured to:

obtain cost data associated with one or more reward redemptions for the object-selection contest;

obtain earnings data associated with the one or more reward redemptions for the object-select on contest;

calculate a return on investment based on the cost data and the earnings data; and present a return on investment interface indicating the return on investment.

* * * * *